United States Patent [19]

Hwa

[11] Patent Number: 5,781,144
[45] Date of Patent: Jul. 14, 1998

[54] WIDE BAND VIDEO SIGNAL DENOISER AND METHOD FOR DENOISING

[75] Inventor: Chen Hwa, Fremont, Calif.

[73] Assignee: Litton Applied Technology, San Jose, Calif.

[21] Appl. No.: 675,682

[22] Filed: Jul. 3, 1996

[51] Int. Cl.$^6$ .................. G01S 7/28; G01S 7/40
[52] U.S. Cl. ............. 342/13; 342/159; 342/192; 342/197
[58] Field of Search ............ 342/13, 21, 91, 342/159, 162, 192, 195, 197, 194

[56] References Cited

U.S. PATENT DOCUMENTS

| | | | |
|---|---|---|---|
| 4,700,191 | 10/1987 | Manor | 342/13 |
| 5,497,777 | 3/1996 | Abdel-Malek et al. | 128/660.07 |
| 5,619,998 | 4/1997 | Abdel-Malek et al. | 128/660.07 |
| 5,699,068 | 12/1997 | Cirineo | 342/197 |

Primary Examiner—John B. Sotomayor
Attorney, Agent, or Firm—Wagner, Murabito & Hao

[57] ABSTRACT

A method and apparatus for high speed denoising of an input signal received by a radar warning receiver (RWR) system. The novel system digitizes the input signal into sample windows each having a number of sample data points. The novel system includes a signal transformation processor system which convolves Haar wavelet basis functions across individual time segments of the input signal to produce sets of coefficients. Signal noise is poorly represented by the selected Haar wavelet basis functions while expected pulse signal characteristics are well represented by the basis functions. Within the wavelet transformation process, a plurality of frequency resolution levels are simultaneously determined, each frequency resolution level having a fixed number of correlation coefficients equal to the number of sample points in the sample window. Each coefficient also corresponds to a different basis function, or a same basis function applied to a different time segment. Each level contains a different number of represented frequency bands and a different number of time segments per band. For each level, the level's coefficients are sorted into coefficient maps and the largest coefficients are selected from each map. The coefficient map best packaging the input signal energy is then selected. The coefficients of the best coefficient map can be used to (1) reconstruct a denoised digital or analog signal using a re-transformation for application to a video pulse processor for threat characterization or (2) to produce a digital report indicating vital pulse information including leading edge pulse position, pulse amplitude, pulse duration, etc.

29 Claims, 43 Drawing Sheets

$$0 \quad SS_1 \quad 0 \quad SS_2 \underset{\displaystyle\phantom{x}}{\overset{\displaystyle\phantom{x}}{\phantom{xxxxxx}}} 372$$

$$\begin{array}{|cc|} \hline 1 & 1 \\ -1 & 1 \\ \hline \end{array} \sim 340 \atop \sim 335'  \Rightarrow \quad S_1 = SS_1 + DS_1$$

$$0 \quad DS_1 \quad 0 \quad DS_2 \phantom{xxxx} 374$$

FIG. 13A $$0 \quad SS_1 \quad 0 \quad SS_2 \phantom{xxxx} 372$$

$$\rightarrow \begin{array}{|cc|} \hline 1 & 1 \\ -1 & 1 \\ \hline \end{array} \sim 340 \atop \sim 335' \Rightarrow \quad S_2 = SS_1 - DS_1$$

$$0 \quad DS_1 \quad 0 \quad DS_2 \phantom{xxxx} 374$$

FIG. 13B $$0 \quad SD_1 \quad 0 \quad SD_2 \phantom{xxxx} 382$$

$$\begin{array}{|cc|} \hline 1 & 1 \\ -1 & 1 \\ \hline \end{array} \sim 340 \atop \sim 335' \Rightarrow \quad D_1 = SD_1 + DD_1$$

$$0 \quad DD_1 \quad 0 \quad DD_2 \phantom{xxxx} 384$$

FIG. 13C $$0 \quad SD_1 \quad 0 \quad SD_2 \phantom{xxxx} 382$$

$$\rightarrow \begin{array}{|cc|} \hline 1 & 1 \\ -1 & 1 \\ \hline \end{array} \sim 340 \atop \sim 335' \Rightarrow \quad D_2 = SD_1 - DD_1$$

$$0 \quad DD_1 \quad 0 \quad DD_2 \phantom{xxxx} 384$$

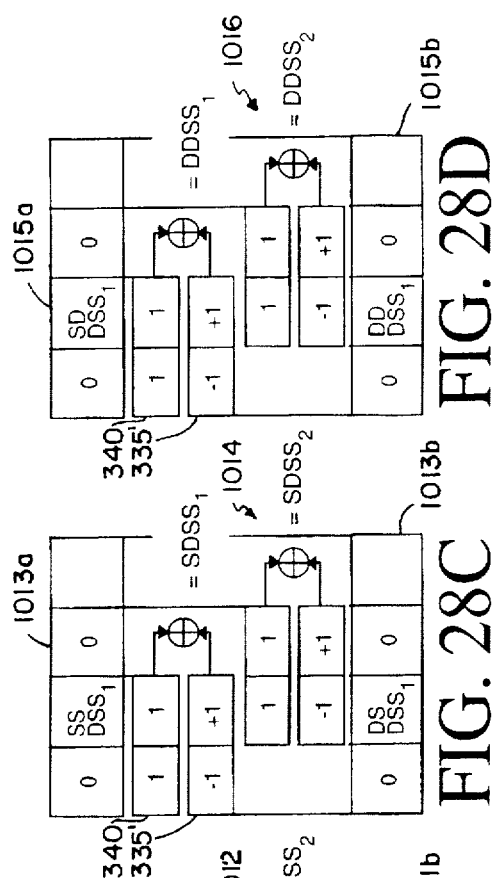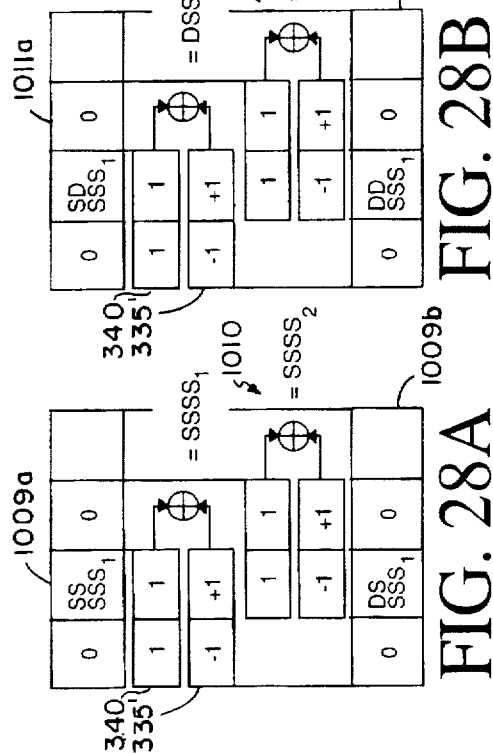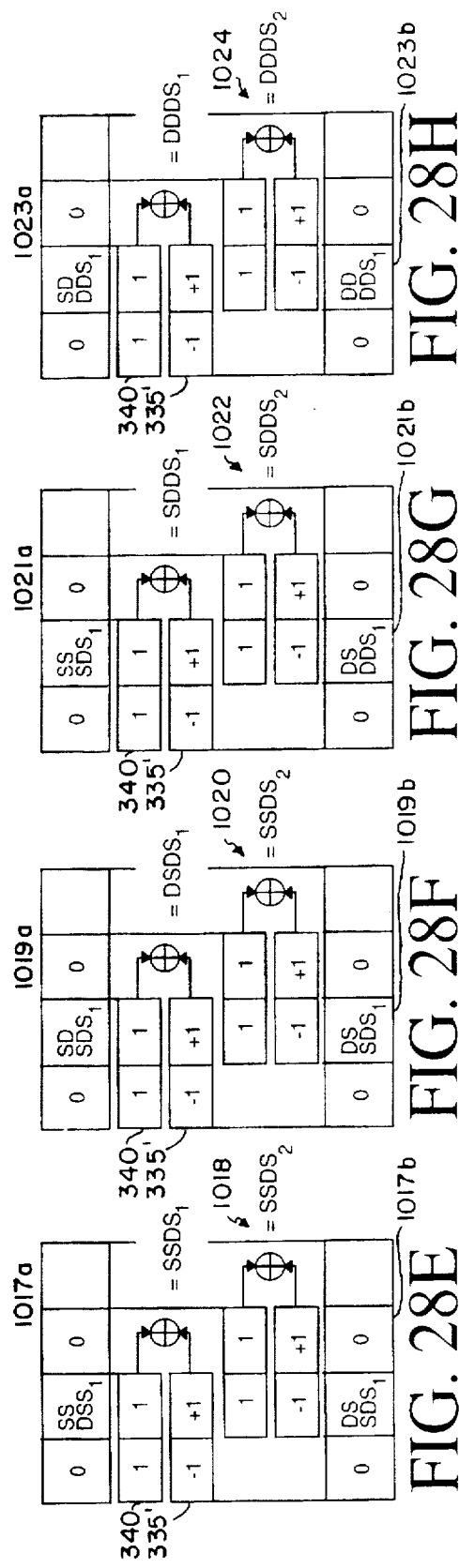
FIG. 28A  FIG. 28B  FIG. 28C  FIG. 28D
FIG. 28E  FIG. 28F  FIG. 28G  FIG. 28H

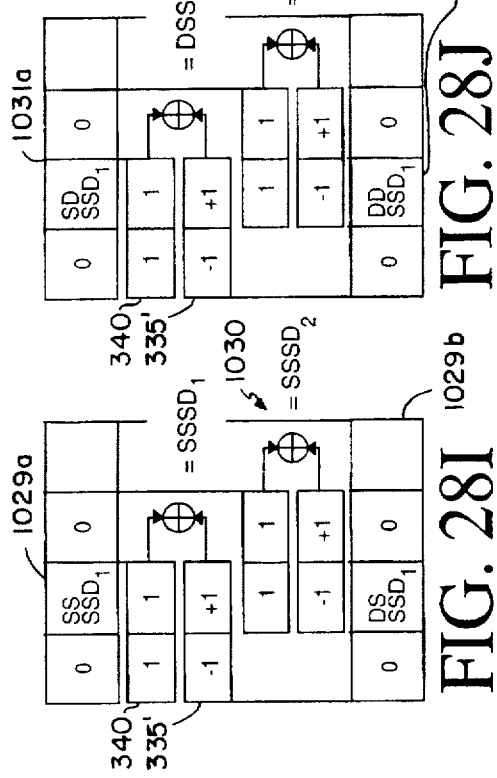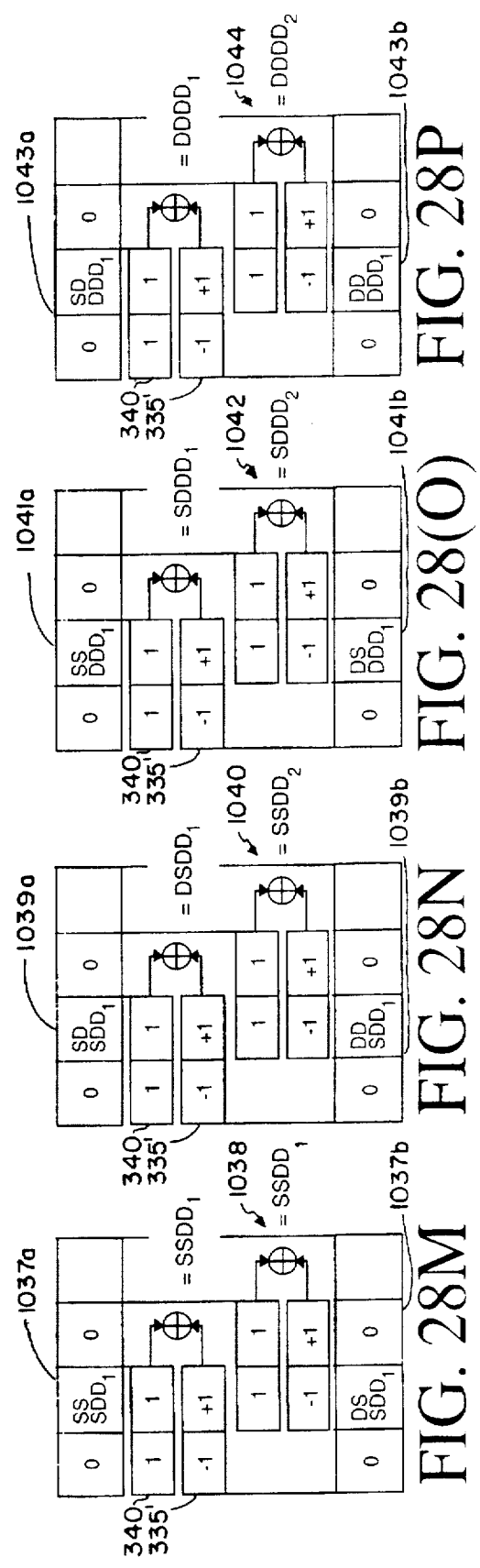
FIG. 28I   FIG. 28J   FIG. 28K   FIG. 28L
FIG. 28M   FIG. 28N   FIG. 28(O)   FIG. 28P

WIDE BAND VIDEO SIGNAL DENOISER AND METHOD FOR DENOISING

BACKGROUND OF THE INVENTION

(1) Field of the Invention

The present invention relates to the field of signal processing technology. More specifically, the present invention relates to the field of signal processing technology for efficient signal representation and reproduction using wavelet transformations.

(2) Prior Art

Radar warning receivers (RWRs) receive and process signal pulses found within an input wide band signal. The performance of RWRs, and other devices used for signal detection and feature extraction purposes, is often measured by charting Receiver Operating Characteristic curves (ROC curves) in which the system's performance in Probability of Detection (POD) vs. the False Alarm Rate (FAR) is plotted and compared. An RWR system can have a higher probability of signal detection at a lower false alarm rate if the system's signal to noise ratio (SNR) at the detection point is improved (e.g., it has a higher operating sensitivity). Therefore, it is a great advantage for RWR systems to reduce the noise content of the incoming signal relative to the signal content of the detected pulses. However, heretofore, advanced signal denoising techniques have not been applied to RWR systems.

For RWRs, higher operating sensitivity translates into increased range of detection, improved accuracy and increased precision for time of arrival (TOA), angle of arrival (AOA), pulse width (PW) measurement, and peak amplitude measurements of the input signal. An overall gain in RWR system operating sensitivity also translates into reduced vulnerability for the carrier which hosts the RWR; the above being the ultimate goal of such a system.

Current RWR systems based on the existing receiver designs and architectures suffer from the lack of advanced signal processing capabilities to effectively deal with the problems associated with signal noise contamination in the broad band (e.g., wide band) channel for pulse signal detection, identification and characterization. Without advanced denoising techniques and signal processing hardware, prior art RWR systems must process incoming signals having substantial noise content which unfortunately reduces their overall sensitivity. Prior art RWR systems also lack advanced signal processing capabilities to effectively deal with frequency ambiguities in the narrow band frequency domain. As such, the detection range of prior art RWR systems is hampered and frequency ambiguity problems persist. Thus, what is needed is an RWR system with increased capability to reduce the context of signal noise within the input signal relative to the content of the signal pulses desired for detection. To this end, what is needed is an RWR system having greater sensitivity over the prior art designs to provide increased advanced warning and thus protection for the host carrier.

Accordingly, the present invention RWR system offers a system for significantly reducing the noise content of an incoming RWR signal relative to the content of signal pulses desired for detection (e.g., operates with an increased signal to noise ratio). The present invention offers a significant increase of overall RWR system sensitivity and range of detection. Further, the present invention offers a denoising system that can be retrofitted into existing RWR designs to allow effective denoising while not substantially altering other aspects of downstream processing performed by the RWR systems. These and other advantageous of the present invention not specifically recited above will become clear within discussions of the present invention herein.

SUMMARY OF THE INVENTION

A method and apparatus are described for high speed denoising of an input wide band signal received by a radar warning receiver (RWR) system. The system of the present invention digitizes the input signal into sample windows each having a number of sample data points (x). The present invention includes a signal transformation processor system which convolves Haar wavelet basis functions across individual time segments of the input signal to produce sets of correlation coefficients. Signal noise is poorly represented by the selected Haar wavelet basis functions while expected pulse signal characteristics are well represented by the basis functions. Within the wavelet transformation processes, a plurality (n) of frequency resolution levels are simultaneously determined, each frequency resolution level having a fixed number of correlation coefficients (x) corresponding to the number of sample points in a sample window. Each coefficient also corresponds to a different basis function, or a same basis function applied to an individual time segment. Each level contains a different number of represented frequency bands and different number of time segments per frequency band. Therefore, each level provides different frequency/time resolution. For each level, the coefficients are sorted into a coefficient map by magnitude order. A thresholding processor determines each level's coefficients having magnitudes within a threshold range and discards the remaining coefficients (e.g., the "noise"). The processor then determines the coefficient map having the best correlation to the input signal sample by analyzing the drop-offs in coefficient magnitude across each of the coefficient maps. These coefficients can be used to (1) reconstruct a denoised digital or analog signal using a re-transformation process or (2) to produce a digital report indicating vital pulse information including leading edge pulse position, pulse peek amplitude, pulse duration, etc. Under the present invention, using wavelet transformation, the input signal energy is efficiently repackaged in terms of wavelet basis functions with a reduced set of information (coefficients) representing the input signal.

Specifically, an embodiment of the present invention includes a method for denoising an input RWR digital signal, the method comprising the computer implemented steps of: a) sampling the input digital signal into sample windows, each sample window comprising x discrete sample points; b) convolving the sample window with selected wavelet basis functions across n frequency resolution levels to generate n sets of x correlation coefficients with each frequency resolution level generating x correlation coefficients; c) generating a set of n coefficient maps, one coefficient map per frequency resolution level of the n frequency resolution levels; d) determining a best coefficient map of the n coefficient maps that most efficiently packages the x discrete sample points of the sample window; and e) recording selected correlation coefficients of the best coefficient map for use in reconstruction of a denoised output digital signal. Embodiments also include an RWR system implemented in accordance with the above.

BRIEF DESCRIPTION OF THE DRAWINGS

FIGS. 12A, 12B, 12C, and 12D illustrate reconstruction by discrete convolution procedures with interpolation to arrive at the denoised signal based on the frequency resolution level 1 coefficients in accordance with the present invention.

FIGS. 13A, 13B, 13C, and 13D illustrate reconstruction by discrete convolution procedures with interpolation to arrive at the frequency resolution level 1 coefficients based on the frequency resolution level 2 coefficients in accordance with the present invention.

FIGS. 23A and 23B illustrate two exemplary discrete convolution and decimation processes performed by the present invention to arrive at the first and the last coefficients of the 32 coefficients of the frequency resolution level 5, based on an input signal sample window within an embodiment where x=32.

FIGS. 28A, 28B, 28C, 28D, 28E, 28F, 28G, 28H, 28I, 28J, 28K, 28L, 28M, 28N, 28(O), and 28P illustrate discrete convolution and interpolation reconstruction processes performed by step 710 of the present invention to arrive at the 32 coefficients of the frequency resolution level 4 based on the 32 coefficients of the frequency resolution level 5 within an embodiment where x=32.

DETAILED DESCRIPTION OF THE INVENTION

Figure 1:
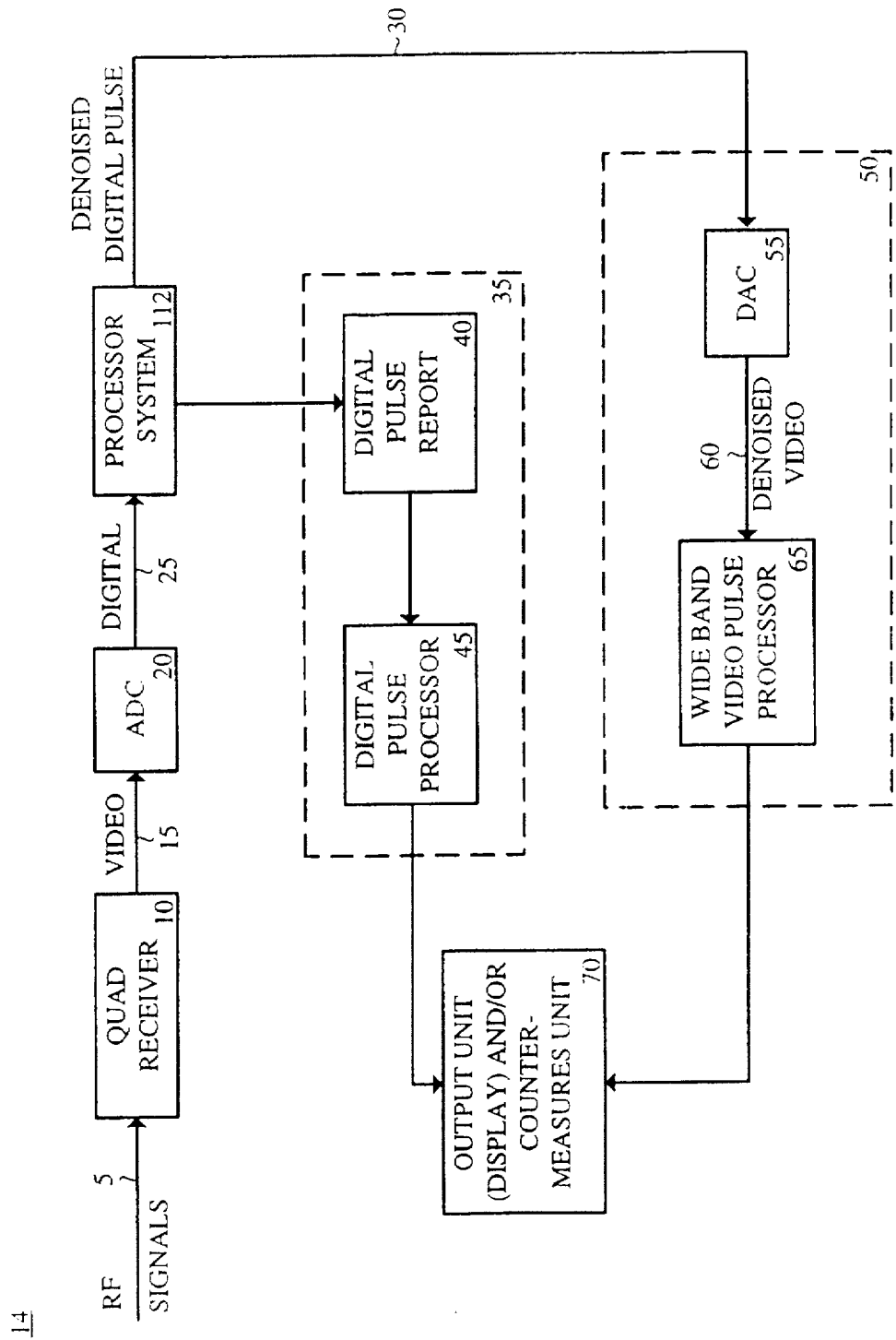
FIG. 1 is an overall block diagram of two embodiments of a radar warning receiver (RWR) system in accordance with the present invention both including a denoising system using wavelet transformation.

A signal denoising system is described using wavelet transformations and reconstruction. In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is interpreted to be a self-consistent sequence of steps or instructions leading to a desired result. The steps are those requiring physical manipulations of physical quantities that represent physical entities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, data, or the like.

It should be borne in mind, however, that all of these and similar terms are to be associated with the appropriate physical quantities and represented entities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, or designed hardware unit (FPGA, ASIC, PROM, PAL, etc.), that manipulates and transforms data represented as physical (electronic) quantities within the computer system's registers and memories into other data similarly represented as physical quantities within the computer system memories or registers or other such information storage, transmission or display devices.

WAVELET TRANSFORMATIONS

The present invention utilizes wavelet transformations to transform a digitized signal window into sets of correlation coefficients ("coefficients") that represent wavelet basis functions. One type of wavelet transformation performed by the present invention is the Haar wavelet transformation. The wavelet basis functions ("basis functions") employed by the present invention to perform the transformation are Haar wavelet packets and are specifically tailored for pulse signal representation while not well formulated to correlate with signal noise. This representation maximizes the utility of available a priori information about the input signals and also packages the signal energy efficiently into a reduced number of terms (e.g., coefficients) for fast signal denoising, detection, characterization and reconstruction. The wavelet transformations performed by the present invention are efficiently performed using multiple parallel processing units.

Wavelet transformation outperforms classical Fourier transformation techniques in cases when the input signals are wide band transients, as is the case in RWR applications. This advantage stems from the fact that wavelets themselves are energy pulses having: 1) oscillations; 2) with a zero average over the wavelet; 3) with constant fidelity, e.g., $df/f$ is constant; 4) with no DC terms, and 5) with finite support, e.g., most of the wavelet value is zero except for a small duration of non zero (1/−1) values. Wavelets are different from sinusoidals (that have infinite support) in that wavelet transformations allow a combined time-frequency representation of the signal, rather than a sole frequency representation as provided by Fourier analysis. Further, wavelet transformation offers constant frequency fidelity across all frequency resolution levels, unlike a Fourier transform. What follows is a description of an RWR system effectively employing a Haar wavelet transformation processor system for denoising of an input wide band signal carrying pulse signals with noise.

PRESENT INVENTION RWR SYSTEM 14

FIG. 1 illustrates a block diagram of an RWR system 14 in accordance with the present invention, including a Haar wavelet transformation processor unit 112 ("processor unit 112"). According to system 14, wide band radio frequency (RF) signals are received over input 5 (e.g., a complex antenna) by a wide band quadratic ("quad") receiver unit 10. Quad receiver 10 can be implemented in accordance with a number of well known designs and typically contains four fields of view. Quad receiver 10 outputs wide band video signals over line 15 which are supplied to an analog to digital converter (ADC) circuit 20, which is also well known. The signal over line 15 is an input analog signal and contains noise. ADC circuit 20 generates a digital representation of the input analog signal received by quad receiver 10. Although a number of sample frequencies can be used within the scope of the present invention, an exemplary ADC circuit 20 can operate at a sample frequency of 64 MHz with a sample resolution of 8–10 bits. Sampled digital signal points representative of the input analog signal 15 are supplied over bus 25 to the Haar wavelet transformation processor unit 112. The size of bus 25 depends on the resolution of the ADC circuit 20 and in one embodiment is between 8–10 bits wide. The digital signal points presented over bus 25 are sampled by processor unit 112 in sample windows of x signal points per window. Preferably x is a power of 2.

In one embodiment, processor system 112 is a high speed computer system implemented to perform parallel processing (e.g., having a single high speed central processing unit or having multiple parallel central processing units). Alternatively, the design of the processor system 112, as described herein to follow, can be implemented with a custom designed circuit having hardware parallel processors specially adapted to perform wavelet transformations. Under this alternative embodiment, the design of the processor system 112 can be realized using a programmable data signal processing (DSP) chip (e.g., the TMS 320 C80 by Texas Instruments) or an application specific integrated circuit (ASIC), or a programmable logic device (PLD), or a field programmable gate array (FPGA) on a pulse processing board.

Processor system 112 of FIG. 1 receives the digitized representation of the input signal over bus 25 and selects sample windows, each having a determined number of sample points (e.g., x). Processor system 112 performs Haar wavelet transformations upon the sample points using multiple frequency resolution levels (e.g., n), each level having different frequency and timne resolutions. At each frequency resolution level, n, processor system 112 convolves (with decimation) selected Haar wavelet basis functions across different time segments of the input sample window to generate x different correlation coefficients ("coefficients"). Across all n levels, a total of n*x coefficients are computed by processor system 112 with coefficients of a same level determined in parallel with other levels.

At each frequency resolution level, the processor system 112 of FIG. 1 also generates a coefficient map ranking all of the x coefficients of that level by their respective magnitudes. Processor system 112 analyzes each coefficient map to determine which map of the n levels best packages or correlates to the input signal sample; a drop-off procedure can be used by processor unit 112 to perform this process with the coefficient map having the sharpest drop-off curve selected as the "best coefficient map." The best coefficient map can also be selected by using two distinct methods from a complete multi-resolution signal decomposition tree diagram. The. first method is a minimum entropy procedures. Shannon entropy of a function expansion is a classic measure of good fit or the "distance" between the basis function and the signal function. Thus, signal decomposition with minimum entropy indicates that the basis function in use provides the best fit or most efficient energy compaction. The second method is the sharpest coefficient drop off method. As discussed above, a search method can be used for a coefficient map that exhibits the highest efficiently in energy packaging, e.g., uses the least number of coefficients to represent a preset desired signal energy level. The second method is the preferred practical method.

Of the best coefficient map, the processor system 112 selects the coefficients having the largest magnitude ("selected coefficients"); a thresholding procedure can be used here. Since noise signal characteristics and waveforms are not well represented by the Haar wavelet basis functions of the present invention, selection of the largest magnitude coefficients while eliminating the remainder coefficients effectively performs a denoising of the transformed input signal sample.

At this point, RWR system 14 of the present invention generates one of two different outputs depending on the RWR implementation desired, both of which are shown in FIG. 1. In a first embodiment, a digital pulse processor 45 is employed and is coupled to receive a digital pulse report 40 stored in computer memory. Processor system 112 generates the digital pulse report 40, which is stored within unit 35, based on the selected coefficients of the best coefficient map.

The pulse report 40 contains vital information regarding a detected pulse within the input sample including whether a pulse was detected at all, the pulse leading edge position, the pulse peak amplitude and the pulse width or duration. This information is supplied to a digital pulse processor 45 for pulse and signal recognition and other well known threat characterization processing. The output of the digital pulse processor 45 is supplied to an output display unit 70 and/or a countermeasures unit 70, both of which are well known in the art.

In a second, or "retrofit," embodiment of the RWR system 14, the processor system 112 of FIG. 1 contains a reconstruction (e.g., re-transformation) processor which inputs the selected coefficients of the best coefficient map. Based on these selected coefficients, the re-transformation processor performs a re-transformation to reconstruct a digital signal representing a denoised version of the input digital signal at 25. This digital signal is normalized and then output over bus 30 to a digital to analog converter (DAC) circuit 55 of a well known design. Unit 50 contains both the DAC circuit 55 and a wide band video pulse processor 65 of a well known design which detects and analyzes pulses for threat characterization. The DAC circuit 55 generates a denoised analog signal ("clean video signal") over line 60 which is supplied to the wide band video pulse processor 65 for processing. In this "retrofit" embodiment, an otherwise conventional RWR system can be retrofitted using the present invention processor system 112 in combination with the ADC circuit 20 and the DAC circuit 55. The present invention denoising system of this embodiment receives a "video in" 15 and generates a "clean video out" 30 (video-in/video-out) used by conventional downstream processors (e.g., processor 65). The output of the wide band video pulse processor 65 is supplied to an output display unit 70 and/or a countermeasures unit 70, both of which are well known in the art.

Figure 2:
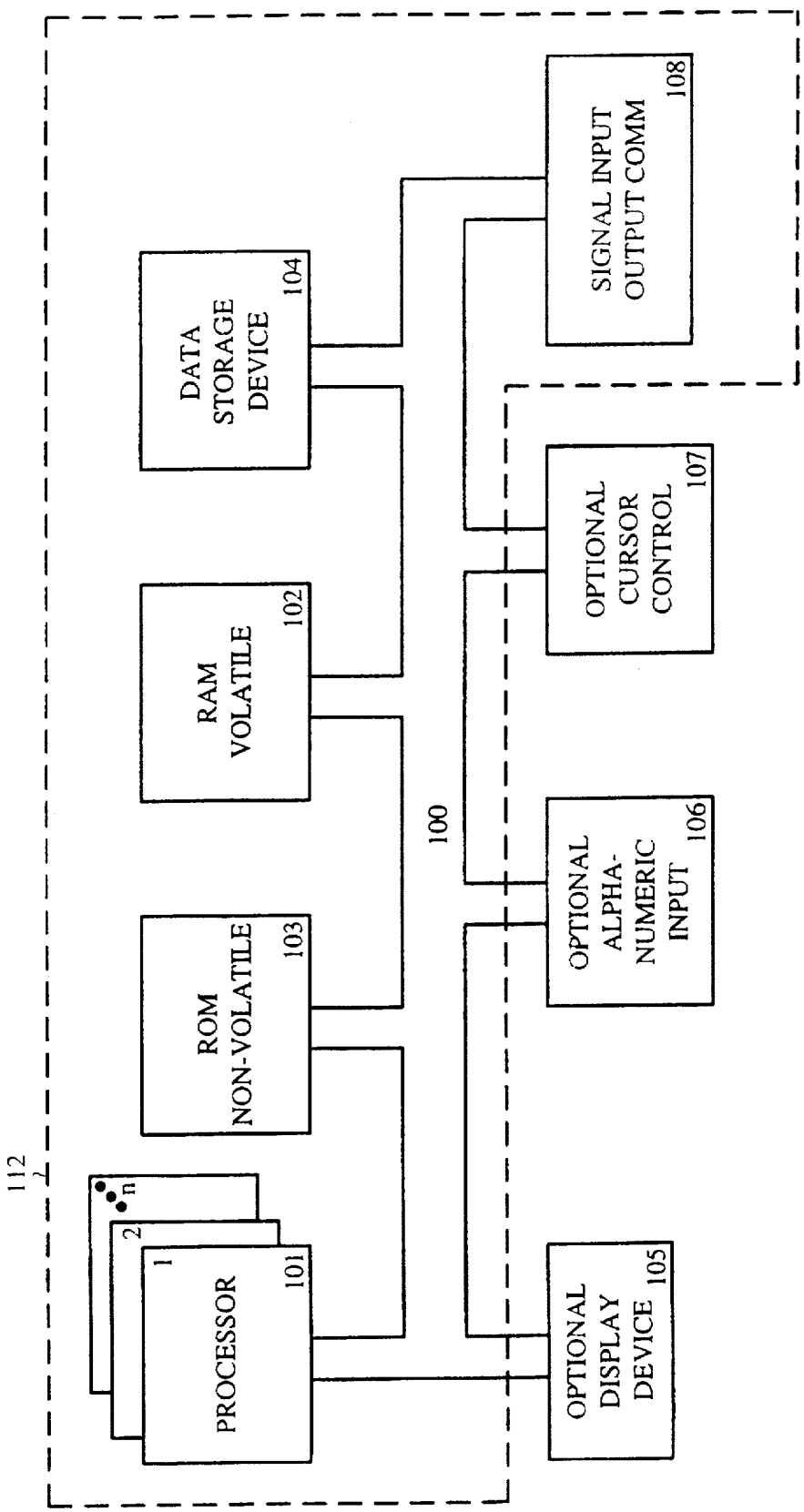
FIG. 2 illustrates an embodiment of the denoising processor system of the present invention using a computer system.

FIG. 2 illustrates one embodiment of processor system 112 as a computer system. The wavelet transformation processes (e.g., process 300/FIG. 3) of the present invention can be realized utilizing parallel processing. Processor 101 can be a high speed processor capable of executing simultaneous processing tasks or, alternatively, processor 101 can be implemented as a number of individual parallel executing processors 101 (e.g., n processors), one for each of the n frequency resolution levels analyzed within the present invention wavelet transformation processes. In general, processor system 112 comprises an address/data bus 100 for communicating information, the central processor(s) 101 coupled with the bus 100 for processing information and instructions, one or more computer readable volatile memories (e.g., random access memory) 102 coupled with bus 100 for storing information and instructions for the central processor(s) 101, one or more computer readable non-volatile memories (e.g., read only memory) 103 coupled with bus 100 for storing static information and instructions for the processor(s) 101, a signal communication device 108 coupled to the bus 100 for providing communication between processor system 112 and external units, and an optional data storage device 104 such as a magnetic or optical disk and disk drive coupled with bus 100 for storing information and instructions.

Optionally coupled to system 112 can be an optional display device 105 coupled to bus 100 for displaying information to the computer user, an optional alphanumeric input device 106 coupled to bus 100 for communicating information and command selections to the central processor(s) 101, and an optional cursor control device 107 coupled to bus 100 for communicating user input information and command selections to the central processor(s) 101. When computer system 112 is used as an embedded system, units 105, 106 and 107 are typically excluded.

PROCESS FLOW OF RWR SYSTEM

Figure 3:
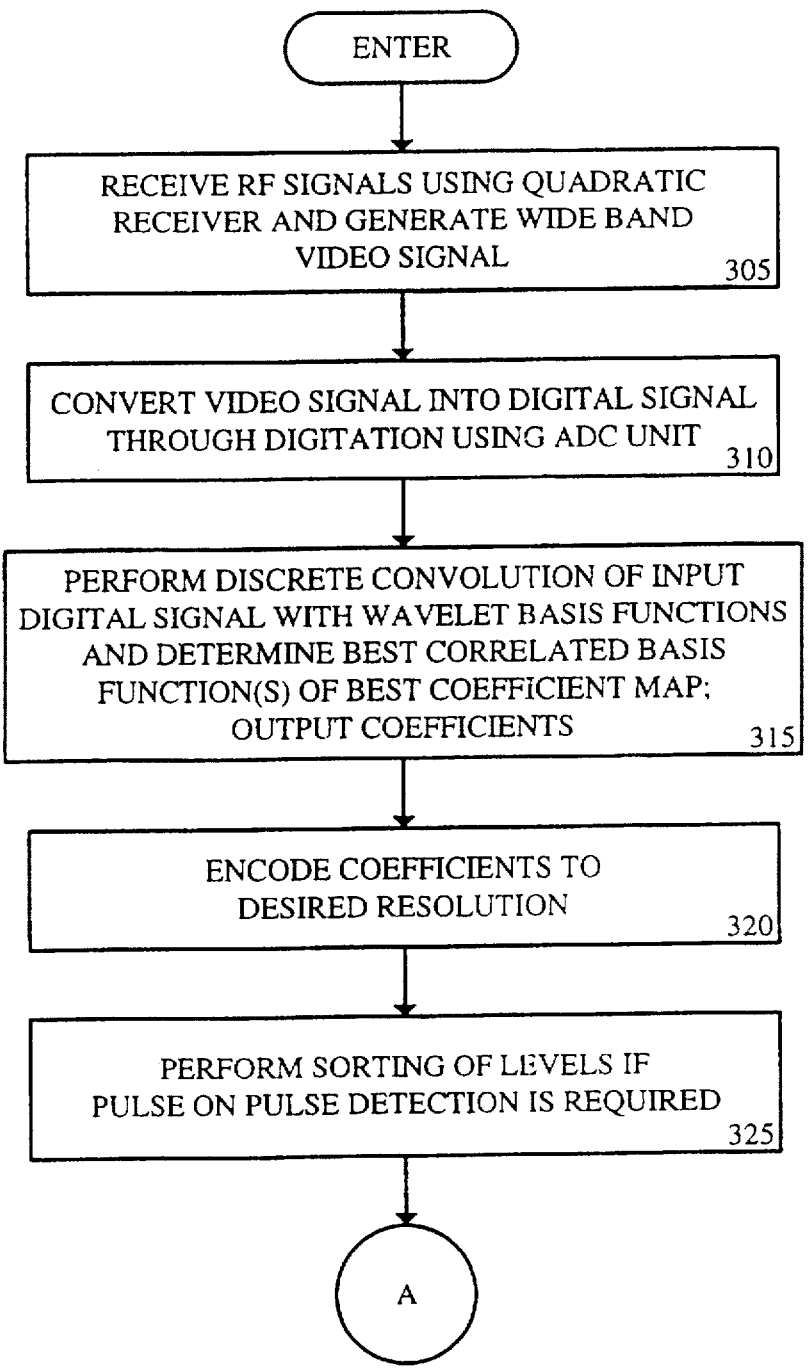
FIG. 3 is a flow diagram illustrating initial steps of the present invention process for denoising an input signal using wavelet transformation.

FIG. 3 illustrates steps of process flow 300 performed by the present invention to perform signal denoising. At step 305, radio frequency (RF) signals are received over antenna 5 by quad receiver 10 which generates a noisy analog video signal (the input signal) over line 15. Step 305 can be performed using well known components and techniques. At step 310, the noisy analog video signal is digitized by ADC circuit 20 which samples the noisy video signal over sample windows, each sample window having a number (x) of discrete digital sample points. The digital signal output over bus 25 is the input digitized signal. Step 310 can be performed using well known components and techniques. The ADC circuit 20 is preprogrammed to sample at a predetermined frequency (e.g., 64 MHz) and the number of sample points within a sample window is programmable (e.g., x sample points). Running at an exemplary frequency of 64 MHz, the time between input signal sample points is approximately 15.63 nanoseconds.

At step 315 of FIG. 3, the processor system 112 of the present invention performs high speed real-time wavelet transformation to transform the digital sample points of bus 25. Step 315 performs wavelet transformations on a sample window by sample window basis. During the transformation process, a programmable number (e.g., n) of frequency resolution levels ("levels") are simultaneously processed, each level generating at least x coefficients corresponding to the current input sample window. At each level, the discrete sample points of the input sample window are discretely convolved (using decimation) with certain wavelet basis functions (frequency bands) to produce the x coefficients for each level. For each frequency band within each level, convolution is performed across select number of time segments of the input sample window.

The magnitude of the coefficient dictates how well the corresponding wavelet basis function correlates to the input signal within the input sample window. At each of the n levels, x coefficients are generated based on the above convolution process. For each level, a coefficient map is produced by step 315 which ranks the coefficients by magnitude. The level having the coefficient map which best correlates to the input digital sample window (e.g., the "best coefficient map") is determined by the processor system 112 at step 315. Based on a threshold process, the highest magnitude coefficients of the best coefficient map (e.g., the "selected coefficients") are then output by step 315 and stored into a memory unit (e.g., 102, 103, or 104 of FIG. 2).

It is appreciated that typically the input sample window and the wavelets used for convolution are binary. In these cases, the present invention transformation at step 315 is particularly advantageous because convolution is performed by addition and subtraction instructions, rather than with process intensive multiplication instructions, due to the fact that the mother wavelet basis functions are represented by "1" and "−1." Since multiplication is not utilized during step 315, the present invention convolutions operate a high speed and are well suited for real-time applications.

At optional step 320 of FIG. 3 the present invention performs scalar and/or vector quantization to encode the selected coefficients into a form having a certain number of bits (e.g., y) that depends on the desired resolution of the RWR system 14. Step 320 is performed so that peak amplitude and leading edge position information is properly interpreted by the downstream processors. In some cases, step 320 is not required. At optional step 325, the present invention performs sorting of levels provided pulse-on-pulse processing is requested. During pulse-on-pulse processing, different levels processed at step 315 can individually represent a second detected pulse within the input sample window. As is well known with pulse on pulse conditions, the second detected pulse is typically congruent in time with the primary pulse. At step 325, these pulse-on-pulse conditions can be determined and isolated since both the primary and the secondary pulse survive the thresholding processes of the present invention. In this case, optional step 325 can be used to select an other best coefficient map of the coefficient maps generated in step 315; the other best coefficient map being used to represent the pulse-on-pulse condition. Wavelet transformations offers advantageous detection capability for pulse-on-pulse conditions due to the multiple resolution strategy offered by their multiple different frequency resolution levels.

Figure 7:
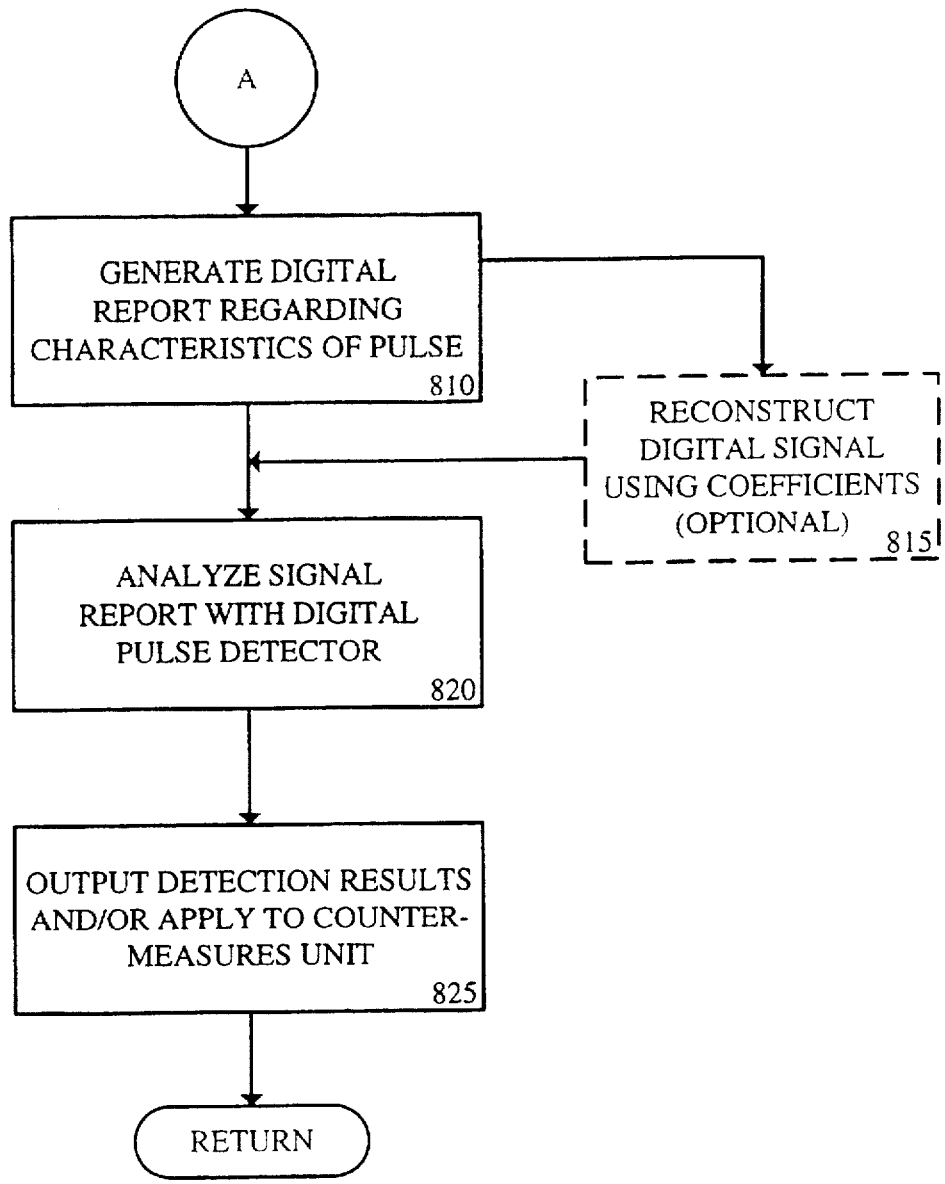
FIG. 7 is a flow diagram of steps of one exemplary embodiment of the present invention for using the denoising system of the present invention with a digital RWR analysis system.
Figure 8:
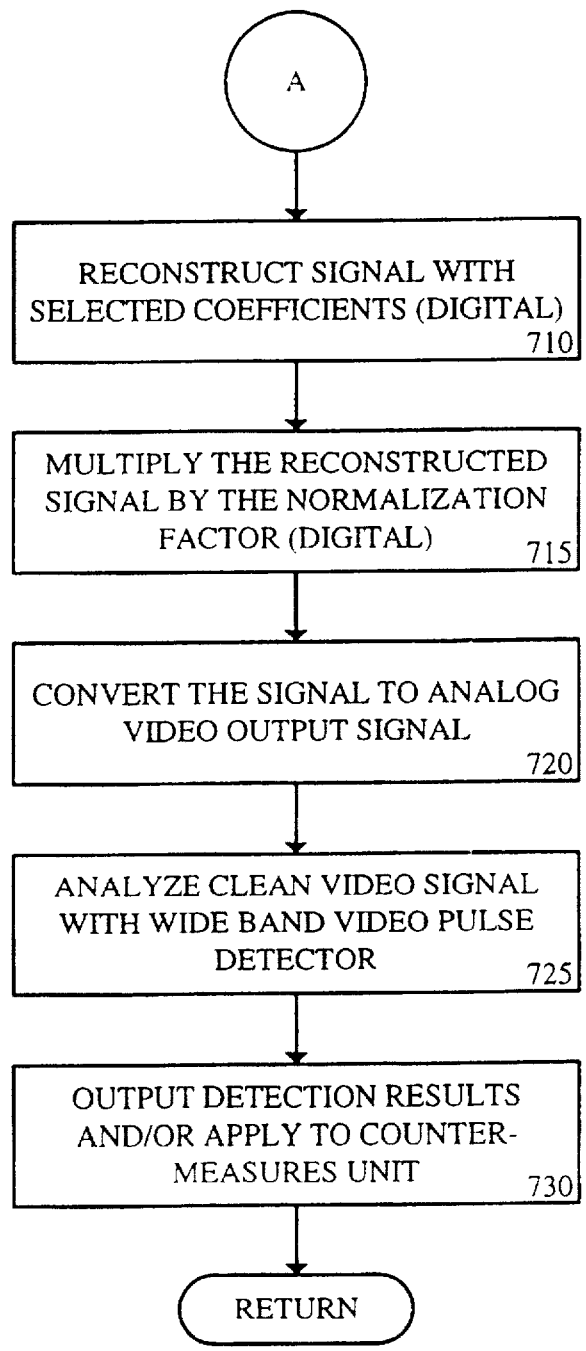
FIG. 8 is a flow diagram of steps of one exemplary embodiment of the present invention for reconstructing a denoised analog signal for application to a well known analog RWR pulse processor.

Depending on the embodiment of the present invention selected (as discussed with respect to FIG. 1), process 300 continues using different steps (a first embodiment is shown starting at FIG. 7 with a second embodiment being shown starting at FIG. 8). These embodiments are described in more detail further below.

WAVELET FORWARD TRANSFORMATION OF RWR INPUT SIGNAL

Figure 4:
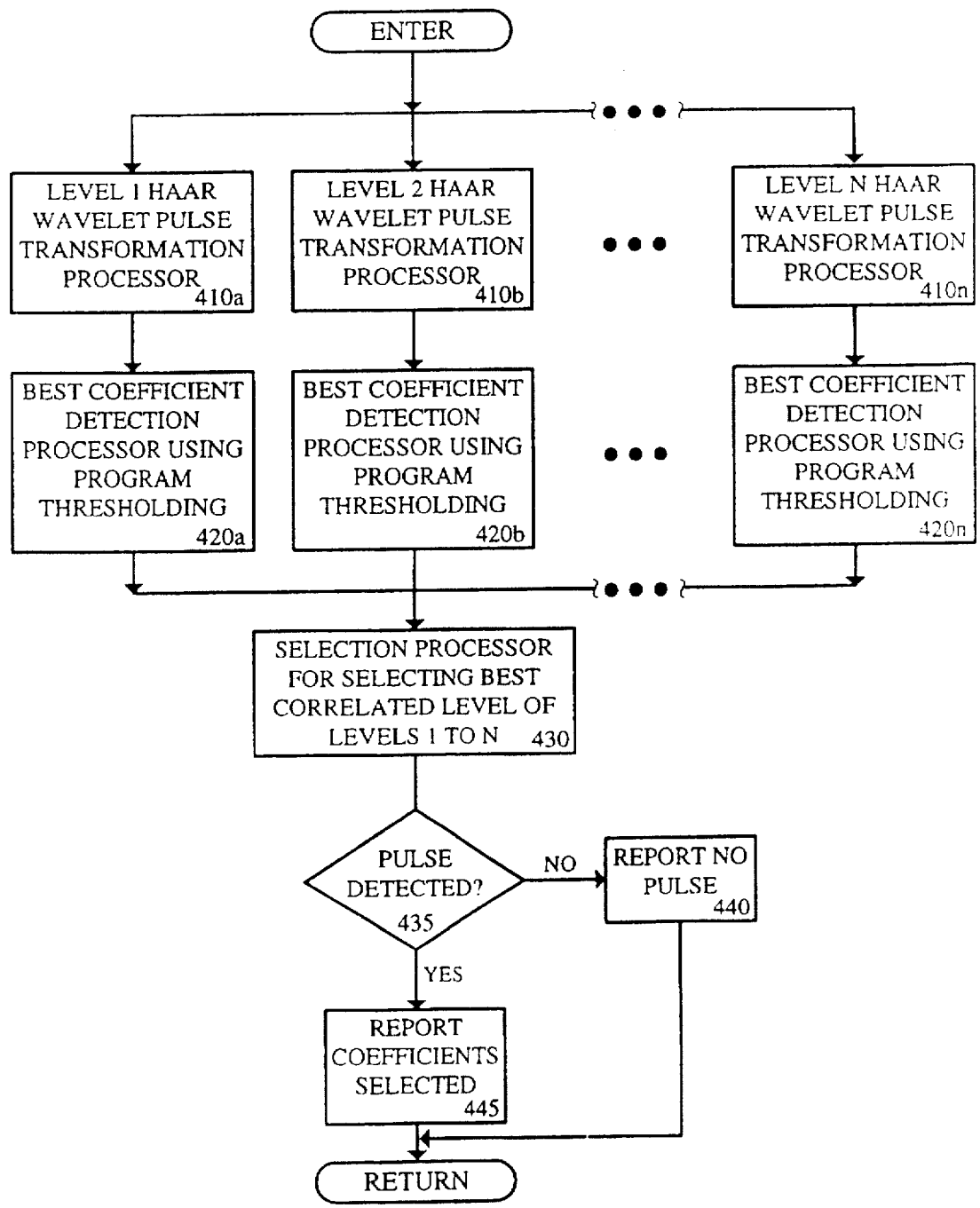
FIG. 4 is a flow diagram illustrating parallel processing steps of the present invention process for wavelet transformation and coefficient thresholding for multiple frequency resolution levels (e.g., 1 to n).

FIG. 4 is a flow diagram illustrating steps of process 315 of FIG. 3 in more detail. The steps of FIG. 4 can be realized by individual hardware processor units, or alternatively, can be realized by software code executed by processor 101 within processor system 112 and stored in computer readable memories 102, 103 and/or 104. As shown in FIG. 4, the wavelet transformation process 315 of the present invention is distributed across different frequency resolution levels (e.g., level 1 to level n) simultaneously via steps 410a through 410n which each step processing a different frequency resolution level. Steps 410a through 410n are performed simultaneously by parallel processors. Each frequency resolution level offers a different frequency and time resolution convolution with the input sample window. The larger the wavelet basis function, the better its frequency resolution is and the smaller the wavelet basis function, the better its time resolution is.

Within each frequency resolution level, wavelet basis functions of the same frequency resolution are used. The steps of an example process 410a are shown in more detail in FIG. 5A, however, each step of 410a–410n utilizes the same subprocesses. Within step 510, the discrete sample points (e.g., x sample points) of an input signal window are convolved using discrete convolution and decimation with selected wavelet basis functions so that x coefficients are generated for each of the n levels. Each level contains $2^n$ different wavelet basis functions, each wavelet basis function corresponds to an individual frequency band within its level. Assuming x data sample points per sample window, each frequency band within a level r (r=<n) contains $x/(2^r)$ coefficients; therefore, each frequency band contains $x/(2^r)$ time segments for a level r. Therefore, for a wavelet basis function that is k times smaller than the input sample window, the wavelet is convolved across k equally spaced time segments of the input signal window. As the coefficients are determined, they are time stamped with the time segment of the sample window to which they correspond. It is appreciated that within step 510, coefficients corresponding to a given frequency band (e.g., SSS1–SSS4) of a given level n can be determined simultaneously with coefficients corresponding to a different frequency band (e.g., SDS1–SDS4) of same level n.

Figures 6A, 6B, 6C:
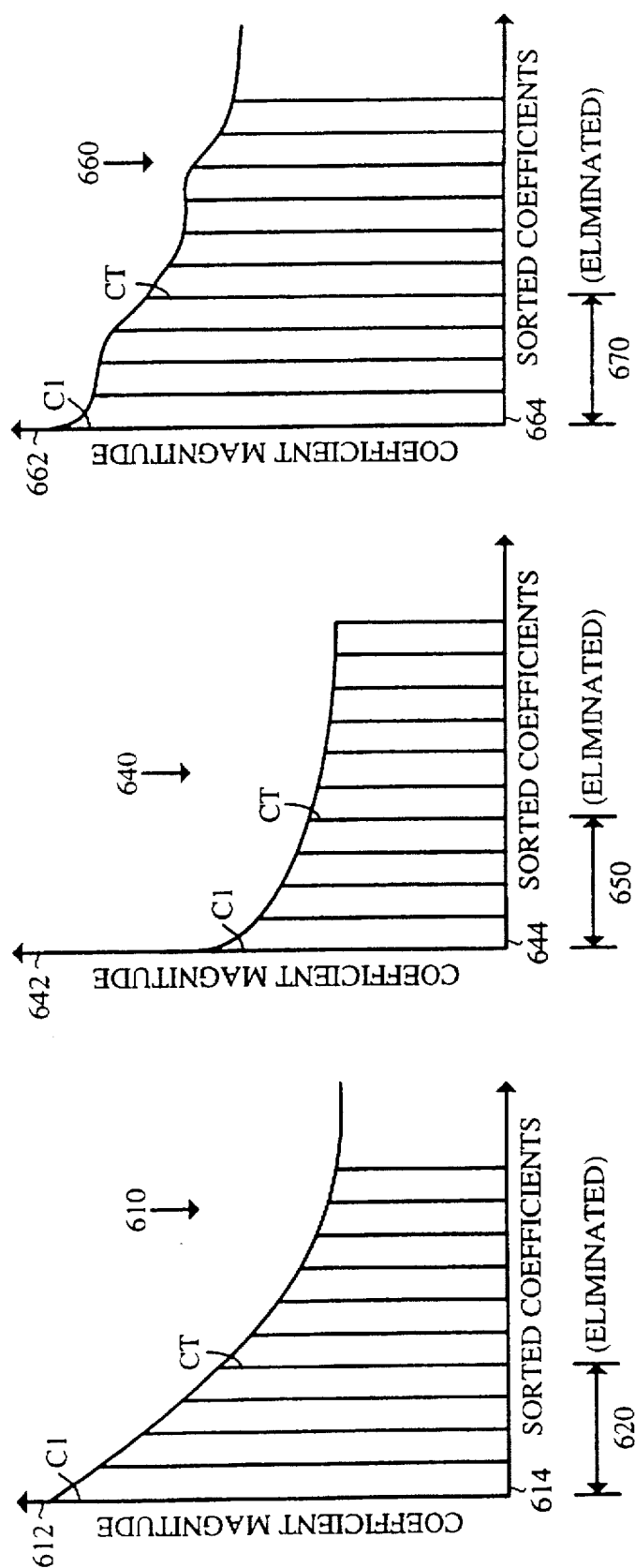
FIGS. 6A, 6B, and 6C represent exemplary coefficient maps produced by wavelet transformation processes for three exemplary frequency resolution levels in accordance with the present invention.

At step 520, the present invention then ranks the coefficients by order of magnitude for each of the n levels which generates a coefficient map for each of the n levels. FIGS. 6A, 6B and 6C illustrate three exemplary coefficient maps 610, 640 and 660 respectively. As shown, the coefficients are ranked from the left to right by order of their respective magnitudes. The coefficient magnitude is shown along the vertical axis 612, 642 and 662, for FIGS. 6A, 6B and 6C, respectively, and the coefficient sort order is shown along the vertical axis 614, 644 and 664, respectively.

Shown as steps 420a through 420n of FIG. 4, for each of the n levels, the present invention also performs a thresholding process to select the coefficients of each level having magnitudes larger than a determined threshold value that is computed for each level. Steps 420a through 420n are processed simultaneously by parallel processors and receive the outputs generated by steps 410a to 410n, respectively. The threshold value is determined as shown by step 530 of FIG. 5B. FIG. 6A, FIG. 6B and FIG. 6C illustrates that step 420a through 420n select coefficients within the threshold ranges 620, 650 and 670, respectively, with CT being the coefficient located at the threshold position. It is appreciated that the thresholding performed at steps 410a through 410n can be performed based on a fixed magnitude value or, preferably, is based on a relative coefficient magnitude based on the maximum magnitude of the coefficient map for that level. The later thresholding embodiment of the present invention utilizes the below relationship for thresholding:

$$\frac{C1 - CT}{C1} = M\%$$

where, for a particular coefficient map, C1 is the maximum magnitude coefficient and CT is the coefficient at the threshold point. In one embodiment, M is approximately between 10 and 30 percent, but is a programmable value depending on the expected characteristics of the input signal to be transformed. At step 535 of FIG. 5B, once a threshold coefficient CT is selected, all coefficients of that coefficient map within the threshold are recorded into computer readable memory (e.g., 102, 103 or 104) while the remaining coefficients are excluded. In this case, the coefficients falling outside of the threshold range (e.g., 620, 650, and 670) most probably correspond to signal noise which does not correlate well to the wavelet basis functions of the present invention and therefore will not be well represented by coefficient magnitudes. At the completion of step 535 of steps 420a through 420n, the present invention (for each individual level) generates a set of coefficients that effectively packages the signal energy represented by the sample points of the input signal window based on the basis functions for each level.

At step 430 of FIG. 4, the present invention then selects the frequency resolution level having the best correlated coefficient map to the input signal window, this is the best coefficient map. The thresholded coefficients of the best coefficient map most effectively package the signal energy of the input signal window of all frequency resolution levels. Step 430 can be performed by analyzing the coefficient maps generated by steps 410a through 410n for the coefficient map having the sharpest drop-off of ranked coefficients (e.g., having the largest derivative of coefficient magnitudes over the sort order). Preferably, the drop-off point to be analyzed by step 430 is close to the threshold coefficient (CT) determined by steps 420a–420n.

By having a sharp drop-off point near the threshold coefficient, the best coefficient map determined by step 430 illustrates that the wavelet basis functions of the corresponding level efficiently correlate to the input signal window by packaging the sample points using only a relatively small number of basis functions. Using the coefficients maps 610, 640 and 660 shown in FIGS. 6A, 6B and 6C as examples, coefficient map 610 offers the sharpest drop-off near the threshold coefficient (CT), therefore, step 430 selects coefficient map 610 as the best coefficient map. It is appreciated that a number of well known techniques and processes can be used at step 430 for selecting the coefficient map having the sharpest drop-off value near the threshold coefficient. At step 430, the present invention then records those coefficients that are within the previously determined threshold range for the best coefficient map and zeros all remaining coefficients of that level.

It is appreciated that, alternatively, step 430 can be performed in advance of steps 420a through 420n. In this alternative embodiment of the present invention, thresholding needs only to be performed once on the coefficient map selected by step 430. However, under this alternative embodiment, step 430 does not have the advantage of searching for a sharp drop-off near the threshold coefficient (CT) because the threshold coefficients (determined at steps 420a–420n) have not yet been determined.

At step 435 of FIG. 4, the present invention analyzes the coefficient map selected by step 430 to determine if a pulse has been detected at all. In certain cases where the sharpest drop-off of the coefficient map is rather minimal (e.g., the selected coefficient map is flat), the present invention determines that no pulse is recognized and the input sample window contains all noise. This case is shown in FIG. 6B where the coefficient map 640 is flat. If no pulse is detected at step 435, the present invention at step 440 reports that no pulse is detected within the current sample window and process 315 returns. At step 435, if a pulse is detected (e.g., the drop-off value of the selected coefficient map is significantly sharp), then at step 445 the present invention reports the coefficients (and their magnitudes) within the threshold range (e.g., range 620) of the best coefficient map selected by step 430 and process 315 returns.

What follows are two transformation embodiments (x=4, n=2 and x=32, n=5) to illustrate transformation 315 in more detail. It is appreciated that the scope of the present invention is not limited to these exemplary embodiments. For instance, the embodiment with x=32 and n=5 implicitly teaches transformation with 5, 4, 3, 2, and 1 frequency resolution levels with x=32, or x=16, or x=8, or x=4, or x=2, as applicable. Further, by extension of the convolution processes taught within these two examples, one of ordinary skill in the art can readily derive convolution processes for levels greater than 5 and for sample windows of more than 32 sample points.

WAVELET TRANSFORMATION EMBODIMENT I. CONVOLUTION WITH x=4, N=2

The steps of process 315 are described with reference to an example convolution and decimation transformation for an embodiment where the input signal window contains four sample points (e.g., x=4) and there are two frequency resolution levels (e.g., n=2). Each frequency resolution level contains 4 transformation coefficients and each frequency band of frequency resolution level 1 contains two time segments. These coefficients are summarized in the Table I below along with the number of time segments located within each frequency band per level.

TABLE I

| Level | Time Segments | Coefficients |
| --- | --- | --- |
| 1 | 2 | D1–D2, S1–S2 |
| 2 | 1 | DD1, SD1, DS1, SS1 |

Figure 10A:
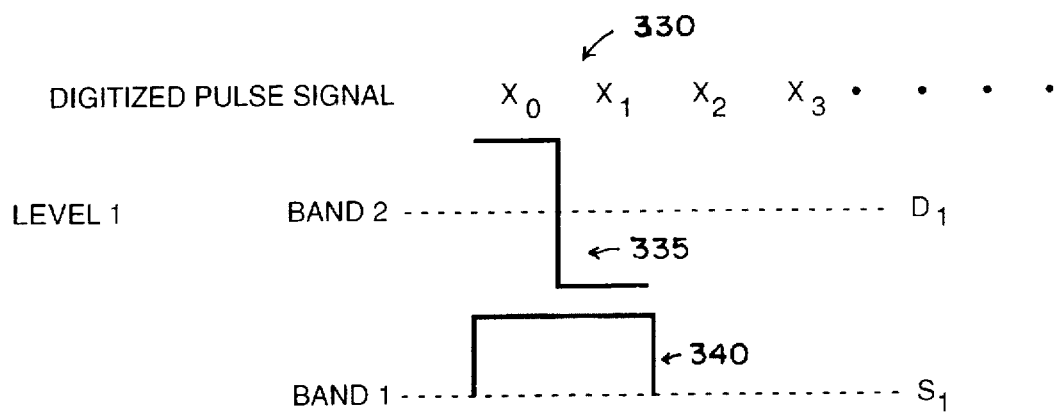
FIG. 10A illustrates two wavelet basis functions applied to a first time segment for frequency resolution level 1, in accordance with the present invention, for an embodiment having a signal window of four sample points (x=4).
Figure 10B:
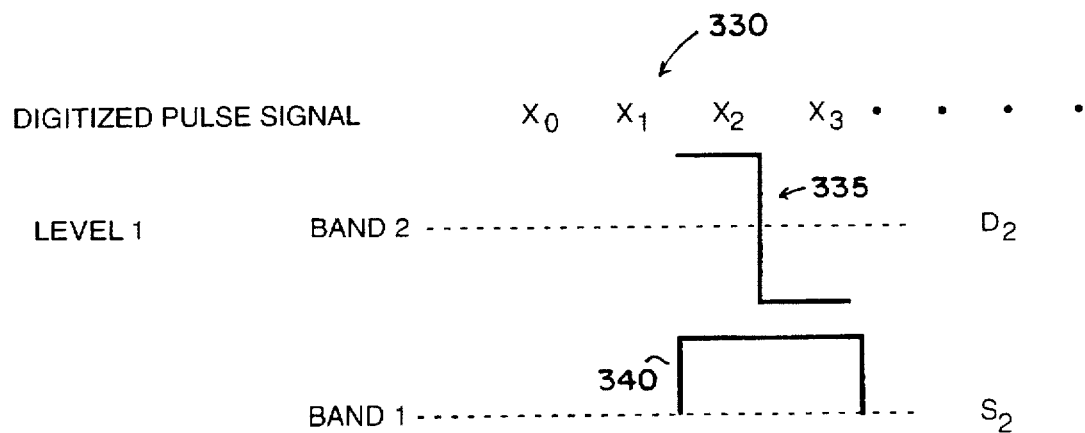
FIG. 10B illustrates two wavelet basis functions applied to a second time segment for frequency resolution level 1, in accordance with the present invention, for an embodiment having a signal window of four sample points (x=4).

Wavelet Basis Functions. FIG. 10A illustrates a sample signal window 330 containing X0, X1, X2, and X3 sample points, as well as a first wavelet basis function 335 located at a first time segment for high frequency band of level 1 and a second wavelet basis function 340 located at the first time segment for low frequency band of level 1. FIG. 10B illustrates the wavelet basis function 335 located at a second time segment along the sample window 330 and the wavelet basis function 340 located at the second time segment along the sample window 330. Within level 1, wavelet basis functions 335 and 340 are convolved with the sample points of window 330 at the two time positions shown in FIG. 10A and FIG. 10B to generate a set of four coefficients. At the time segment, functions 335 and 340 produce coefficients D1 and S1, respectively, (FIG. 10A) and at the second time segment, functions 335 and 340 produce coefficients D2 and S2, respectively, (FIG. 10B). Therefore, the transformation of level 1 provides both frequency and time information. Basis functions 335 and 340 contain either a "1" value or a "–1" value.

Figure 10C:
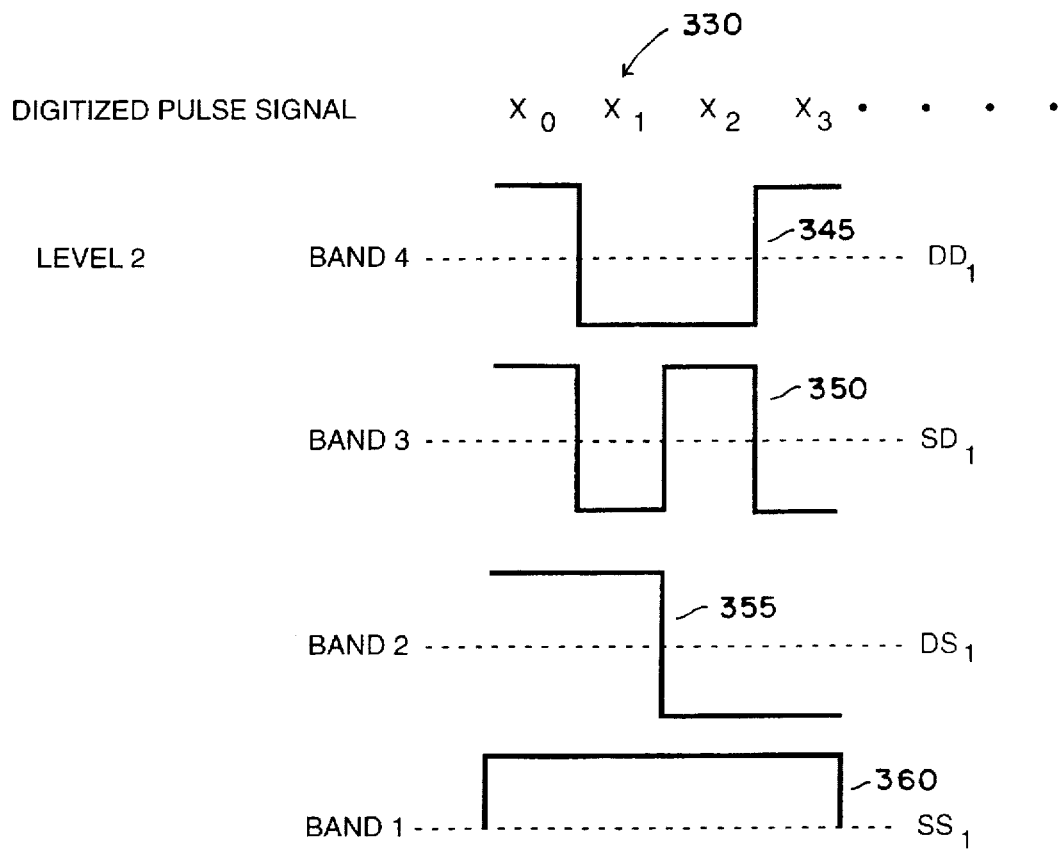
FIG. 10C illustrates four wavelet basis functions for frequency resolution level 2, in accordance with the present invention, for an embodiment having a signal window of four sample points (x=4).

FIG. 10C illustrates the wavelet basis functions for level 2 for the present embodiment. From highest frequency to lowest frequency, the wavelet basis functions are 345, 350, 355, and 360, which when convolved with the input sample window 330, produce level 2 coefficients of DD1, SD1, DS1, and SS1, respectively. In level 2, the high frequency band of level 1 is divided into two bands using wavelet basis functions 345 and 350 while the low frequency band of level 1 is divided into bands using two wavelet basis functions 355 and 360. Level 2 therefore provides better frequency resolution over level 1, however, offers reduced time resolution because the four wavelet basis functions span the entire input sample window 330. Basis functions 345, 350, 355, and 360 contain either a "1" value or a "–1" value.

Figure 11A:
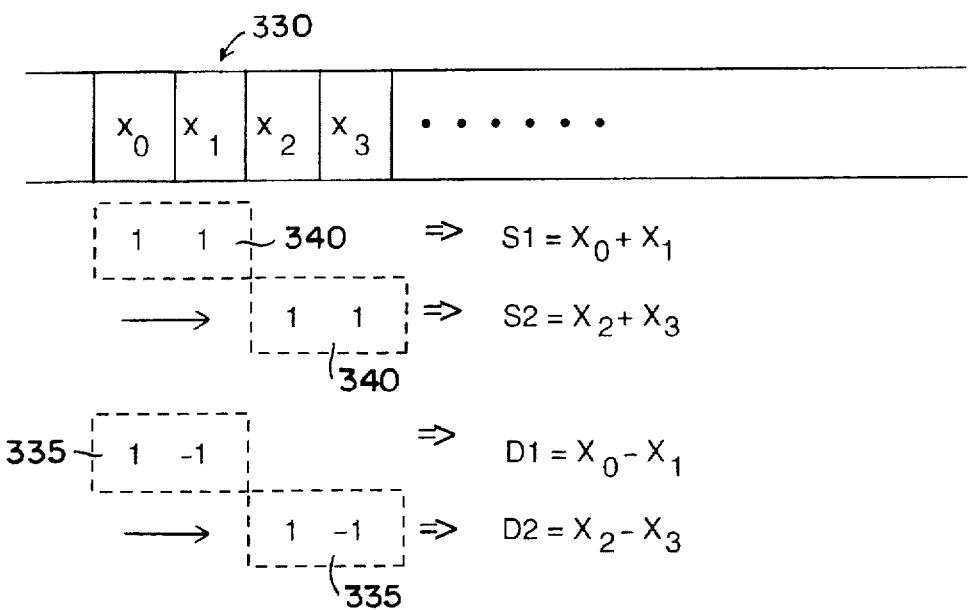
FIG. 11A illustrates a discrete convolution procedure with decimation convolving the 2 wavelet basis functions of frequency resolution level 1 across two time segments of the input sample window to arrive at the 4 level 1 coefficients of the present invention.
Figure 11B:
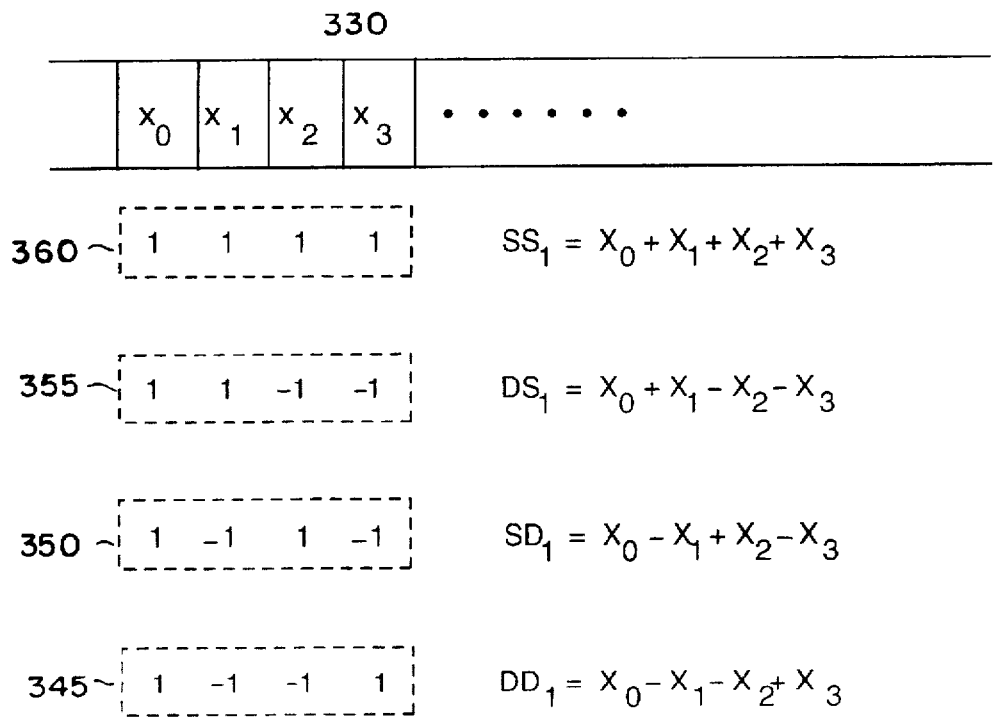
FIG. 11B illustrates a discrete convolution procedure with decimation convolving the 4 wavelet basis functions of frequency resolution level 2 with the input sample window to arrive at the 4 level 2 coefficients in accordance with the present invention.

Level 1 Convolution. FIGS. 11A and 11B illustrate the convolution and decimation processes performed by step 410a of FIG. 4 for level 1 with an input sample window having 4 sample points (ignoring normalization factors). Low frequency band wavelet basis function 340 (represented by "1 1") is convolved with X0 and X1 of sample window 330 using discrete multiplication to produce coefficient S1 as:

$$S1=X0+X1.$$

Basis function 340 is then shifted by two data points (decimation) to the second time segment and convolved with X2 and X3 of sample window 330 using discrete multiplication to arrive at the second low frequency coefficient S2 as:

$$S2=X2+X3.$$

S1 and S2 represent two different time segments of the low frequency band of level 1. High frequency band wavelet basis function 335 (represented by "1 –1") is convolved with X0 and X1 of sample window 330 using discrete multiplication to produce coefficient D1 as:

$$D1=X0-X1.$$

Basis function 335 is then shifted by two data points (decimation) to the second time segment and convolved with X2 and X3 of sample window 330 using discrete multiplication to arrive at the second high frequency coefficient D2 as:

$$D2=X2-X3.$$

D1 and D2 represent two different time segments of the high frequency band of level 1. S1 and D1 are time stamped to correspond to the first time segment (e.g., the time position of X0 and X1 of FIG. 10A) while S2 and D2 are time stamped to correspond to the second time segment (e.g., the time position of X2 and X3 of FIG. 10B). The coefficients S1, S2, D1 and D2 are determined within the present invention based on the above relationships. Since the values involved are each binary, addition and subtraction instructions are executed and multiplication instructions are avoided.

Level 2 Convolution. FIG. 11B illustrates the convolution processes performed by step 410b of FIG. 4 for level 2 with an input sample window having 4 sample points (ignoring normalization factors). Lowest frequency band wavelet basis function 360 (represented by "1 1 1 1") is convolved with X0, X1, X2, and X3 of sample window 330 using discrete multiplication to produce coefficient SS1 of level 2 as:

$$SS1=X0+X1+X2+X3.$$

Low frequency band wavelet basis function 355 (represented by "1 1 –1 –1") is convolved with X0, X1, X2, and X3 of sample window 330 using discrete multiplication to produce coefficient DS1 of level 2 as:

$$DS1=X0+X1-X2-X3.$$

High frequency band wavelet basis function 350 (represented by "1 –1 1 –1") is convolved with X0, X1, X2, and X3 of sample window 330 using discrete multiplication to produce coefficient SD1 of level 2 as:

$$SD1=X0-X1+X2-X3.$$

Highest frequency band wavelet basis function 345 (represented by "1 –1 –1 1") is convolved with X0, X1, X2, and X3 of sample window 330 using discrete multiplication to produce coefficient DD1 of level 2 as:

$$DD1=X0-X1-X2+X3.$$

As with the level 1 coefficients, the coefficients of level 2 are determined by the present invention without resort to multiplication instructions but rather use addition and subtraction instructions. In this example where x=4 and n=2, all of the level 2 coefficients have the same time segment.

It is appreciated that given the input sample window 330, each of the above four coefficients for level 1 and each of the above four coefficients for level 2 are simultaneously computed by the present invention at steps 410a and 410b of FIG. 4.

After computing the above 4 coefficients for level 1 and the 4 coefficients for level 2, the present invention at steps 420a and 420b (FIG. 4) computes a coefficient map for level 1 and for level 2, respectively. At step 420a, based on a predetermined thresholding percentage (M), the present invention determines the coefficients of level 1 having the magnitudes within the threshold. At step 420b, based on the predetermined thresholding (M), the present invention determines the coefficients of level 2 having the magnitudes within the threshold. At step 430, the present invention then determines which coefficient map of level 1 or level 2 has a coefficient order with a sharper drop-off of coefficient magnitude. At step 430, the determined coefficients having the largest magnitude of the best coefficient map are recorded into computer readable memory.

WAVELET TRANSFORMATION EMBODIMENT II. CONVOLUTION WITH x=32, N=5

Figure 20A:
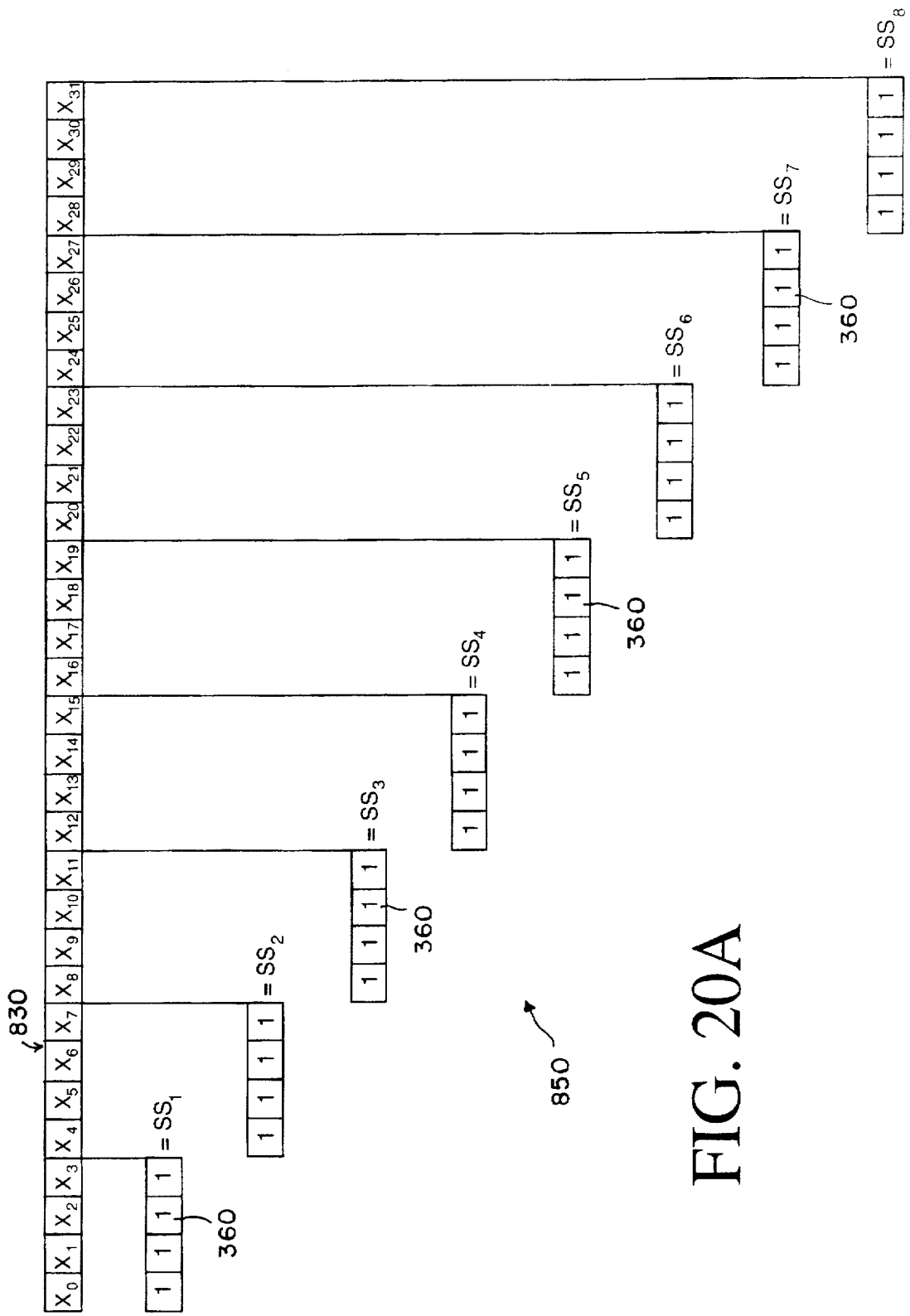
FIGS. 20A, 20B, 20C and 20D illustrate four discrete convolution and decimation processes performed by the present invention to arrive at the 32 coefficients of the frequency resolution level 2, based on an input signal sample window within an embodiment where x=32.
Figure 20B:
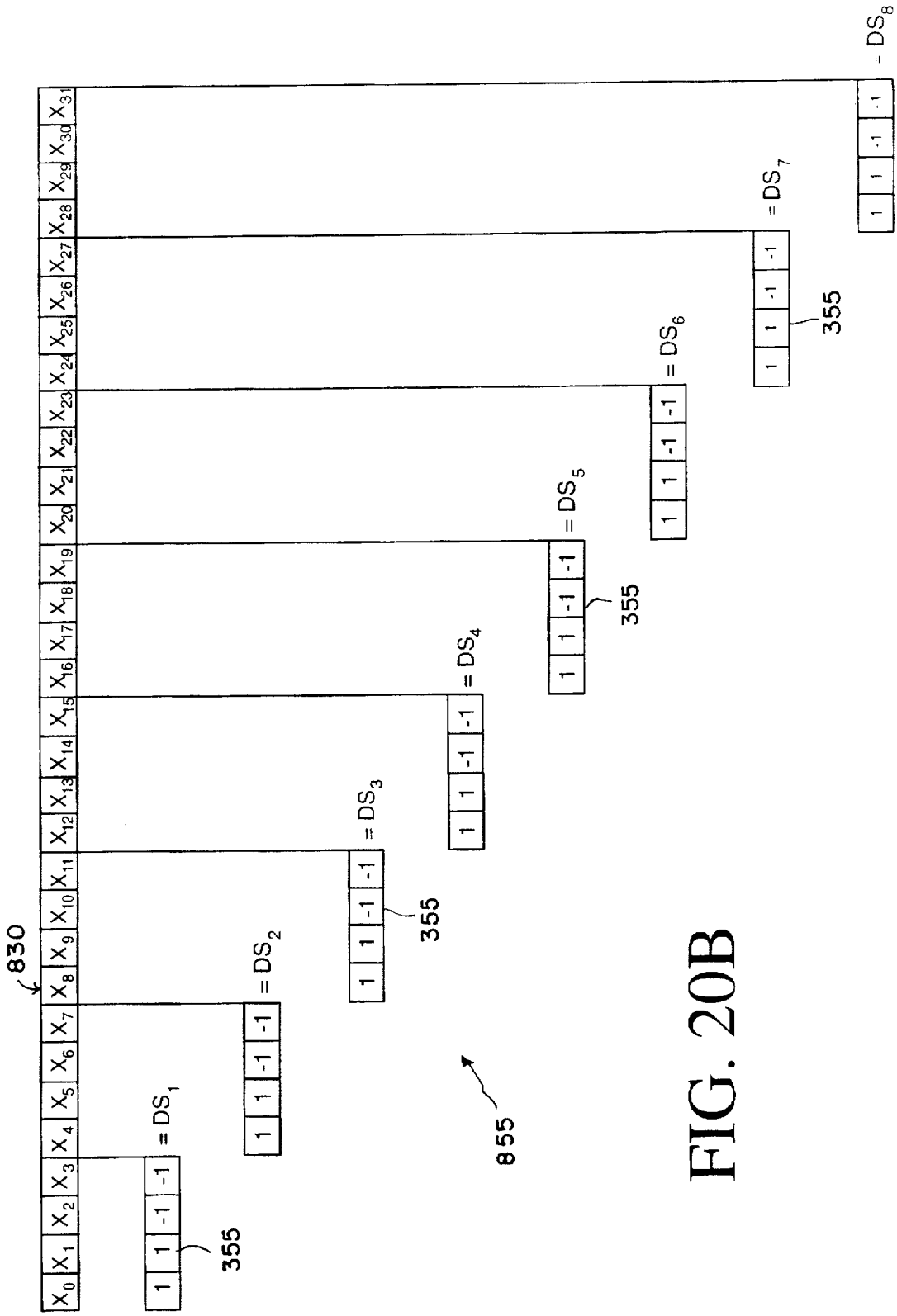
Figure 20C:
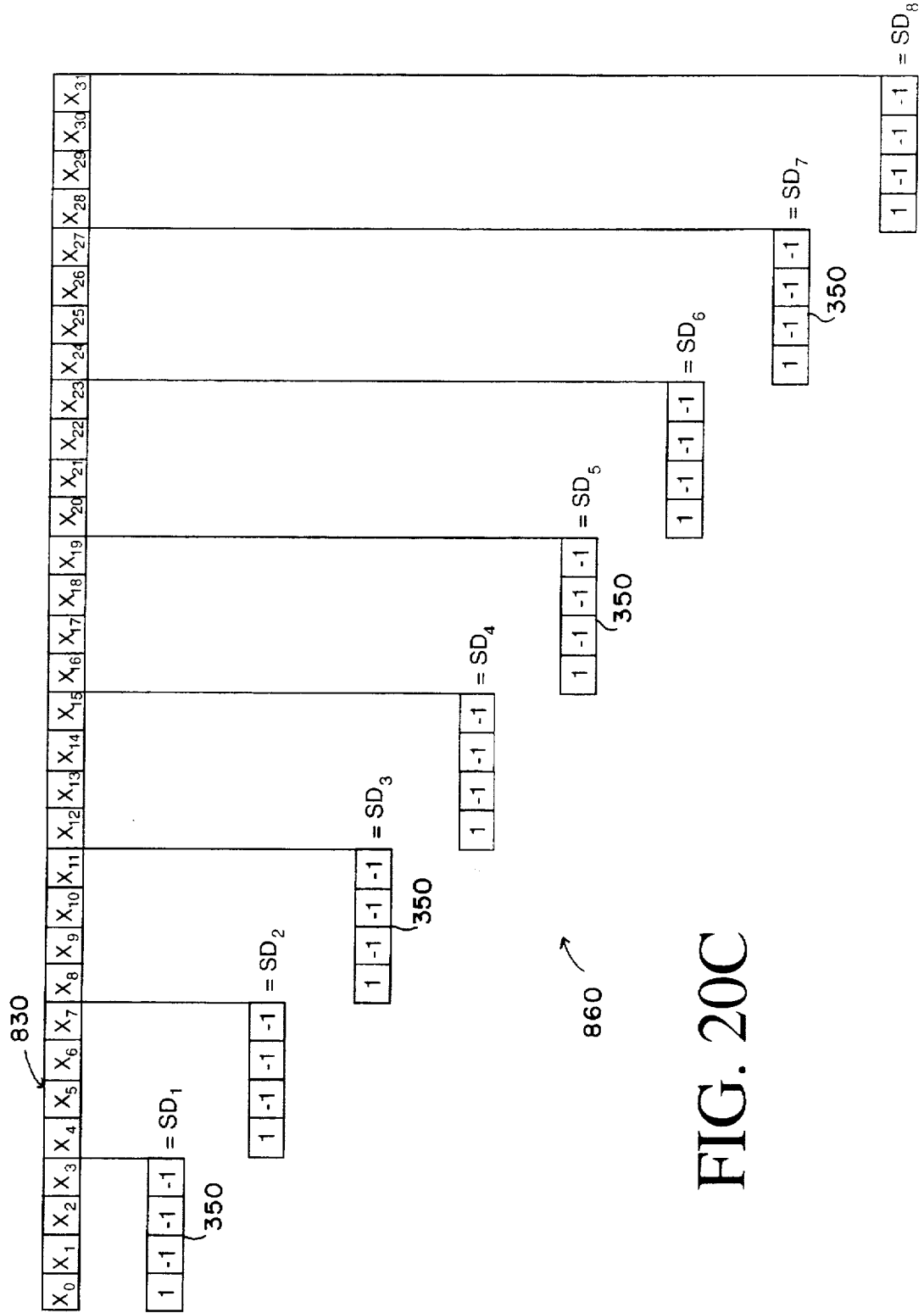
Figure 20D:
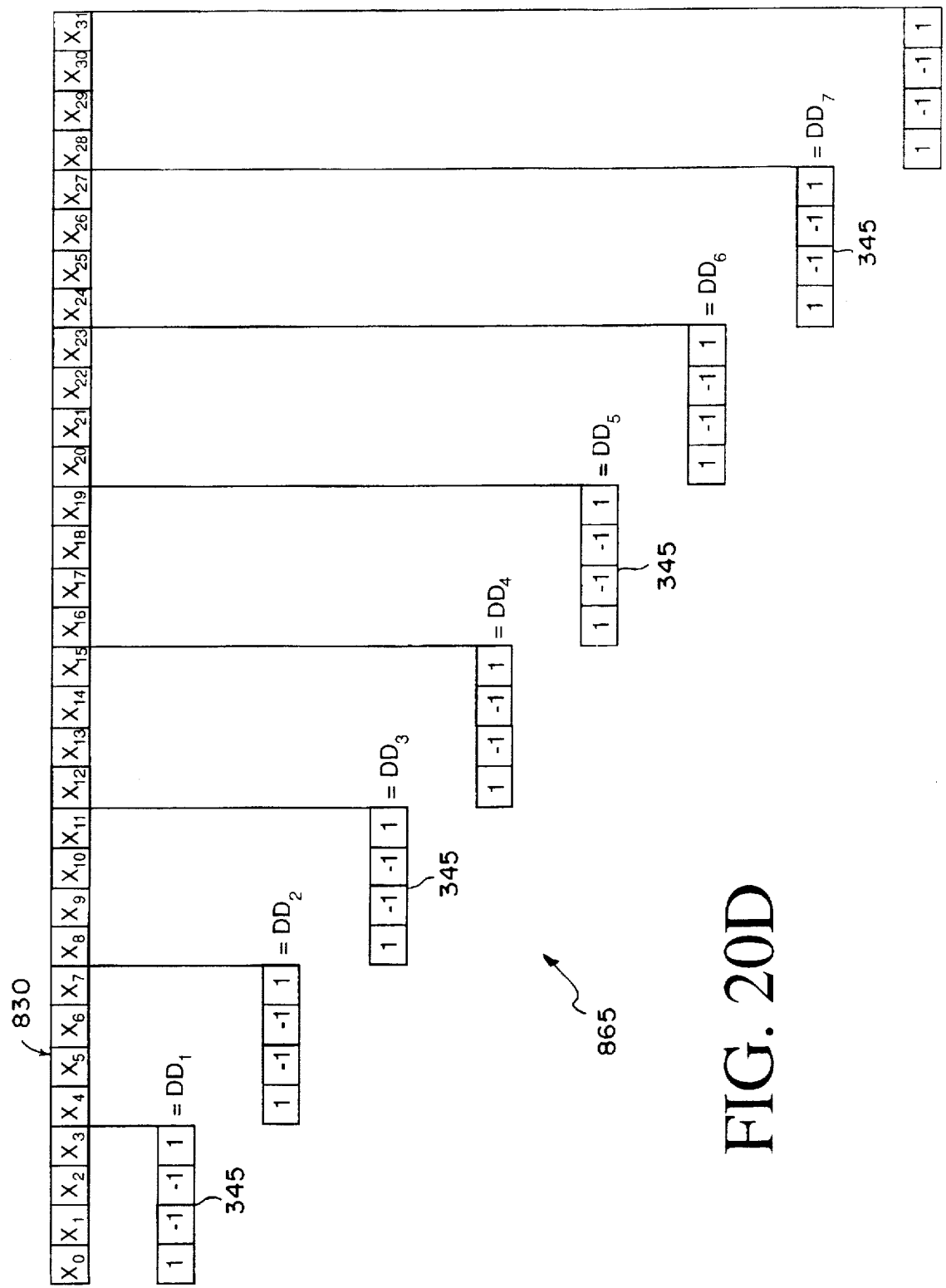

The steps of process 315 are described with reference to an example convolution and decimation transformation for an embodiment where the input signal window contains 32 sample points (e.g., x=32) and there are five frequency resolution levels (e.g., n=5). Each frequency resolution level contains 32 transformation coefficients. These coefficients are summarized in the Table II below along with the number of time segments located within each frequency band of each level.

frequency) for level 2 of the above transformation example. High band functions are 345 and 350 and low band functions are 355 and 360. As shown by the process 850 of FIG. 20A, within step 410b of the present invention, basis function 360 is shifted by four data points across the 32 data point sample window 830 (e.g., over 8 time segments). At each time segment position, the wavelet basis function 360 is multiplied by 4 sample points of sample window 830 to arrive at each coefficient of SS1–SS8 of the low frequency band of level 1 of Table II. For instance, SS7=X24+X25+X26+X27. Similarly, as shown by the convolution processes 855, 860, and 865 of FIGS. 20B, 20C, and 20D, respectively, within step 410b of the present invention, basis functions 355, 350, and 345 are individually shifted along individual 4 data point time segments and at each segment is convolved with 8 data points of sample window 830 to produce the remaining frequency band coefficients DS1–DS8, SD1–SD8, and DD1–DD8, respectively, of Table II using discrete convolution and decimation. The above convolution procedures 850, 855, 860, and 865 generate 32 coefficients for level 2. It is appreciated that while level 2 offers twice the frequency

TABLE II

| Level | | Time Segs | Coefficients |
|---|---|---|---|
| 1 | | 16 | D1–D16, S1–S16 |
| 2 | | 8 | DD1–DD8, SD1–SD8, DS1–DS8, SS1–SS8 |
| 3 | | 4 | DDD1–DDD4, SDD1–SDD4, DSD1–DSD4, SSD1–SSD4 DDS1–DDS4, SDS1–SDS4, DSS1–DSS4, SSS1–SSS4 |
| 4 | (HIGH) (BANDS) | 2 | DDDD1–DDDD2, SDDD1–SDDD2, DSDD1–DSDD2, SSDD1–SSDD2, DDSD1–DDSD2, SDSD1–SDSD2, DSSD1–DSSD2, SSSD1–SSSD2 |
| 4 | (LOW) (BANDS) | 2 | DDDS1–DDDS2, SDDS1–SDDS2, DSDS1–DSDS2, SSDS1–SSDS2, DDSS1–DDSS2, SDSS1–SDSS2, DSSS1–DSSS2, SSSS1–SSSS2 |
| 5 | (HIGH) (BANDS) | 1 | DDDDD1, SDDDD1, DSDDD1, SSDDD1, DDSDD1, SDSDD1, DSSDD1, SSSDD1, DDDSD1, SDDSD1 DSDSD1, SSDSD1, DDSSD1, SDSSD1, DSSSD1 SSSSD1 |
| 5 | (LOW) (BANDS) | 1 | DDDDS1, SDDDS1, DSDDS1, SSDDS1, DDSDS1, SDSDS1, DSSDS1, SSSDS1, DDDSS1, SDDSS1 DSDSS1, SSDSS1, DDSSS1, SDSSS1, DSSSS1, SSSSS1 |

Figure 14:
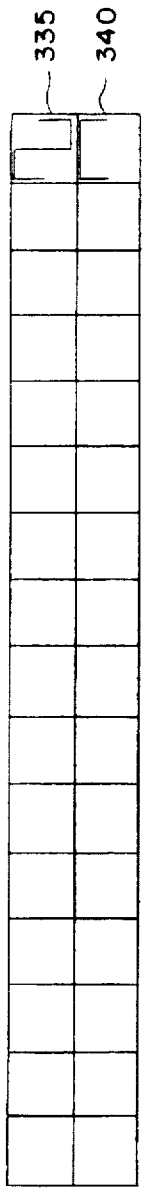
FIG. 14 illustrates the waveforms for the two wavelet basis functions (1 high, 1 low band) for the frequency resolution level 1 within an embodiment of the present invention where x=32.
Figure 19A:
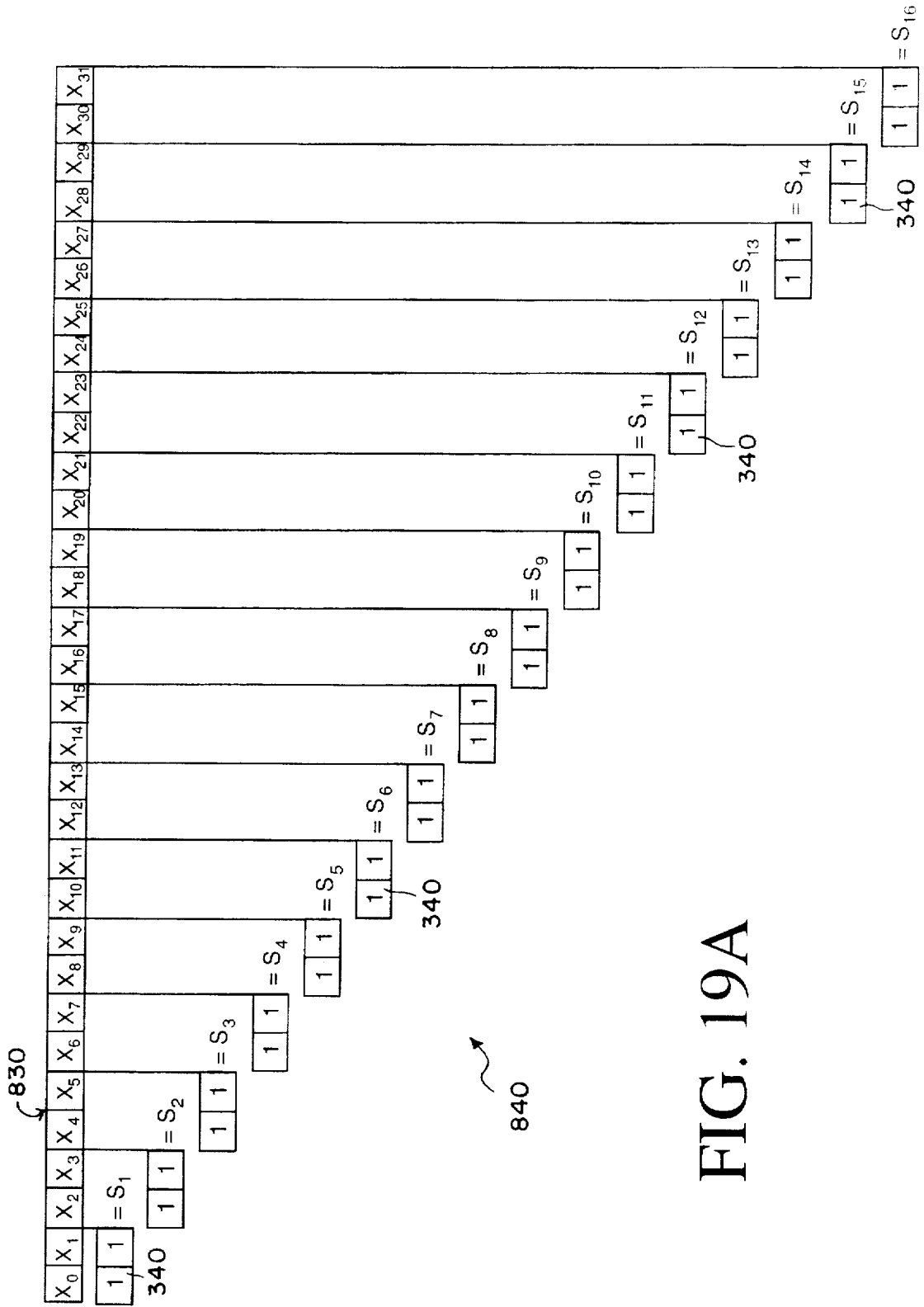
FIGS. 19A and 19B illustrate two discrete convolution and decimation processes performed by the present invention to arrive at the 32 coefficients of the frequency resolution level 1, based on an input signal sample window within an embodiment where x=32.
Figure 19B:
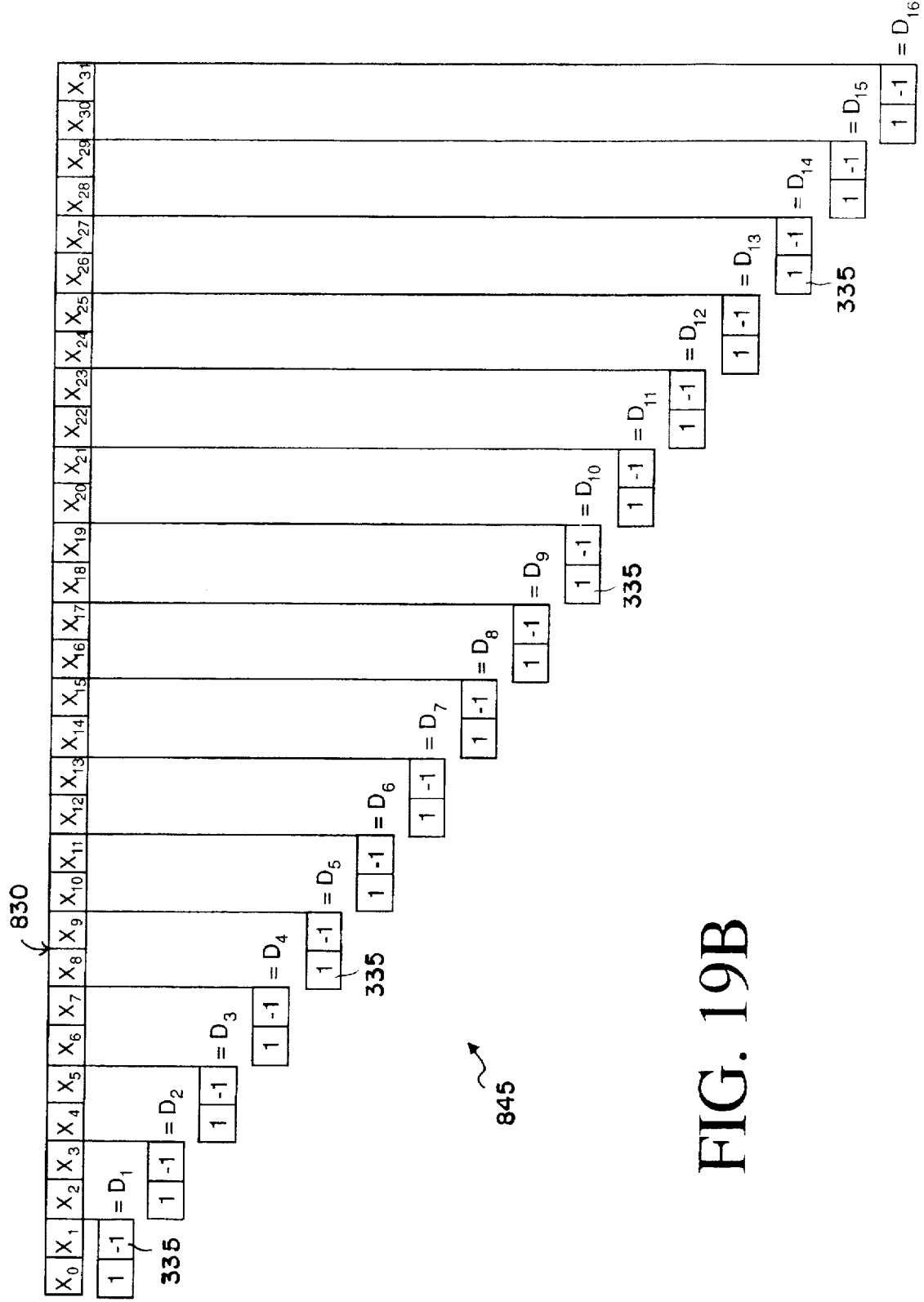

FIG. 14 illustrates the high 335 and low 340 frequency band wavelet basis functions of the first level according to the above transformation example. As shown by the process 840 of FIG. 19A, within step 410a of the present invention, basis function 340 is shifted by two data points across the 32 data point sample window 830 (e.g., over 16 time segments). At each time segment position, the wavelet basis function 340 is multiplied by 2 sample points of sample window 830 to arrive at each coefficient of S1–S16 of the low frequency band of level 1. To illustrate the syntax of FIG. 19A, S11=X20+X21; the other 15 coefficients are computed analogously. FIG. 19B illustrates convolution/decimation procedure 845 performed by step 410a for level 1 where the 16 coefficients D1–D16 of the high frequency band of level 1 are computed based on shifting high frequency wavelet basis function 335 across the 16 time segments of input sample window 830 in manner analogous to FIG. 19A. To illustrate the syntax of FIG. 19B, D11=X20–X21; the other 15 coefficients are computed analogously. Level 1 of this example yields a time resolution of 16 time segments, each two sample points in duration. The above convolution procedures 840 and 845 generate 32 coefficients for level 1 with a time resolution of 16 time segments for each of the two frequency bands.

Figure 15:
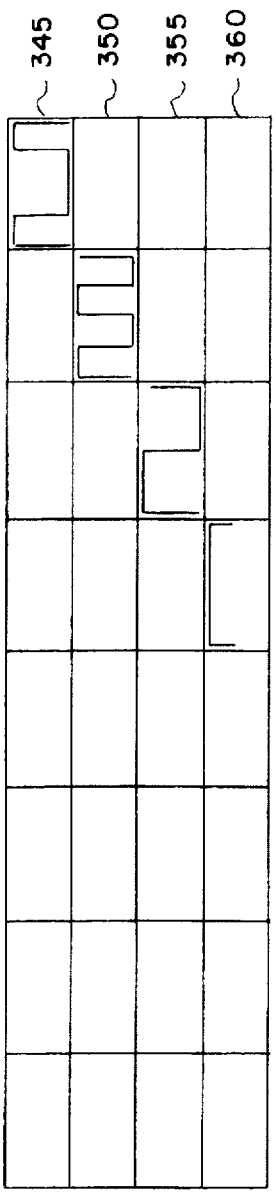
FIG. 15 illustrates the waveforms for the 4 wavelet basis functions (2 high, 2 low band) for the frequency resolution level 2 within an embodiment of the present invention where x=32.

FIG. 15 illustrates the frequency band wavelet basis functions 345, 350, 355, and 360 (from highest to lowest resolution over level 1, level 1 offers twice the time resolution over level 2 (e.g., level 1 has 16 time segments while level 2 has only 8 time segments for each frequency band; and level 2 has four frequency bands while level 1 has two frequency bands).

Figure 16:
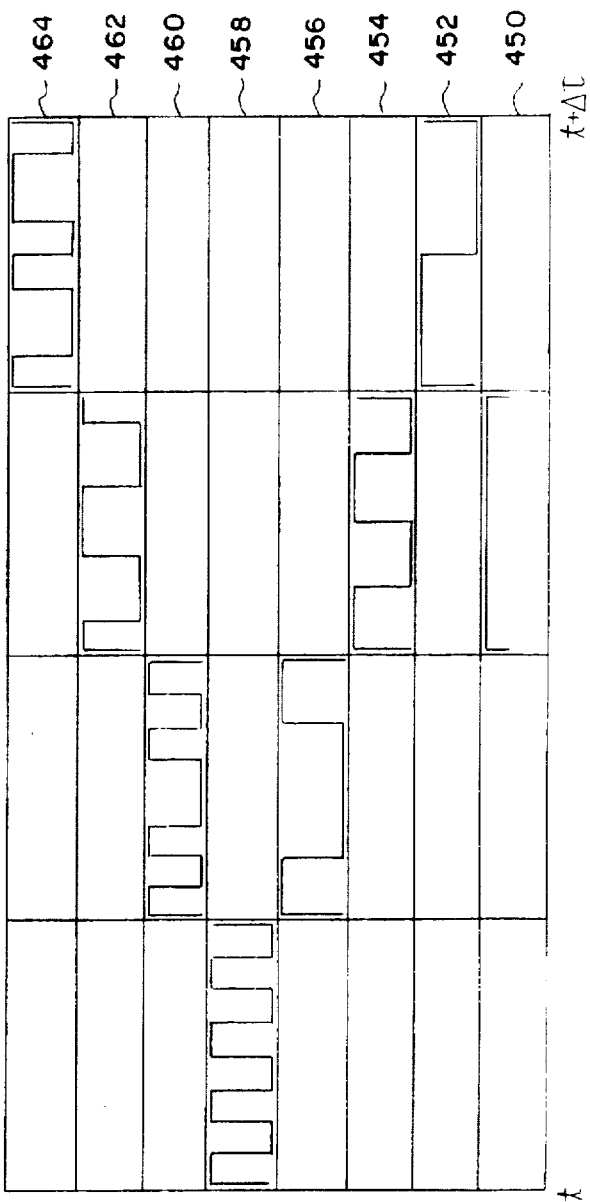
FIG. 16 illustrates the 8 waveforms for the wavelet basis functions (4 high, 4 low band) for the frequency resolution level 3 within an embodiment of the present invention where x=32.

FIG. 16 illustrates the eight frequency band wavelet basis functions 464, 462, 460, 458, 456, 454, 452, and 450 (from highest to lowest frequency) for level 3 of the above transformation example. High band functions are 464, 462, 460, and 458 and low band functions are 456, 454, 452, and 450. Therefore, level 3 contains eight frequency bands, each band having four coefficients and four time segments. As shown by the convolution process 870 of FIG. 21A, within step 410c of the present invention (although not shown in FIG. 4, step 410c is analogous to step 410b but applicable to level 3 convolution), basis function 450 is shifted along the 4 time segments and at each time segment is convolved with an 8 data points of sample window 830 to produce the 4 lowest frequency band coefficients SSS1–SSS4 of Table II using discrete convolution and decimation. For instance, SSS3=X16+X17+X18+X19+X20+X21+X22+X23. This provides four time segments per frequency band. Similarly, as shown by the convolution processes 875 of FIGS. 21B, within step 410c of the present invention, basis function 464 is shifted along 4 time segments and at each time segment is convolved with 8 data points of sample window 830 to produce the highest frequency band coefficients DDD1–DDD4 of Table II using discrete convolution and decimation.

Figure 21A:
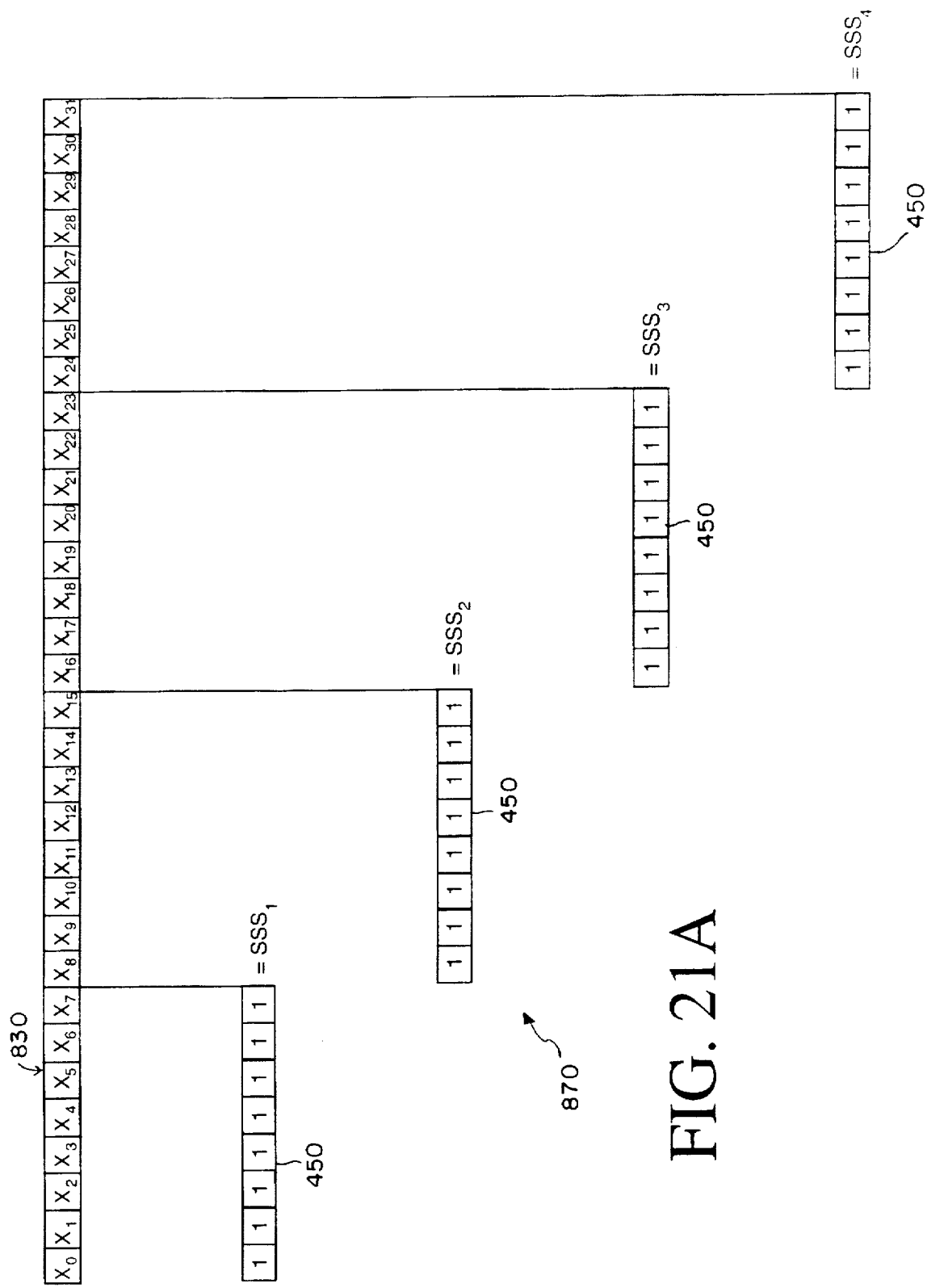
FIGS. 21A and 21B illustrate two exemplary discrete convolution and decimation processes performed by the present invention to arrive at the first four and the last four coefficients of the 32 coefficients of the frequency resolution level 3, based on an input signal sample window within an embodiment where x=32.
Figure 21B:
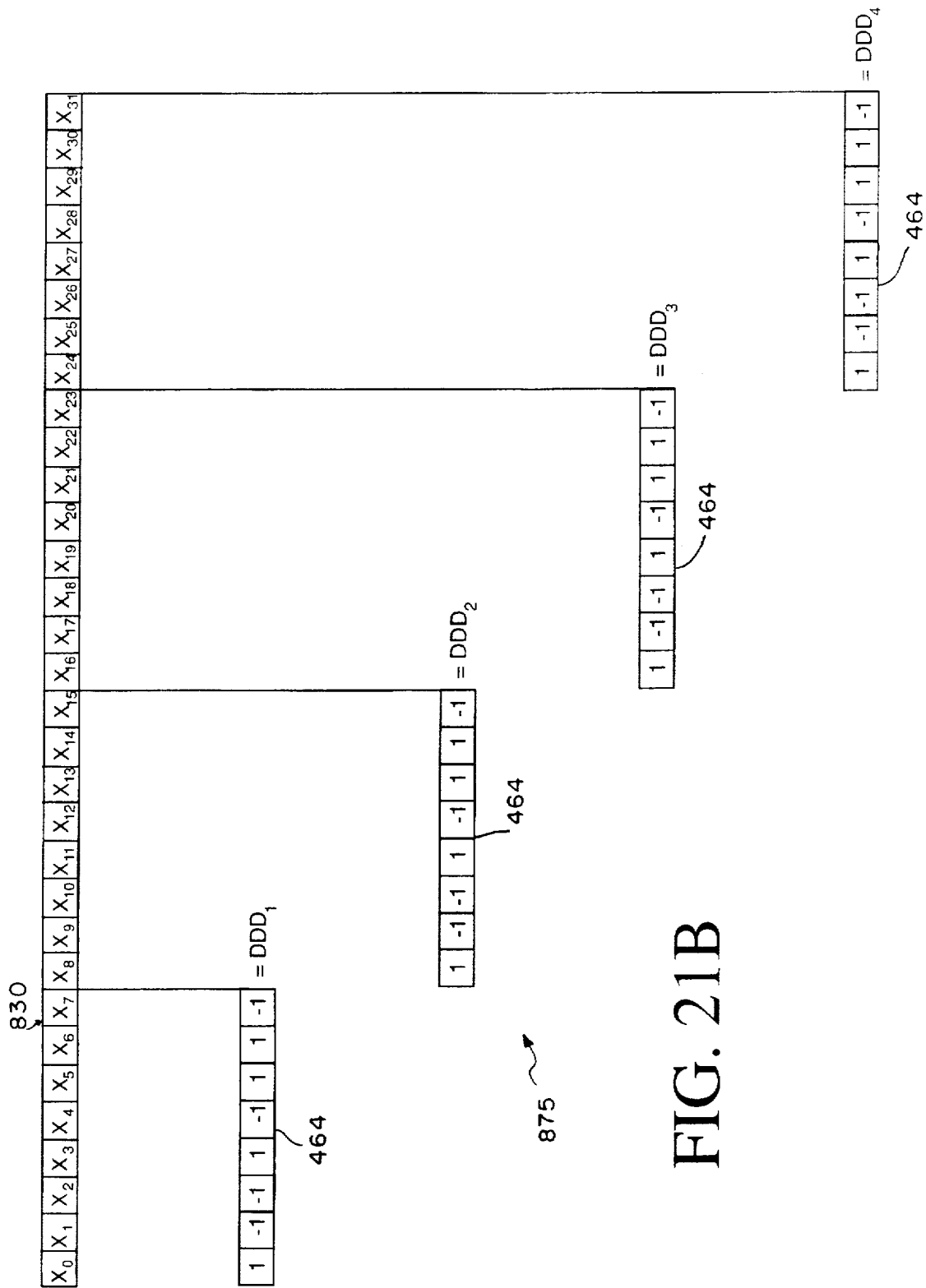

The above convolution procedures 870 and 875 produce the first four and the last four coefficients for level 3. It is appreciated that under analogous convolution procedures, the remaining 24 coefficients SDD1–SDD4, DSD1–DSD4, SSD1–SSD4, DDS1–DDS4, SDS1–SDS4, and DSS1–DSS4 are produced by convolving wavelet basis functions 462, 460, 458, 456, 454, and 452, respectively, across the sample window 830 while shifting across the four time segments as shown in FIG. 21A or FIG. 21B to produce each coefficient. It is appreciated that while level 3 offers twice the frequency resolution over level 2, level 2 offers twice the time resolution over level 3 (e.g., level 2 has 8 time segments while level 3 has only 4 time segments for each frequency band; and level 3 has eight frequency bands while level 2 has four frequency bands).

Figure 17:
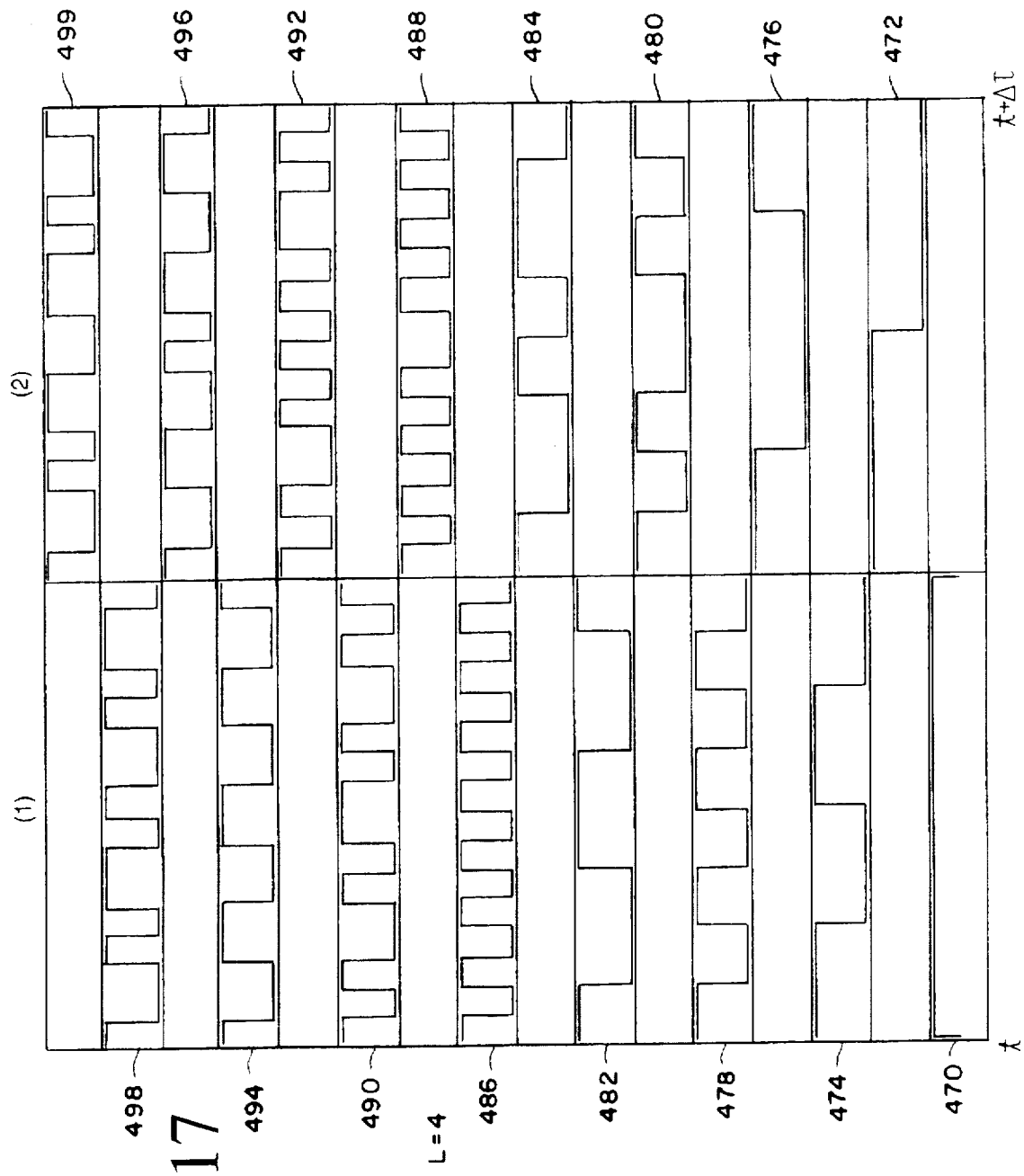
FIG. 17 illustrates the 16 waveforms for the wavelet basis functions (8 high, 8 low band) for the frequency resolution level 4 within an embodiment of the present invention where x=32.

FIG. 17 illustrates the sixteen frequency band wavelet basis functions (from highest to lowest frequency) starting with low band functions 499, 498, 496, 494, 492, 490, 488, and 486 and high band functions 484, 482, 480, 478, 476, 474, 472, and 470 for level 4 of the above transformation example. Therefore, level 4 contains sixteen frequency bands, each band having two coefficients. As shown by the convolution process 880 of FIG. 22A, within step 410$d$ of the present invention (although not shown in FIG. 4, step 410$d$ is analogous to step 410$b$ but applicable to level 4 convolution), basis function 470 is shifted along 2 time segments and at each time segment is convolved with 16 data points of sample window 830 to produce the 2 lowest frequency band coefficients SSSS1–SSSS2 of Table II using discrete convolution and decimation. For instance, SSSS1= X0+X1+X2+X3+X4+X5+X6+X7+X8+X9+X10+X11+ X12+X13+X14+X15. This provides two time segments per frequency band. Similarly, as shown by the convolution processes 885 of FIGS. 22B, within step 410$d$ of the present invention, basis function 499 is shifted across the two time segments and at each time segment is convolved with 16 data points of sample window 830 to produce the highest frequency band coefficients DDDD1–DDDD2 of Table II using discrete convolution and decimation.

Figure 22A:
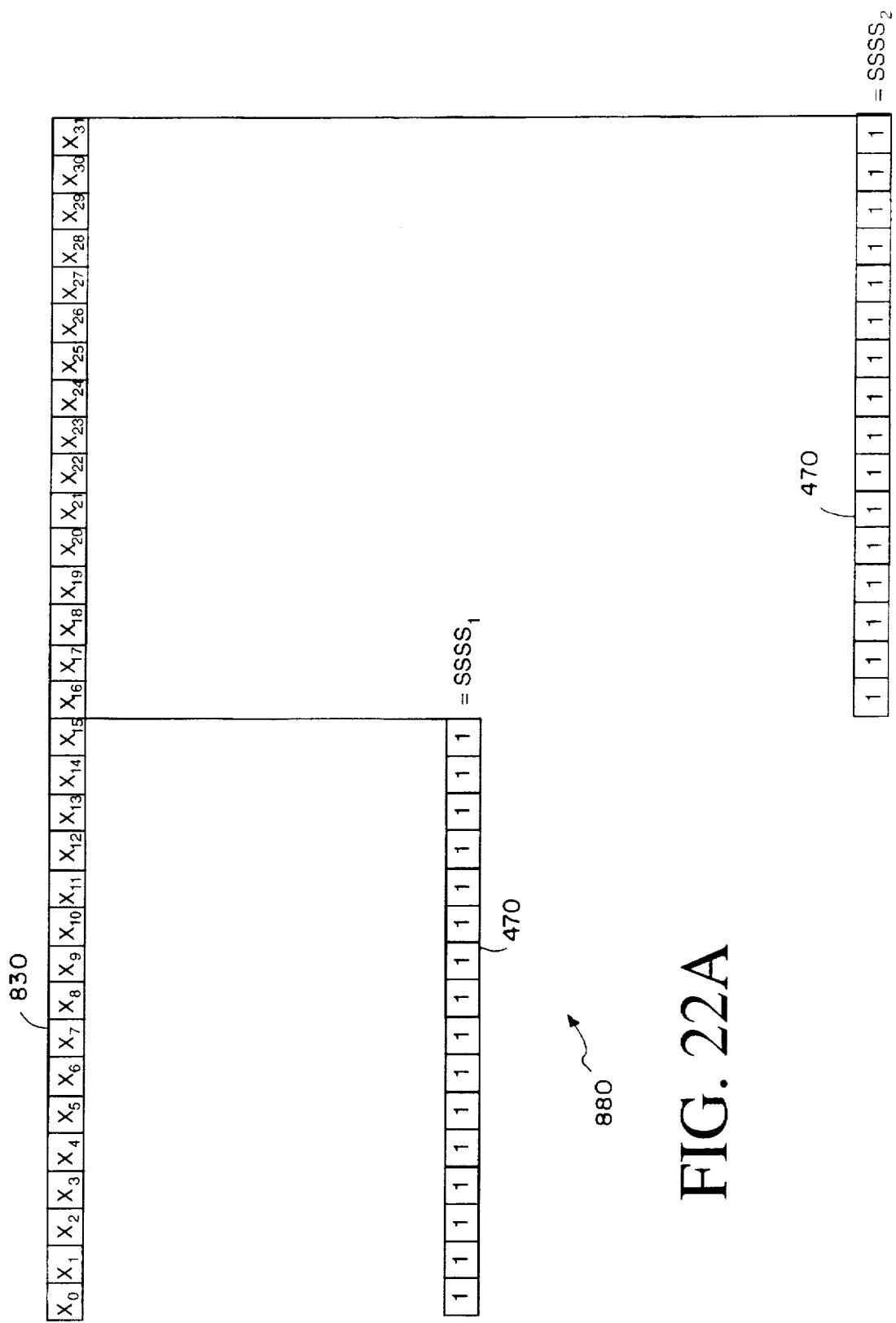
FIGS. 22A and 22B illustrate two exemplary discrete convolution and decimation processes performed by the present invention to arrive at the first two and the last two coefficients of the 32 coefficients of the frequency resolution level 4, based on an input signal sample window within an embodiment where x=32.
Figure 22B:
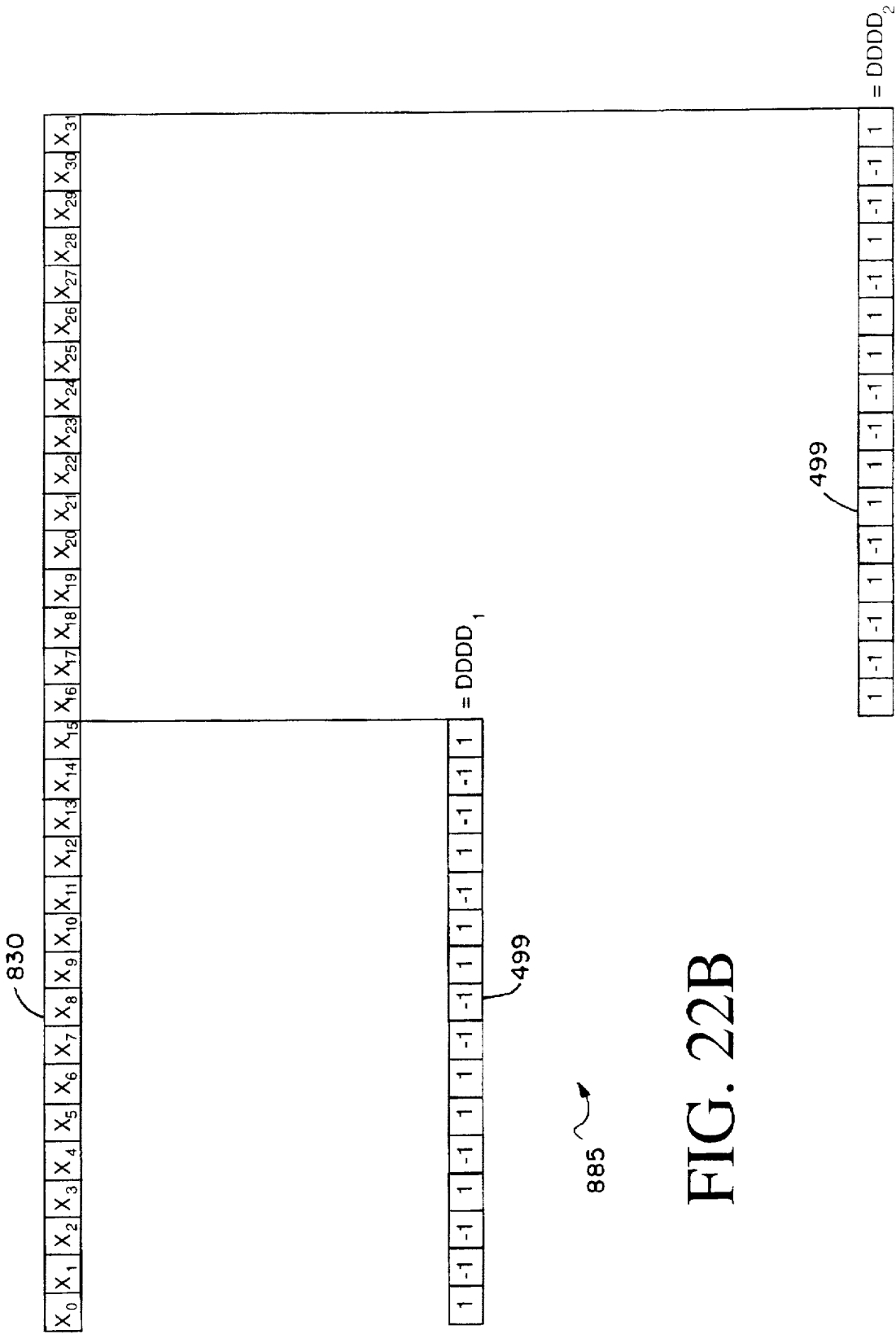

The above convolution procedures 880 and 885 produce the first two low frequency and the last two high frequency coefficients for level 4. It is appreciated that under analogous convolution procedures, the remaining 28 coefficients SDDD1–SDDD2, DSDD1–DSDD2, SSDD1–SSDD2, DDSD1–DDSD2, SDSD1–SDSD2, DSSD1–DSSD2, SSSD1–SSSD2, DDDS1–DDDS2, SDDS1–SDDS2, DSDS1–DSDS2, SSDS1–SSDS2, DDSS1–DDSS2, SDSS1–SDSS2, DSSS1–DSSS2, are produced by convolving wavelet basis functions 498, 496, 494, 492, 490, 488, 486, 484, 482, 480, 478, 476, 474, and 472, respectively, across the sample window 830 while shifting by sixteen sample points as shown in FIG. 22A or FIG. 22B to produce each coefficient. It is appreciated that while level 4 offers twice the frequency resolution over level 3, level 3 offers twice the time resolution over level 4 (e.g., level 3 has 4 time segments while level 4 has only 2 time segments for each frequency band; and level 4 has sixteen frequency bands while level 3 has eight frequency bands).

Figure 18A:
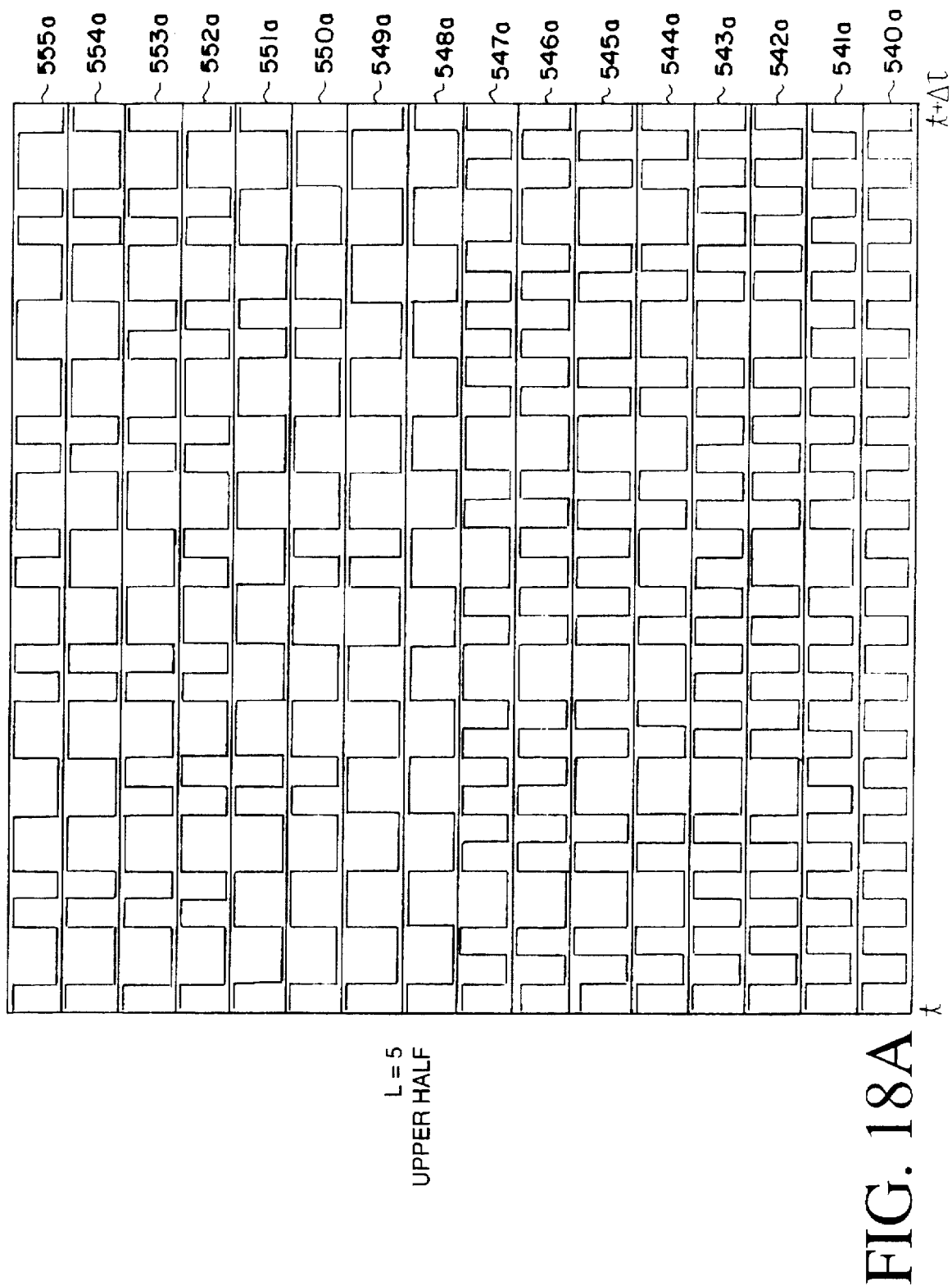
FIGS. 18A and 18B illustrate the 32 wavelet basis functions (16 high, 16 low band) for the frequency resolution level 5 within an embodiment of the present invention where x=32.
Figure 18B:
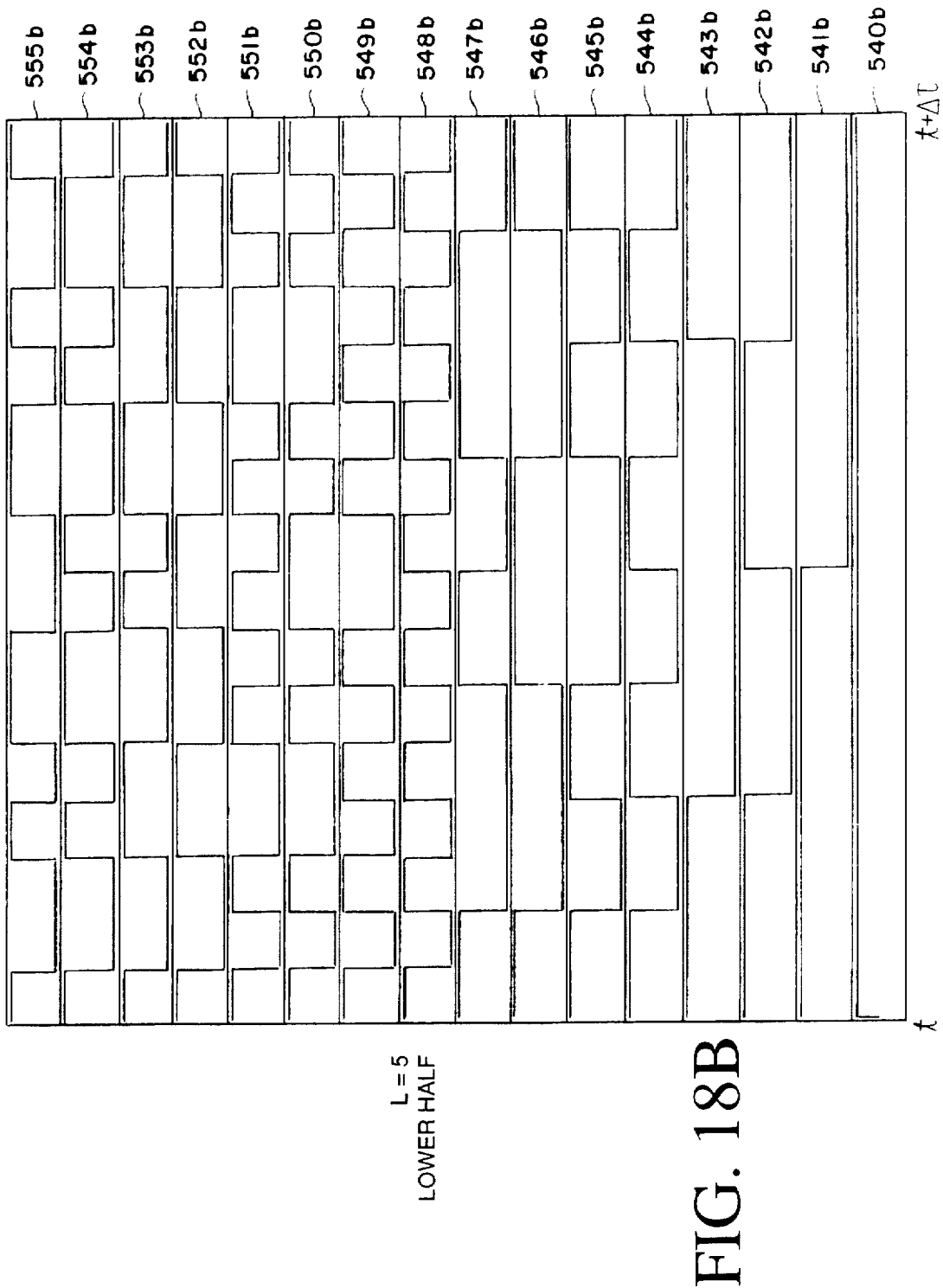

FIG. 18A and FIG. 18B illustrate the thirty-two frequency band wavelet basis functions (from highest to lowest frequency) of level 5 with high band functions being 555$a$, 554$a$, 553$a$, 552$a$, 551$a$, 550$a$, 549$a$, 548$a$, 547$a$, 546$a$, 545$a$, 544$a$, 543$a$, 542$a$, 541$a$, and 540$a$, and low band functions being 555$b$, 554$b$, 553$b$, 552$b$, 551$b$, 550$b$, 549$b$, 548$b$, 547$b$, 546$b$, 545$b$, 544$b$, 543$b$, 542$b$, 541$b$, and 540$b$ of the above transformation example. Therefore, level 5 contains thirty-two frequency bands, each band having one coefficient. As shown by the convolution process 890 of FIG. 23A, within step 410$n$ of the present invention (step 410$n$ is analogous to step 410$b$ but applicable to level 5 convolution), basis function 540$b$ is convolved with the 32 data point sample window 830 to produce the lowest frequency band coefficient SSSSS1 of Table II using discrete convolution. For instance, SSSSS1=X0+ . . . +X31. This provides one time segment per frequency band. Similarly, as shown by the convolution processes 895 of FIGS. 23B, within step 410$n$ of the present invention, basis function 555$a$ is convolved with the 32 data point sample window 830 to produce the highest frequency band coefficient DDDDD1 of Table II using discrete convolution.

Figure 23A:
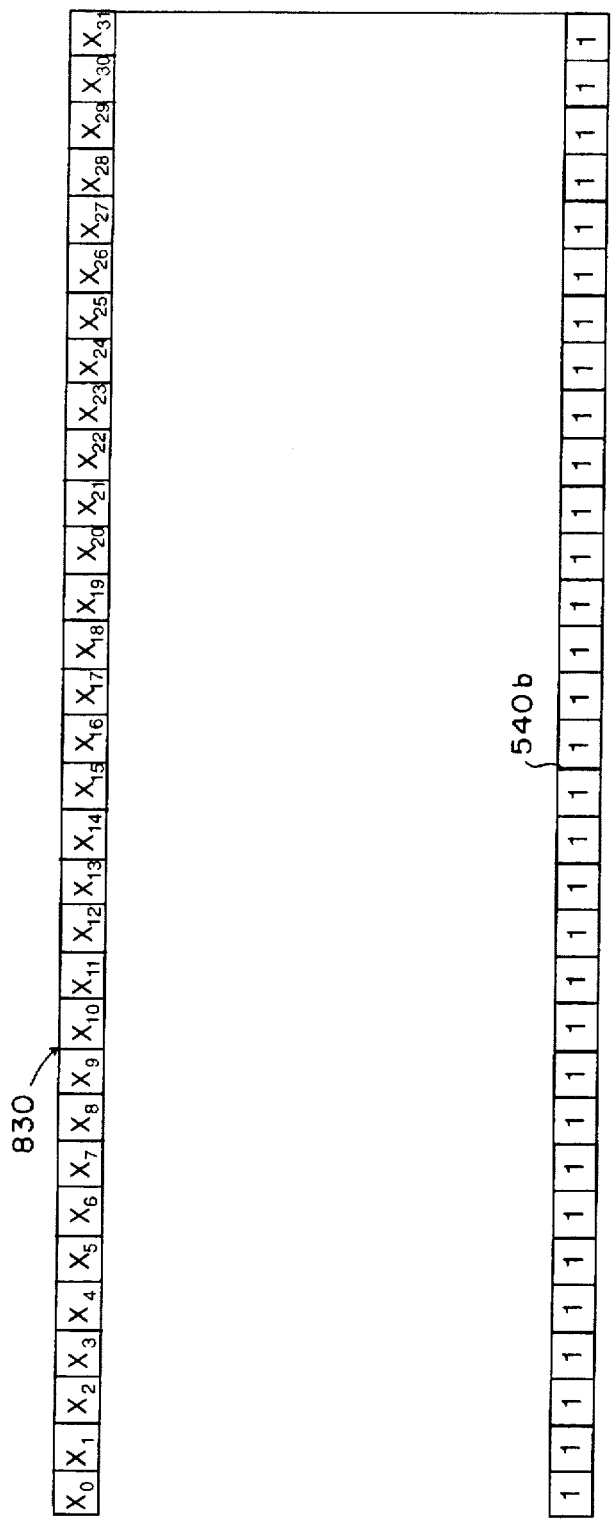
Figure 23B:
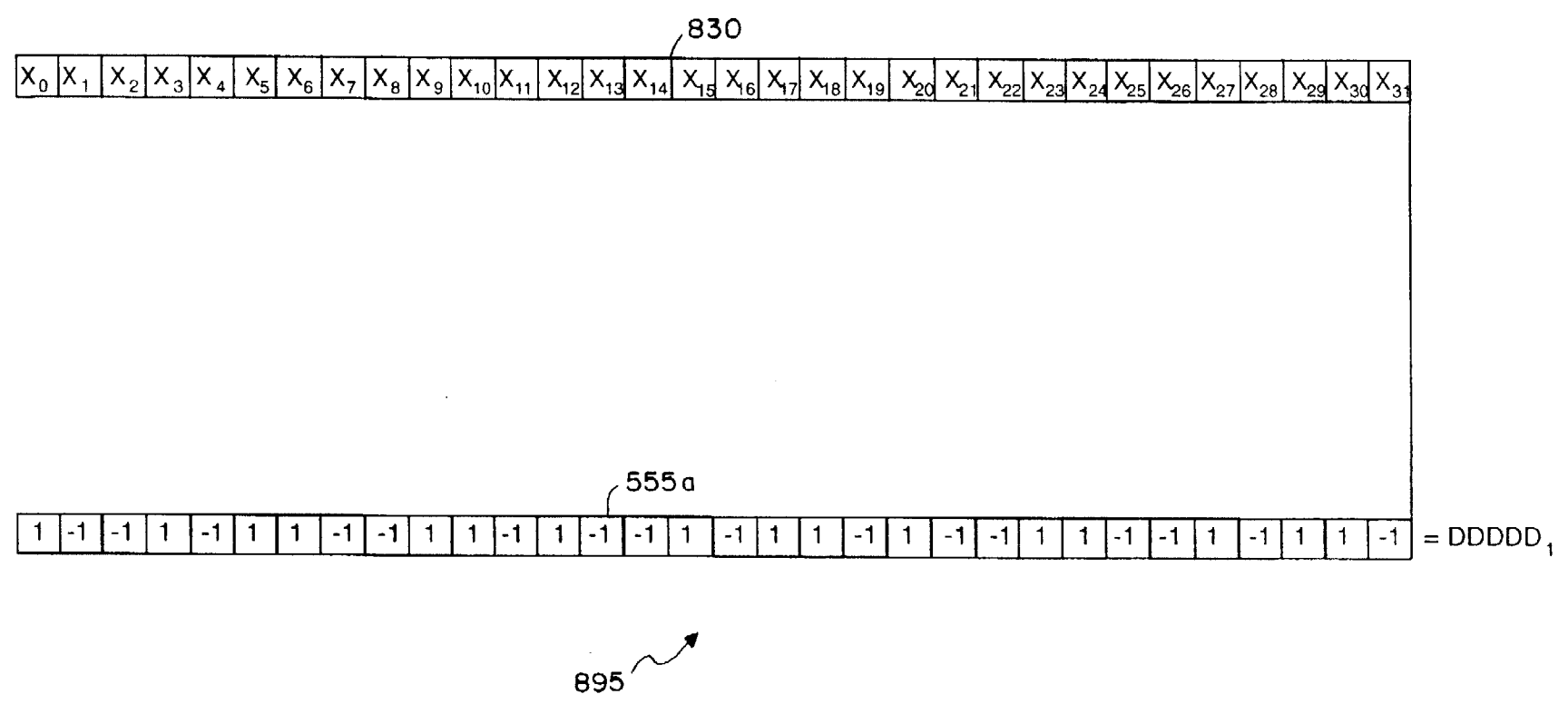

The above convolution procedures 890 and 895 produce the lowest and the highest frequency coefficients for level 5. It is appreciated that under analogous convolution procedures, the remaining 30 coefficients SDDDD1, DSDDD1, SSDDD1, DDSDD1, SDSDD1, DSSDD1, SSSDD1, DDDSD1, SDDSD1, DSDSD1, SSDSD1, DDSSD1, SDSSD1, DSSSD1, SSSSD1, DDDDS1, SDDDS1, DSDDS1, SSDDS1, DDSDS1, SDSDS1, DSSDS1, SSSDS1, DDDSS1, SDDSS1, DSDSS1, SSDSS1, DDSSS1, SDSSS1, DSSSS1, are produced by convolving wavelet basis functions 554$a$, 553$a$, 552$a$, 551$a$, 550$a$, 549$a$, 548$a$, 547$a$, 546$a$, 545$a$, 544$a$, 543$a$, 542$a$, 541$a$, 540$a$, 555$b$, 554$b$, 553$b$, 552$b$, 551$b$, 550$b$, 549$b$, 548$b$, 547$b$, 546$b$, 545$b$, 544$b$, 543$b$, 542$b$, and 541$b$, respectively, across the sample window 830 as shown in FIG. 23A or FIG. 23B to produce each coefficient. It is appreciated that while level 5 offers twice the frequency resolution over level 4, level 4 offers twice the time resolution over level 5 (e.g., level 4 has 2 time segments while level 5 has only 1 time segment for each frequency band; and level 5 has 32 frequency bands while level 4 has 16 frequency bands).

Figure 5A:
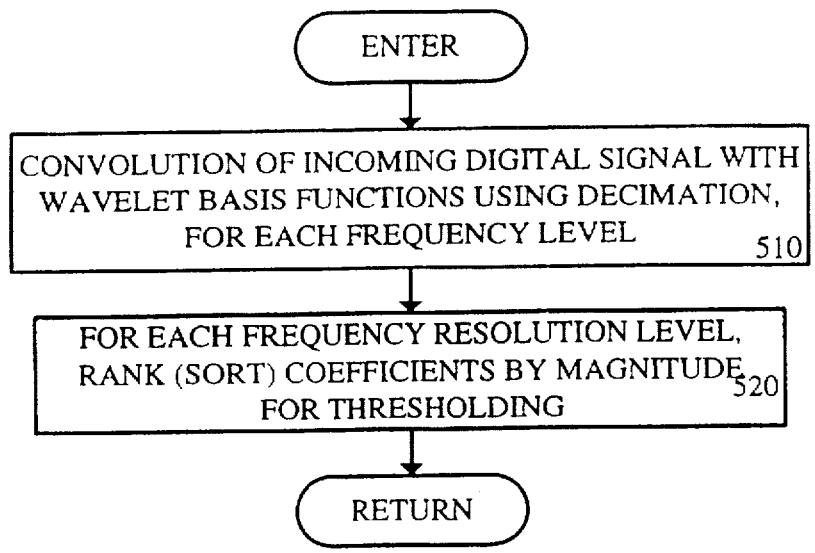
FIG. 5A is a flow diagram illustrating discrete convolution and decimation steps of the wavelet transformation step of FIG. 4 in accordance with the present invention.
Figure 5B:
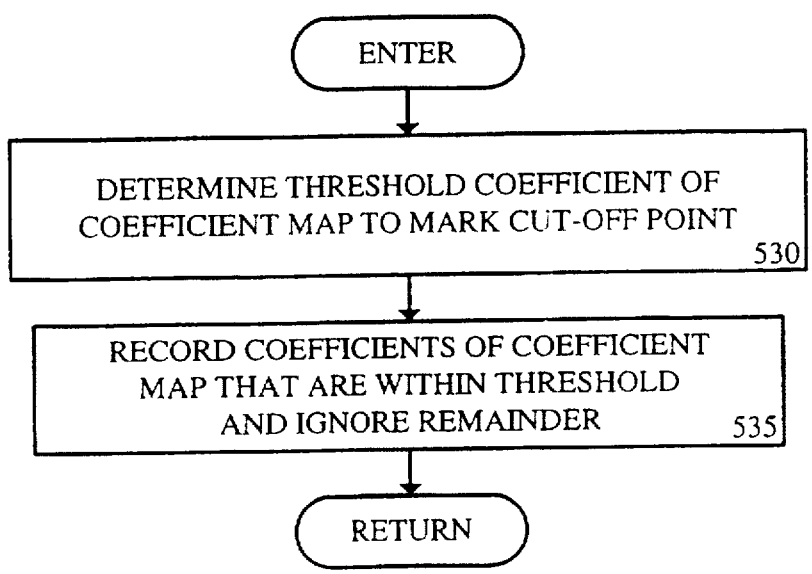
FIG. 5B is a flow diagram illustrating the coefficient thresholding and recording step of FIG. 4 in accordance with the present invention for each level.

In view of the foregoing, the present invention transformation process 315 (FIG. 4) computes the above 32 coefficients for each of the 5 levels simultaneously and stores this information into a computer readable memory unit (102, 103 and/or 104) of system 112. Subsequently, the coefficients for each of the 5 levels are sorted into 5 different coefficient maps (by level) and stored at step 520 (FIG. 5A). At step 430 (FIG. 4), the best coefficient map of the 5 levels is selected and the best map's coefficients having the largest magnitude (e.g., as determined by step 535 (FIG. 5B)) are stored in computer readable memory to represent the transformed representation of the input signal window.

PHASE DIAGRAM REPRESENTATION

Figure 9A:
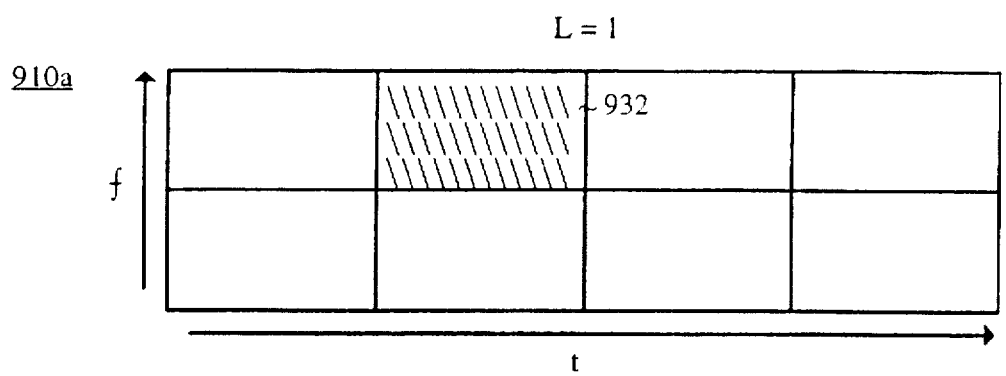
FIGS. 9A, 9B and 9C are phase diagrams illustrating frequency bands of three frequency resolution levels of a wavelet transformation translated input signal.
Figure 9B:
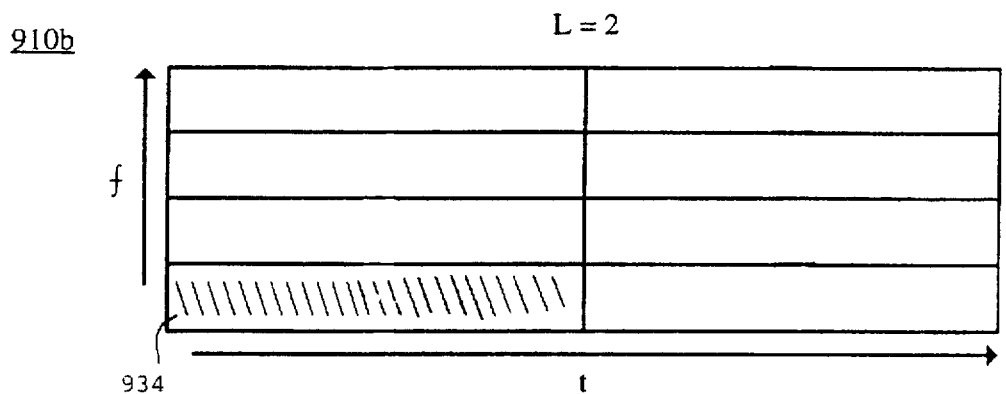
Figure 9C:
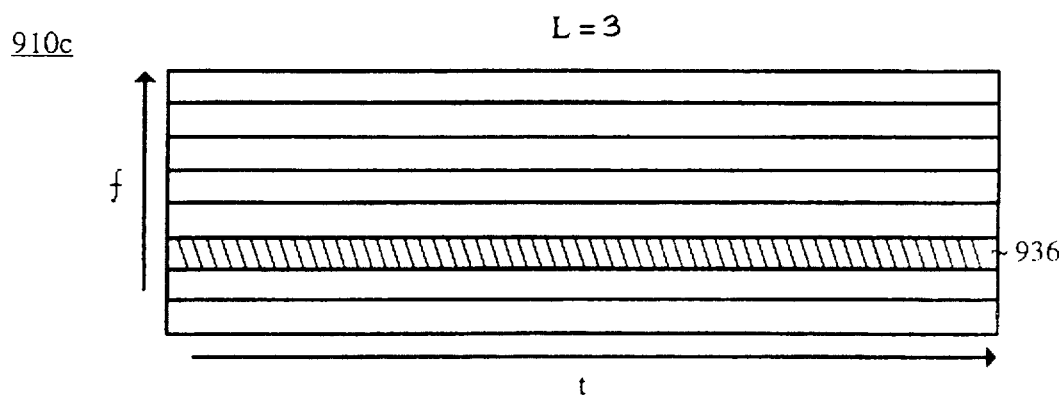

FIGS. 9A, 9B and 9C illustrate phase diagrams 910$a$, 910$b$, and 910$c$ for level 1, level 2 and level 3 of an exemplary wavelet transformation (step 315 of the present invention) having n=3 and x=8. As shown in the diagrams, frequency resolution increases and from level 1 to level 3 while time resolution decreases in this same direction. Frequency resolution increases as the level number increases because more frequency bands are introduced, e.g., level 3 910$c$ offers eight frequency bands while level 1 910$a$ offers only two. In addition, the size of the wavelet basis functions increase as the level number increases (e.g., see FIGS. 14, 15 and 16).

However, as the level number increases, the time resolution decreases proportionately, e.g., the wavelet basis functions of level 3 910c are four times larger in time size compared to the basis functions of level 1 910a and therefore the wavelet basis functions of level 3 can be shifted fewer times over the input sample window. Namely, within each level, the length of each time segment increases in direct proportion to the length of a wavelet basis function, meaning the resultant time resolution decreases. If higher resolution in time is desired, a non-decimated decomposition procedure can be used within the present invention.

Assuming x=8 and n=3 for diagram 910a, level 1 offers two frequency bands (Low/High) and offers four coefficients per band (see also FIG. 14). The time segments within each band are therefore twice the data sample rate (e.g., 2×15.6 ns @64 MHz ADC circuit 20). Level 2 910b of FIG. 9B offers two frequency bands within the low band and offers two frequency bands within the high band for a total four frequency bands, each frequency band having two coefficients per band (see also FIG. 15). The time segments within each band are therefore four times the data sample rate (e.g., 4×15.6 ns @64 MHz ADC circuit 20). Lastly, level 3 910c of FIG. 9C offers four frequency bands within the low band and offers four frequency bands within the high band for a total eight frequency bands, each frequency band having 1 coefficient per band (see also FIG. 16). The time segment within each band is therefore eight times the data sample rate (e.g., 8×15.6 ns @64 MHz ADC circuit 20).

Therefore, each level n offers a different frequency and time resolution combination within diagrams 910a–910c. Within the phase diagrams 910a–910c, those "tiles" with corresponding coefficients having large magnitudes are shaded depending on their magnitude. For instance, tile 936 of frequency resolution level 3 910c corresponds to a particular frequency band (e.g., wavelet basis function) whose coefficient has a large magnitude. The same is true for tile 934 in level 2 910b and tile 932 in level 1 910a. As shown in the exemplary phase diagrams 910a–910c, the input sample window contains significant energy in specific frequency bands indicated by tiles 932, 934 and 936. In other words, the basis functions representing these three frequency bands efficiently correlate to the signal data of input sample window. It is appreciated that the area of each of the shaded tiles 932, 934, and 936 is the same. This illustrates that the time/frequency resolution ratio for each level is the same.

Since the coefficients of the present invention are time stamped according to the time segment of the input signal window to which they are convolved, the transformation information of the present invention offers both effective time and frequency information. This is quite unlike a classical Fourier transformation where time information is lost because the transformation sinusoidal signal contains infinite support, whereas the support for a wavelet basis function is finite. Considering the expected input signal for an RWR application is a pulse, its signal format is non-stationary (e.g., the major or statistical characteristics of the signal are changing as a function of time). Classic Fourier transformations while effective for stationary signals are not effective for non-stationary signals where wavelet transformations, such as the present invention, offer more information within the transformation domain.

POST TRANSFORMATION PROCESSING

Described heretofore are the wavelet transformation processes of the present invention including two exemplary embodiments (x=4 and n=2; x=32 and n=5). What follows is a description of different post transformation processes performed by two embodiments of the present invention RWR signal denoising system. At the completion of step 420 of FIG. 4, the selected coefficients with the largest magnitude of the best coefficient map are stored and therefore most of the denoising processes are complete. The embodiments that follow describe two systems that make use of the denoised transformed signal in a larger RWR system for feature extraction (e.g., pulse detection within a denoised reconstructed signal).

First Post Transformation Embodiment. In the first embodiment, the coefficients selected by step 430 are used directly to compute the digital pulse report 40 of FIG. 1 which is supplied to a digital pulse processor 45 which performs downstream processing for signal characterization and recognition. In this embodiment, re-transformation is not required and therefore is optionally performed. FIG. 7 illustrates steps performed by this embodiment of the present invention and is a continuation of process 300 (FIG. 3).

At step 810 of FIG. 7, the digital report 40 is generated and stored in memory. At step 810, based on the coefficients (and magnitude) selected by step 430, based on their time stamped value and based on their corresponding wavelet basis function, the present invention determines the time of the pulse's leading edge, the pulse duration and peek amplitude. Optionally, at step 815 the signal can be re-constructed (e.g., re-transformed) digitally using the selected coefficients of step 430; this process is described in detail with respect to the second embodiment of the present invention (step 710/FIG. 8). At step 820, either the reconstructed digital signal from step 815 or the digital report 810 is supplied to the digital pulse processor 45 (FIG. 1) for pulse detection and threat characterization using well known techniques and components. At step 825, the results of step 820 are output either for display (e.g., on an azimuth display unit) and/or forwarded to an electronic counter-measures unit.

Second Post Transformation Embodiment. In the second embodiment of the present invention, the denoising system is placed within an existing RWR system to provide a clean (e.g., denoised) video signal (over line 60/FIG. 1) representing the input signal. In this embodiment, reconstruction of the selected coefficients (stored at step 430) back into the signal domain is required. This process is described with reference to FIG. 8.

At step 710 of FIG. 8, the present invention processor system 112 performs a re-transformation of coefficients selected at step 430 to produce a denoised reconstructed digital signal which is supplied over bus 30 (FIG. 1). Re-transformation is performed by the present invention at step 710 by performing a convolution of the coefficients against Haar wavelet basis function 340 and the inverse of wavelet basis function 335 (referred to as 335') using interpolation in lieu of decimation. Generally, the during re-transformation at step 710 the present invention convolves the low band wavelet basis function with interpolated low band coefficients and convolves the inverse of the high band wavelet basis function with interpolated high band coefficients. It is appreciated that during the re-transformation process, those coefficients that were not selected by step 430 for a particular sample window have a value of zero. Further, depending on the level that was selected at step 430, different re-transformation processes are required because each level contains its own set of coefficients and expressions relating the signal points to those coefficients.

Figures 12A, 12B, 12C, 12D:
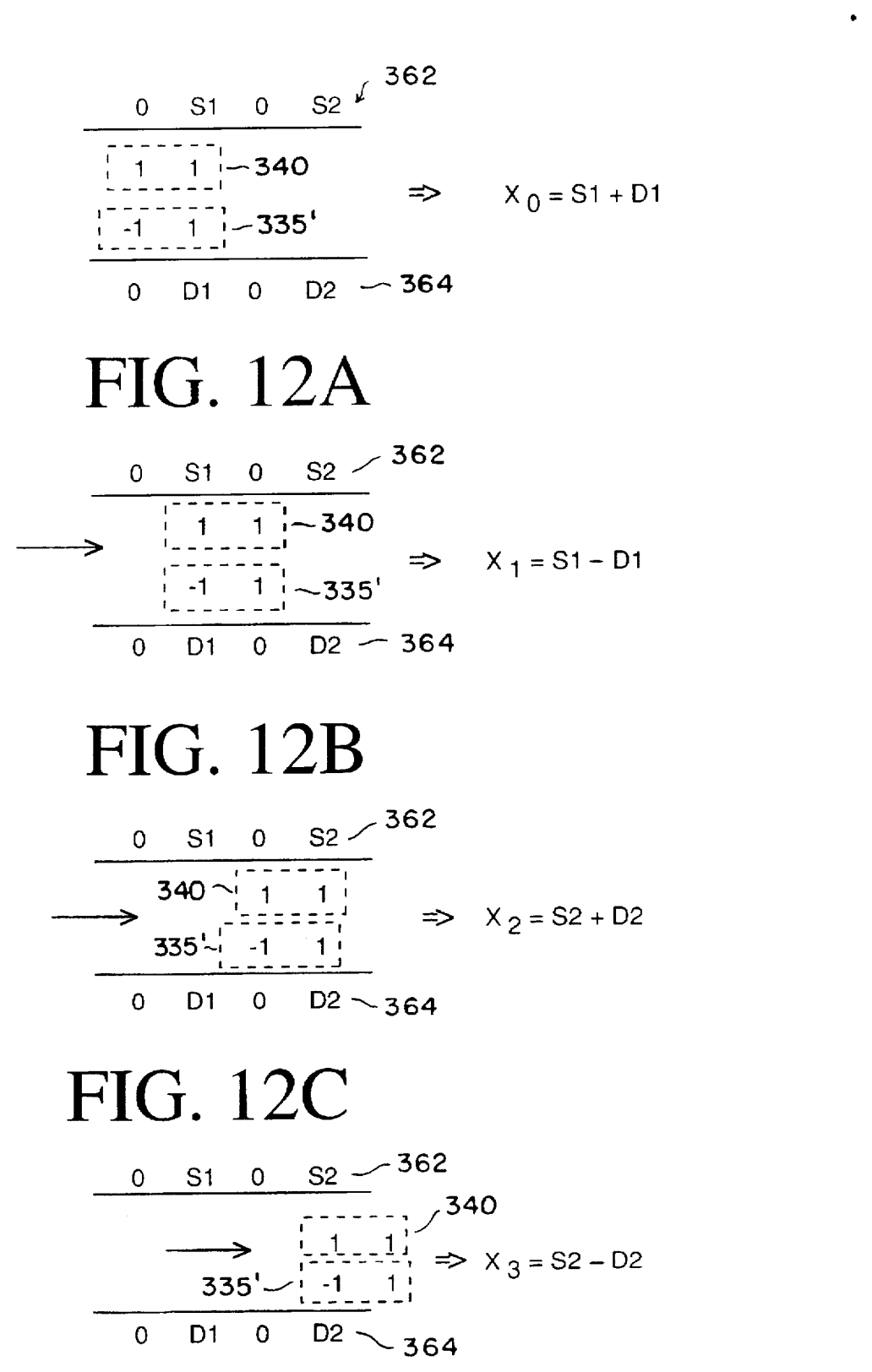

Embodiment x=4 and n=2. Referring to the embodiment described above where x=4 and n=2, FIGS. 12A, 12B, 12C and 12D illustrate the re-transformation process from the level 1 coefficients back to the reconstructed denoised signal (X0, X1, X2 and X3). As shown in FIG. 12A, header 362 and footer 364 represent the level 1 coefficients used to reconstruct X0 and zeros are placed between for interpolation. Wavelet 340 and inverse wavelet 335' are convolved with these coefficients such that $X0=S1+D1$. Similarly, FIG. 12B illustrates the arrangement of FIG. 12A with the wavelets 340 and 335' shifted down by one position and convolved again with $X1=S1-D1$. FIG. 12C illustrates the arrangement of FIG. 12B with the wavelets 340 and 335' shifted down by one position and convolved with $X2=S2+D2$. Lastly, FIG. 12D illustrates the arrangement of FIG. 12C with the wavelets 340 and 335' shifted down by one position and convolved with $X3=S2-D2$. Each of the reconstruction processes shown in FIGS. 12A, 12B, 12C and 12D can be performed simultaneously given the input coefficients for level 1 in order to rapidly generate the reconstructed denoised signal X0, X1, X2 and X3. At step 710, It is appreciated that the above processes are performed by the present invention for a particular input sample window only if step 430 indicated that level 1 contained the best coefficient map, otherwise the level 1 coefficients are zeroed.

FIGS. 13A, 13B, 13C and 13D illustrate convolution and interpolation processes that are used by the present invention to translate level 2 coefficients into level 1 coefficients. Based on the instant transformation, the processes of FIGS. 12A, 12B, 12C and 12D can then be used to arrive at the denoised signal X0, X1, X2 and X3. Alternatively, the denoised signal can be directly computed based on the coefficients of level 2. As shown in FIG. 13A, header 372 and footer 374 represent the level 2 coefficients used to reconstruct S1 and zeros are placed between for interpolation. Wavelet 340 and inverse wavelet 335' are convolved with these coefficients such that $S1=SS1+DS1$. Similarly, FIG. 13B illustrates the arrangement of FIG. 13A with the wavelets 340 and 335' shifted down by one position and convolved again with $S2=SS1-DS1$. FIG. 13C illustrates the arrangement of FIG. 13A with different a header 382 and a different footer 384 with which the wavelets 340 and 335' are convolved, with $D1=SD1+DD1$. Lastly, FIG. 13D illustrates the arrangement of FIG. 13C with the wavelets 340 and 335' shifted down by one position and convolved again with $D2=SD1-DD1$. Based on the above and the level 1 relationships, the following relationships can be formed:

$X0=SS1+DS1+SD1+DD1$ $X1=SS1+DS1-SD1-DD1$ $X2=SS1-DS1+SD1-DD1$ $X3=SS1-DS1-SD1+DD1$

The above relationships for level 2 are performed simultaneously at step 710 given the input coefficients for level 2 to rapidly generate the reconstructed denoised signal X0, X1, X2 and X3. It is appreciated that the above processes are performed by the present invention for a particular input sample window only if step 430 indicated that level 2 contained the best coefficient map. If so, only the selected level 2 coefficients (e.g., with magnitudes within the threshold value determined at step 420a) are used to perform the reconstruction at step 710.

Figure 24A:
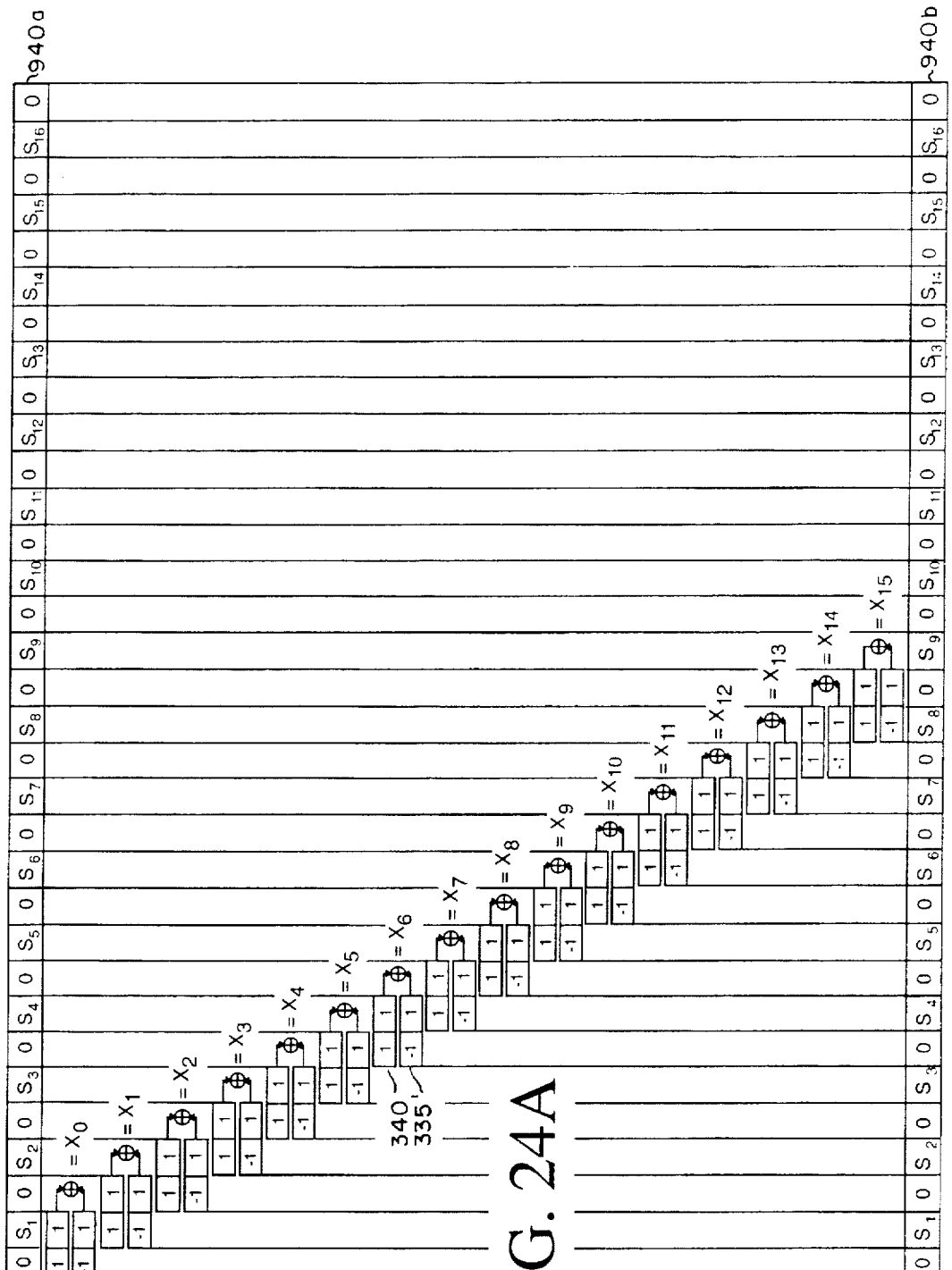
FIGS. 24A and 24B illustrate discrete convolution and interpolation reconstruction processes performed by step 710 of the present invention to create the 32 points of the denoised input signal sample based on the 32 coefficients of the frequency resolution level 1 within an embodiment where x=32.
Figure 24B:
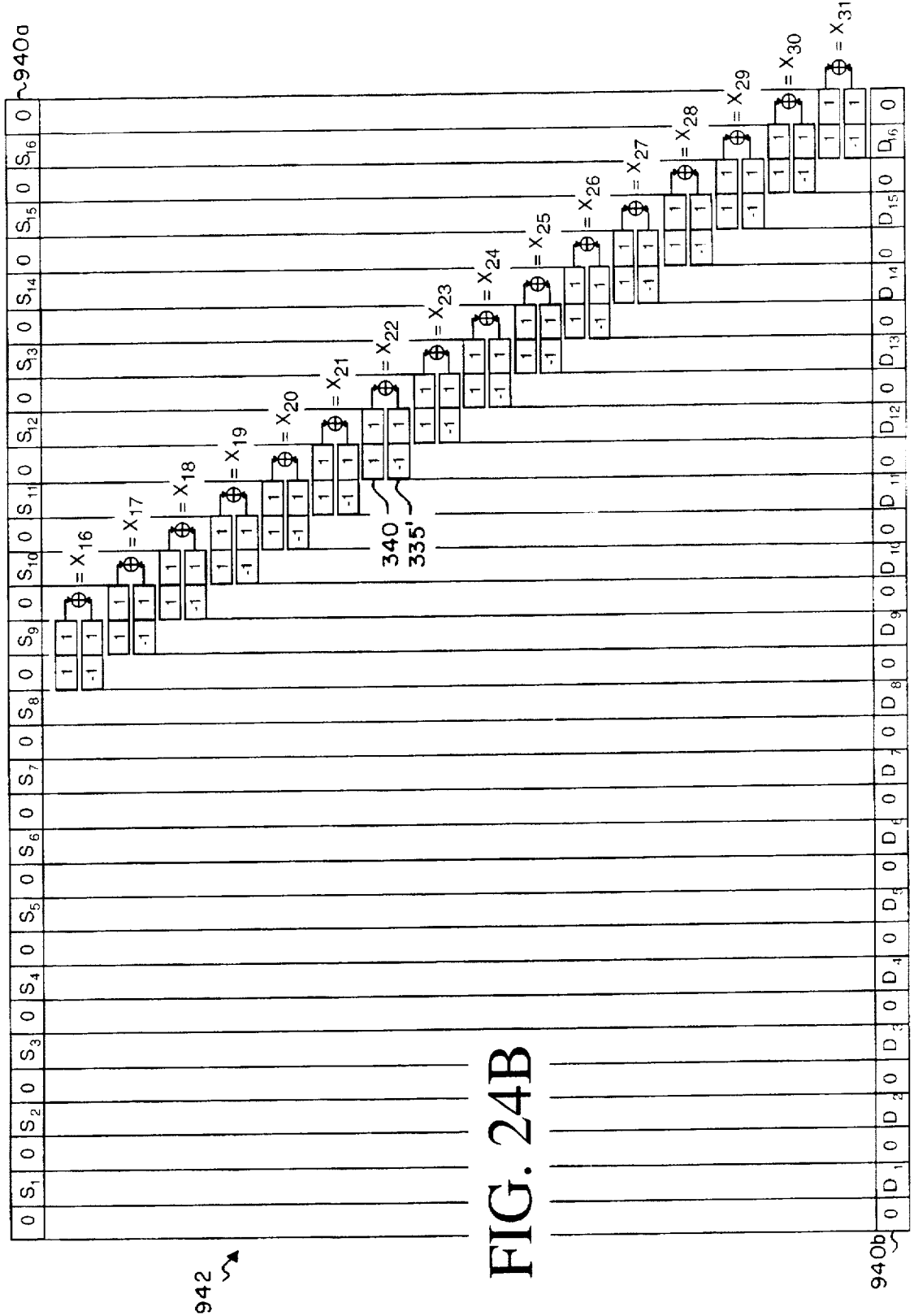

Embodiment x=32 and n=5. Referring to the example described above where x=32 and n=5, FIGS. 24A and 24B illustrate the re-transformation process 942 which translates from the 32 level 1 coefficients back to the reconstructed denoised signal (X0, . . . , X31). As shown, wavelet basis functions 340 and 335' are individually shifted along the header 940a and the footer 940b and at each position convolved with the level 1 coefficients to produce the signal data points (X0, . . . , X31). The header 940a contains the low frequency resolution level 1 coefficients (S1, . . . , S16) while the footer 940b contains the high frequency resolution level 1 coefficients (D1, . . . , D16). Based on the syntax shown in FIGS. 24A and 24B, each sample point (X0, . . . , X31) can be computed based on the 32 coefficients of level 1. As an example of the syntax of re-transformation process 942, $X14=S8+D8$. It is appreciated that process 942 is performed at step 710 only if step 410 selected the level 1 coefficient map with respect to the particular input sample window.

Figure 25A:
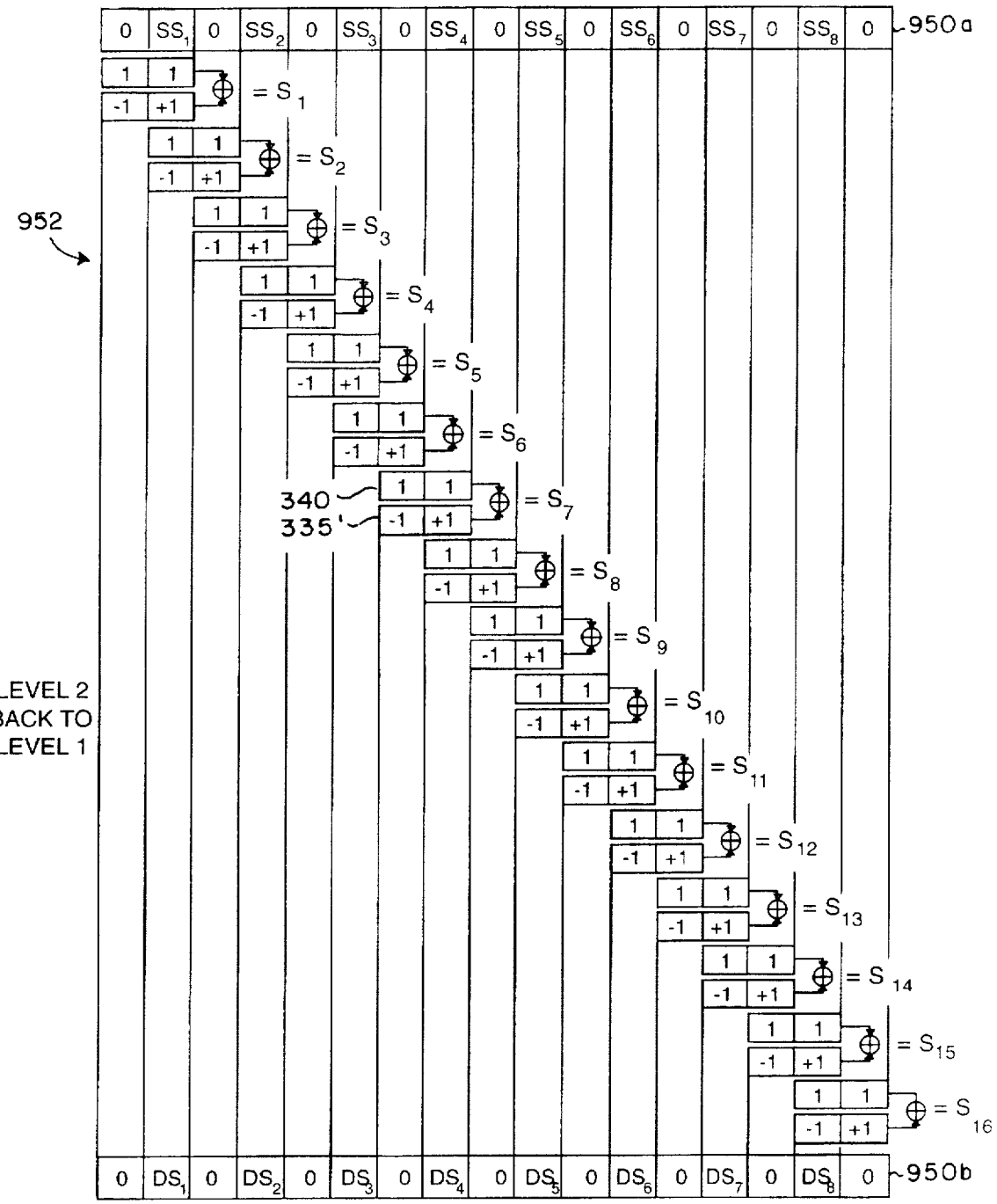
FIGS. 25A and 25B illustrate discrete convolution and interpolation reconstruction processes performed by step 710 of the present invention to arrive at the 32 coefficients of the frequency resolution level 1 based on the 32 coefficients of the frequency resolution level 2 within an embodiment where x=32.
Figure 25B:
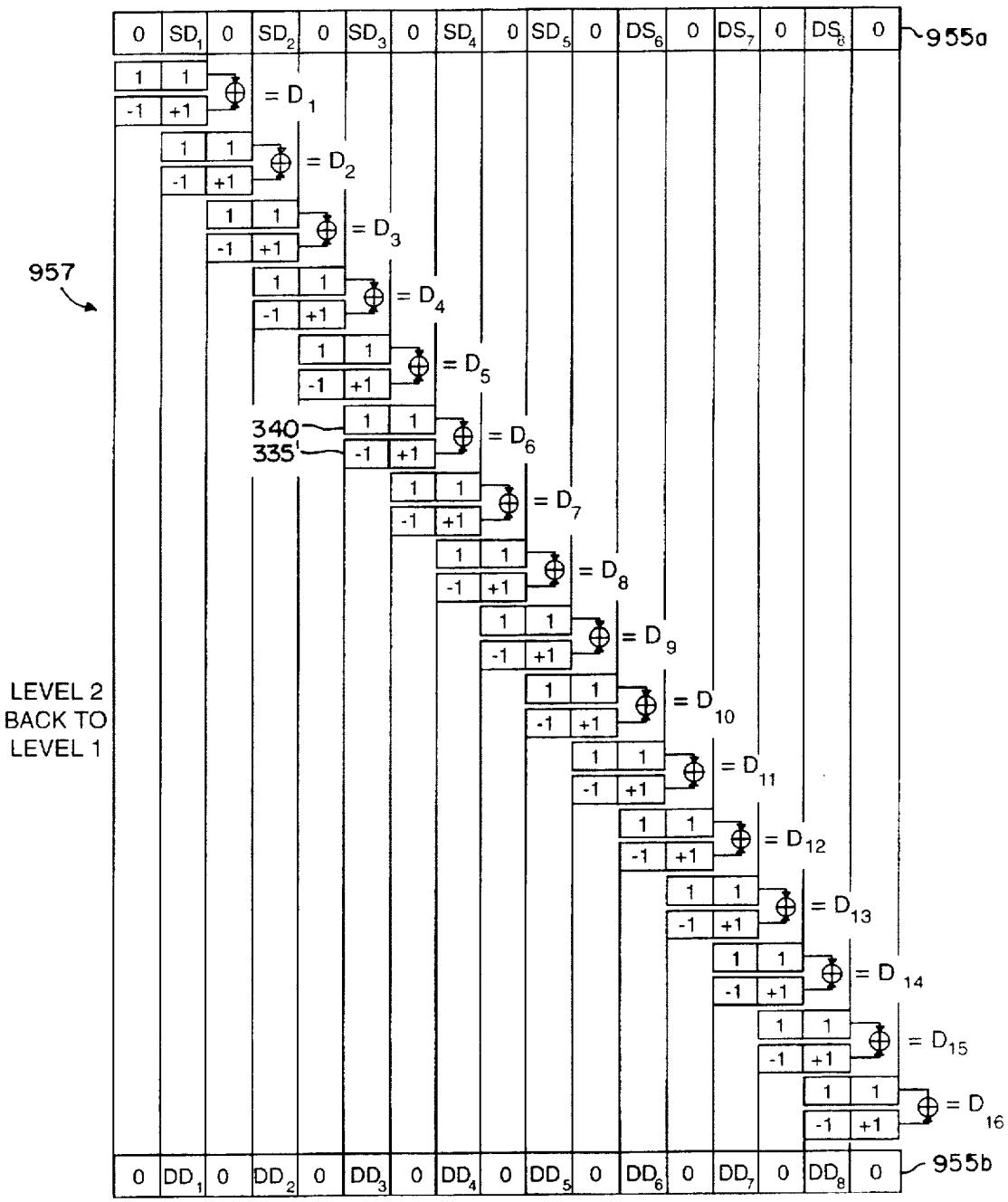
Figure 26A:
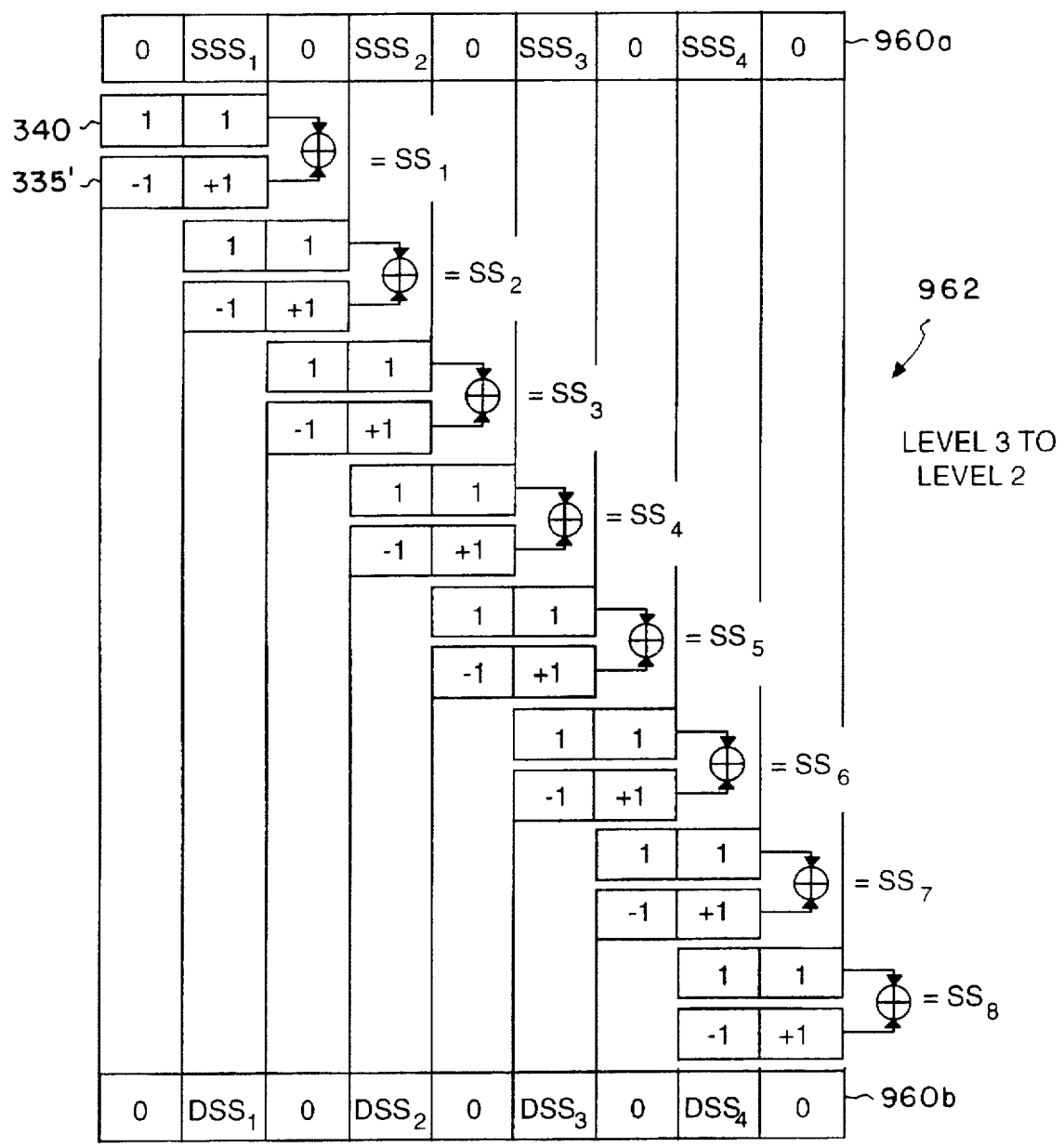
FIGS. 26A, 26B, 26C and 26D illustrate discrete convolution and interpolation reconstruction processes performed by step 710 of the present invention to arrive at the 32 coefficients of the frequency resolution level 2 based on the 32 coefficients of the frequency resolution level 3 within an embodiment where x=32.
Figure 26B:
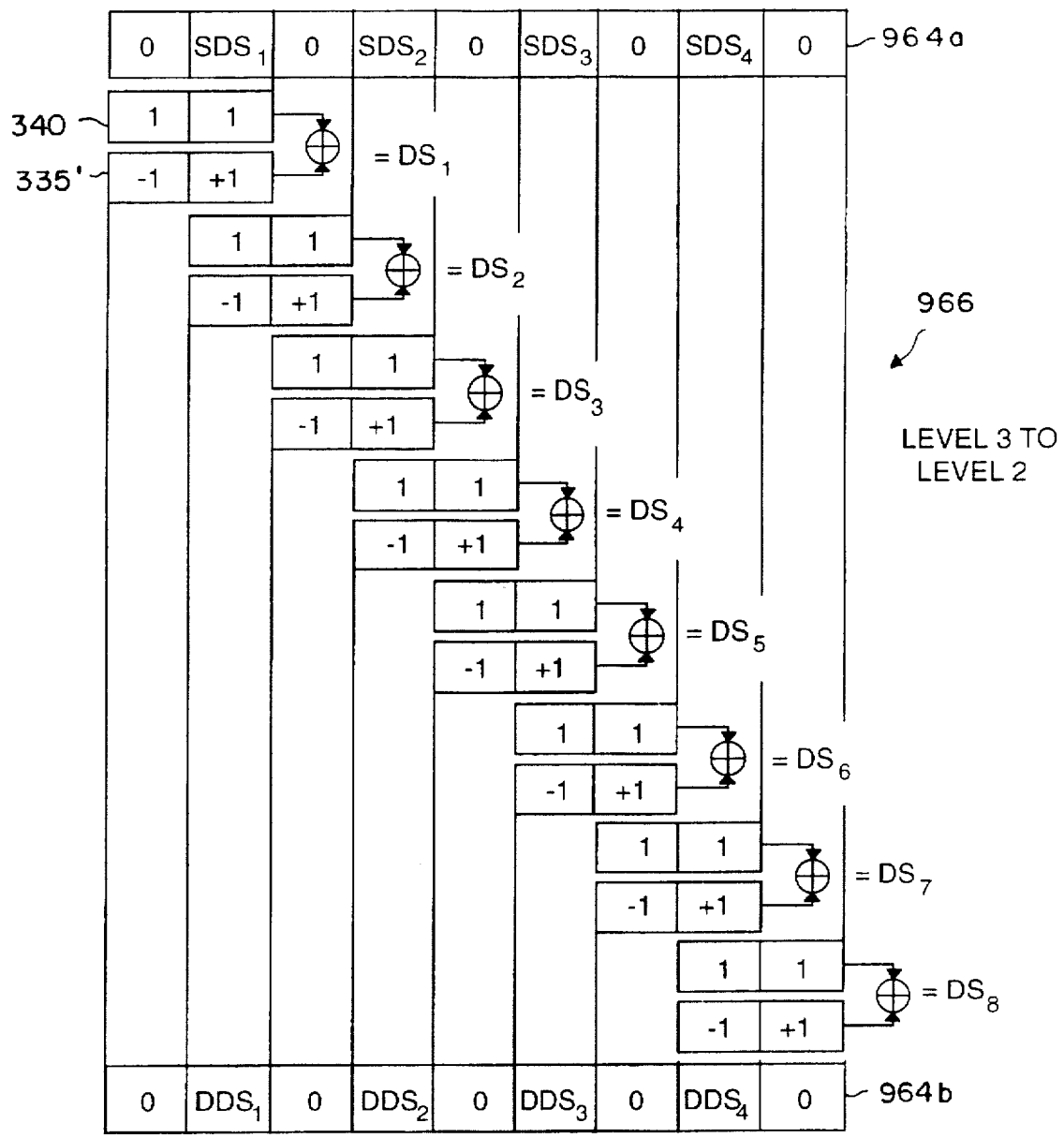
Figure 26C:
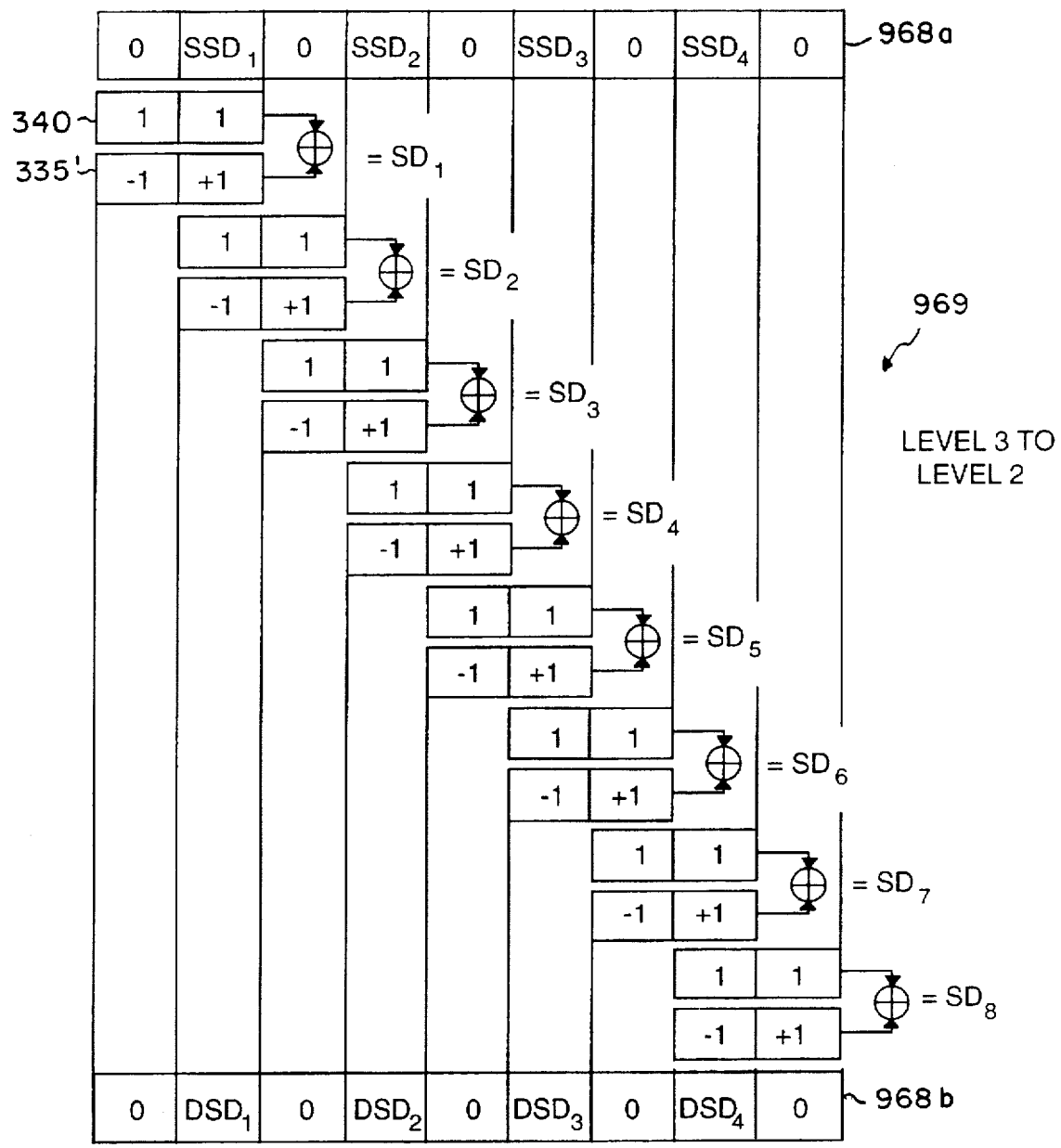
Figure 26D:
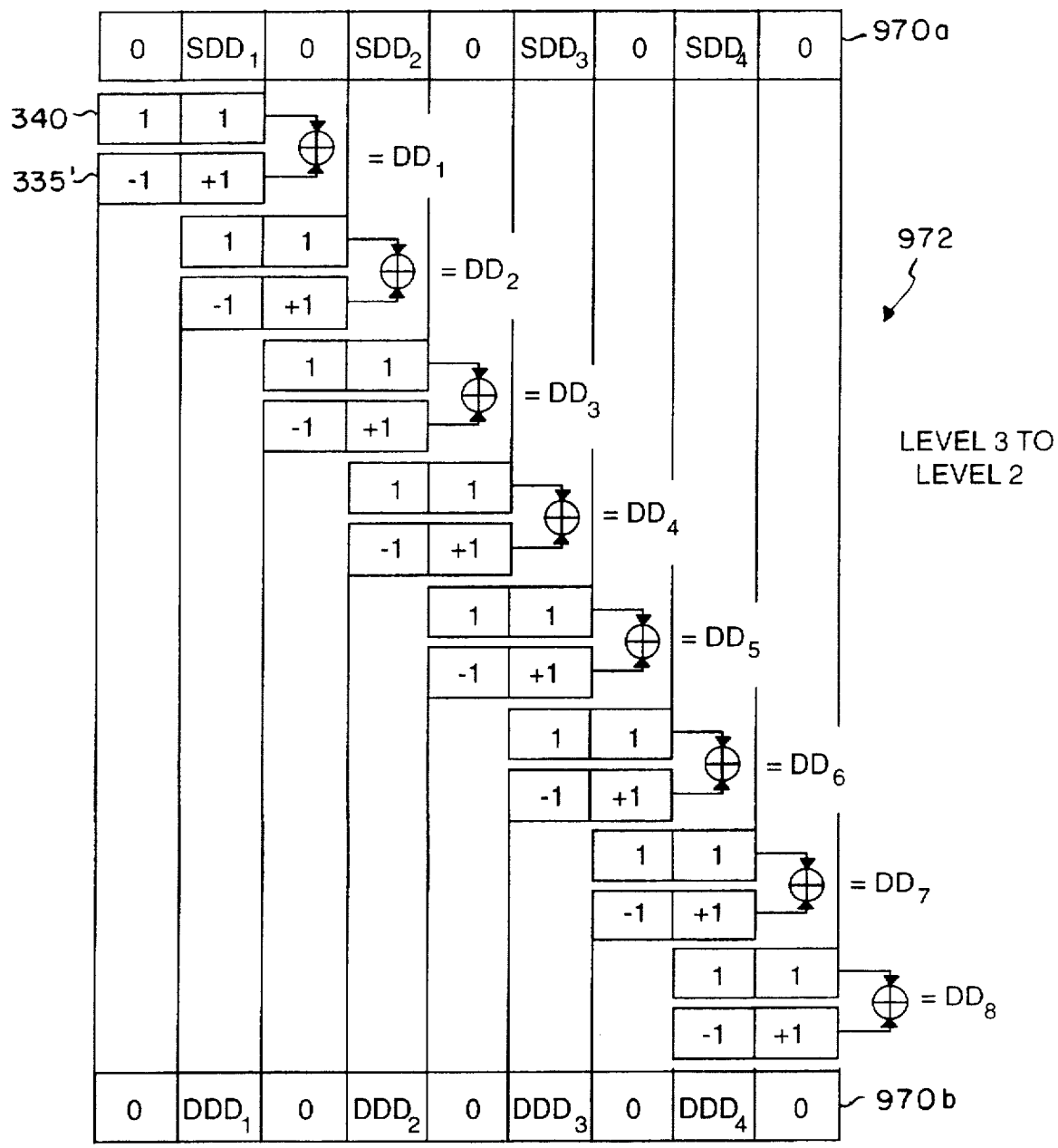
Figure 27A:
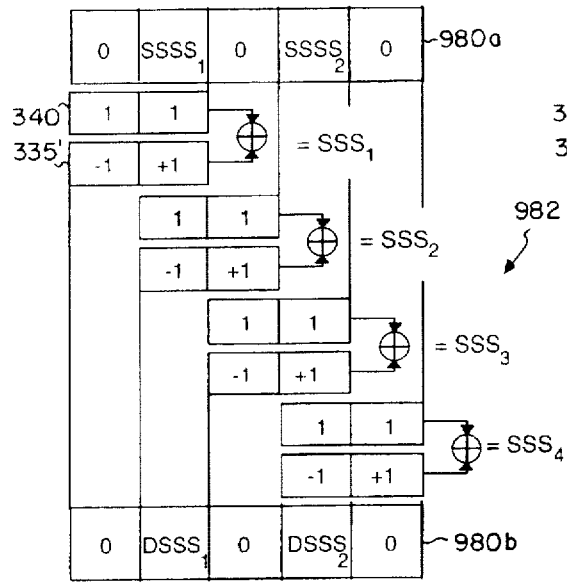
FIGS. 27A, 27B, 27C, 27D, 27E, 27F, 27G, and 27H illustrate discrete convolution and interpolation reconstruction processes performed by step 710 of the present invention to arrive at the 32 coefficients of the frequency resolution level 3 based on the 32 coefficients of the frequency resolution level 4 within an embodiment where x=32.
Figure 27B:
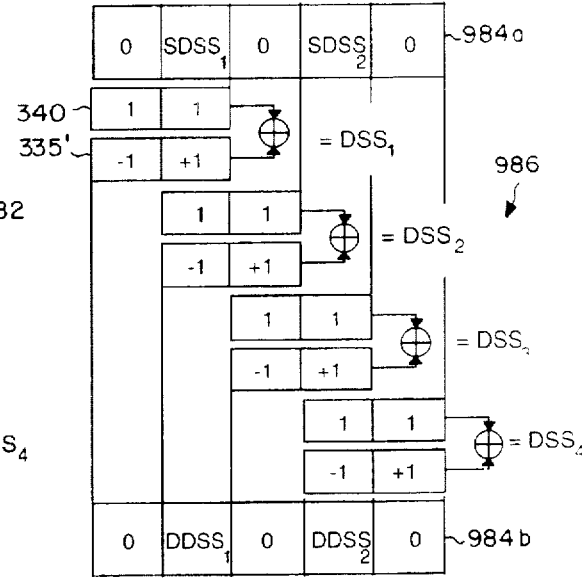
Figure 27C:
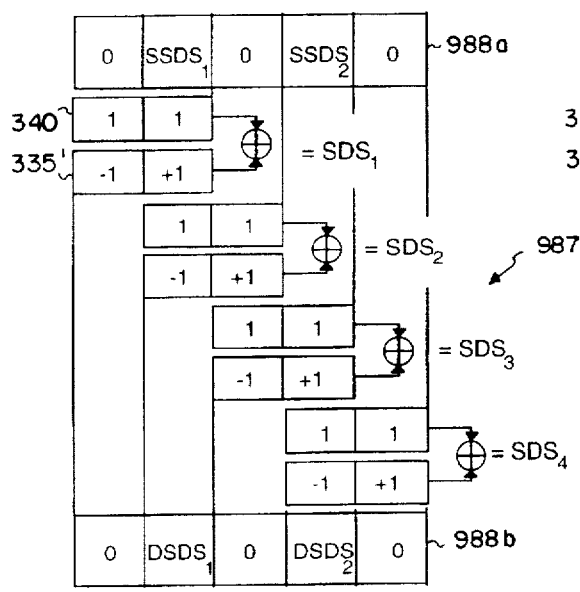
Figure 27D:
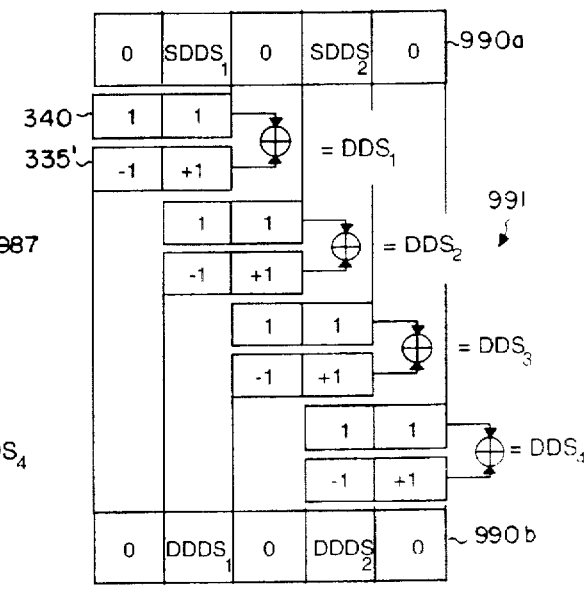
Figure 27E:
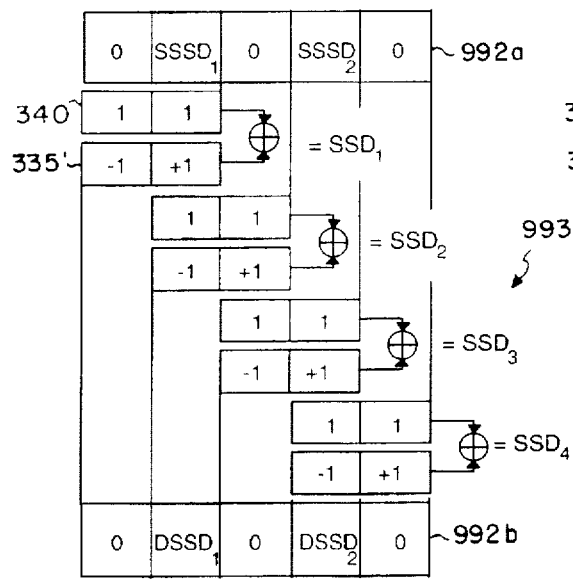
Figure 27F:
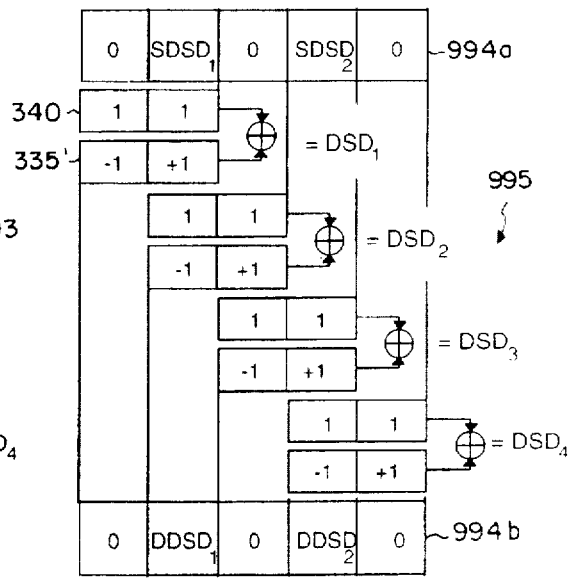
Figure 27G:
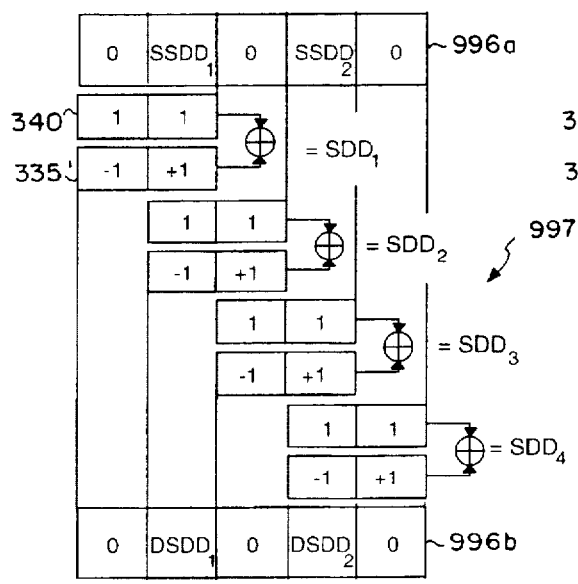
Figure 27H:
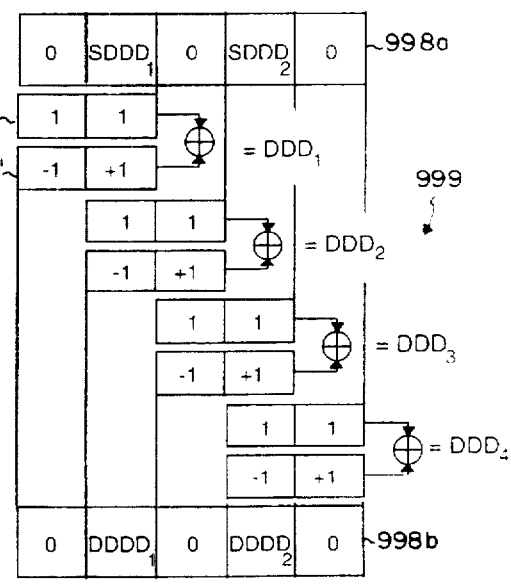

FIGS. 25A and 25B illustrate re-transformation processes 952 and 957 that can be used by the present invention to determine the 32 level 1 coefficients based on the 32 level 2 coefficients. Therefore, from the level 2 coefficients, the denoised signal (X0, . . . , X31) can be computed by relying on the level 1 coefficients, or alternatively the denoised signal can be directly computed by the level 2 coefficients. FIG. 25A utilizes header 950a having SS1 . . . SS8 interpolated coefficients with footer 950b having DS1 . . . DS8 interpolated coefficients which are convolved with wavelets 340 and 335' to derive the low frequency resolution level 1 coefficients S1 . . . S16. FIG. 25B utilizes header 955a having SD1 . . . SD8 interpolated coefficients with footer 955b having DD1 . . . DD8 interpolated coefficients which are convolved with wavelets 340 and 335' to derive the high frequency resolution level 1 coefficients D1 . . . D16. From the output of processes 952 and 957 and the above processes of FIGS. 24A and 24B, relationships expressing the denoised signal (X0, . . . , X31) in terms of the level 2 coefficients can readily be determined. At step 710 of FIG. 8, provided step 410 selected level 2 as the best coefficient map, the present invention computes the denoised signal based on the selected level 2 coefficients (e.g., those coefficients having magnitudes within the threshold determined at step 420b).

FIGS. 26A, 26B, 26C and 26D illustrate re-transformation processes 962, 966, 969, and 972 that are used by the present invention to determine the 32 level 2 coefficients based on the 32 level 3 coefficients. Based on the level 3 coefficients, the denoised signal (X0, . . . , X31) can be computed by computing the level 2 coefficients first (see above), or can alternatively the denoised signal can be directly computed based on the level 3 coefficients. Procedure 962 of FIG. 26A utilizes header 960a having SSS1 . . . SSS4 interpolated coefficients with footer 960b having DSS1 . . . DSS4 interpolated coefficients which are convolved with wavelets 340 and 335' to derive the low frequency resolution level 2 coefficients SS1 . . . SS8. Procedure 966 of FIG. 26B utilizes header 964a having SDS1 . . . SDS4 interpolated coefficients with footer 964b having DDS1 . . . DDS4 interpolated coefficients which are convolved with wavelets 340 and 335' to derive the level 2 coefficients DS1 . . . DS8. Procedure 969 of FIG. 26C utilizes header 968a having SSD1 . . . SSD4 interpolated coefficients with footer 968b having DSD1 . . . DSD4 interpolated coefficients which are convolved with wavelets 340 and 335' to derive the level 2 coefficients SD1 . . . SD8. Procedure 972 of FIG. 26D utilizes header 970a having SDD1 . . . SDD4 interpolated coefficients with footer 970b having DDD1 . . . DDD4 interpolated coefficients which are convolved with wavelets 340 and 335' to derive the level 2 coefficients DD1 . . . DD8. From the output of processes 962, 966, 969, and 972 and the above processes of FIGS. 25A and 25B, relationships expressing the denoised signal (X0, . . . , X31) in terms of the level 3 coefficients can readily be determined. At step 710 of FIG. 8, provided step 410 selected level 3 as the best coefficient map, the present invention computes the denoised signal based on the selected level 3 coefficients (e.g., those coefficients having magnitudes within the threshold determined at step 420c).

FIGS. 27A-27H illustrate re-transformation processes 982, 986, 987, 991, 993, 995, 997, and 999 that can be used by the present invention to determine the 32 level 3 coefficients based on the 32 level 4 coefficients. Based on the level 4 coefficients, the denoised signal (X0, . . . , X31) can be computed relying on the level 3 coefficients (see above) or can be directly computed based on the level 4 coefficients. Procedure 982 of FIG. 27A utilizes header 980a having SSSS1 . . . SSSS2 interpolated coefficients with footer 980b having DSSS1 . . . DSSS2 interpolated coefficients which are convolved with wavelets 340 and 335' to derive the low frequency resolution level 3 coefficients SSS1 . . . SSS4. Similarly, procedures 986, 987, 991 of FIGS. 27B, 27C, and 27D utilize respective headers 984a, 988a, and 990a having SDSS1 . . . SDSS2, SSDS1 . . . SSDS2, and SDDS1 . . . SDDS2 as respective interpolated coefficients and utilize respective footers 984b, 988b, and 990b having DDSS1 . . . DDSS2, DSDS1 . . . DSDS2, and DDDS1 . . . DDDS2 as respective interpolated coefficients which are convolved with wavelets 340 and 335' to derive the level 3 coefficients DSS1 . . . DSS4, SDS1 . . . SDS4, and DDS1 . . . DDS4, respectively.

Similarly, convolution procedures 993, 995, 997, and 999 of FIGS. 27E, 27F, 27G and 27H are utilized to generate level 3 coefficients SSD1 . . . SSD4, DSD1 . . . DSD4, SDD1 . . . SDD4, and DDD1 . . . DDD4, respectively. From the output of processes 982, 986, 987, 991, 993, 995, 997, and 999 and the above processes of FIGS. 26A, 26B, 26C, and 26D, relationships expressing the denoised signal (X0, . . . , X31) in terms of the level 4 coefficients can readily be determined. At step 710, provided step 410 selected level 4 as the best coefficient map, the present invention computes the denoised signal based on the selected level 4 coefficients (e.g., those coefficients having magnitudes within the threshold determined at step 420d).

FIGS. 28A-28P illustrate re-transformation processes 1010, 1012, 1014, 1016, 1018, 1020, 1022, 1024, 1030, 1032, 1034, 1036, 1038, 1040, 1042, and 1044 that can be used by the present invention to determine the 32 level 4 coefficients based on the 32 level 5 coefficients. Therefore, based on the level 5 coefficients, the denoised signal (X0, . . . , X31) can be computed relying on the level 4 coefficients or the denoised signal can be directly computed based on the level 5 coefficients. Procedure 1010 of FIG. 28A utilizes header 1009a having SSSSS1 interpolated coefficient with footer 1009b having DSSSS1 interpolated coefficient which are convolved with wavelets 340 and 335' to derive the low frequency resolution level 4 coefficients SSSS1 . . . SSSS2. Similarly, convolution procedures 1012, 1014, 1016, 1018, 1020, 1022, 1024, 1030, 1032, 1034, 1036, 1038, 1040, 1042, and 1044 of FIGS. 28B-28P, respectively, are utilized to generate level 4 coefficients DSSS1 . . . DSSS2, SDSS1 . . . SDSS2, DDSS1 . . . DDSS2, SSDS1 . . . SSDS2, DSDS1 . . . DSDS2, SDDS1 . . . SDDS2, DDDS1 . . . DDDS2, SSSD1 . . . SSSD2, DSSD1 . . . DSSD2, SDSD1 . . . SDSD2, DDSD1 . . . DDSD2, SSDD1 . . . SSDD2, DSDD1 . . . DSDD2, SDDD1 . . . SDDD2, and DDDD1 . . . DDDD2, respectively. From the output of the above 16 convolution processes and the above processes of FIGS. 27A-27H, relationships expressing the denoised signal (X0, . . . , X31) in terms of the level 5 coefficients can readily be determined. At step 710 of FIG. 8, provided step 410 selected level 5 as the best coefficient map, the present invention computes the denoised signal based on the selected level 5 coefficients (e.g., those coefficients having magnitudes within the threshold determined at step 420n).

At the completion of step 710 of FIG. 8, a digitally reconstructed denoised signal is supplied to step 715. Depending on the level selected for reconstruction by step 430, different normalization factors are multiplied by the signal data points (e.g., X0, X1, etc.) at step 715 so that conservation of energy is maintained through the transformation process. The normalization factors are computed such that the squares of all the coefficients equal each other for each level and also equal the squares of each of the signal data points. Based on principles of conservation of energy and the above description, these normalization factors can readily be determined for any level n. For instance, the below relationships illustrate normalization factors for level 1 and level 2 in an exemplary case where x=4:

$$X0^2 + X1^2 + X2^2 + X3^2 = Q1(S1^2 + S2^2 + D1^2 + D2^2)$$

$$X0^2 + X1^2 + X2^2 + X3^2 = Q2(SS1^2 + DS1^2 + SD1^2 + DD1^2)$$

where Q1 and Q2 are the normalization factors for level 1 and level 2, respectively, for the example with x=4 and n=2. These factors can be predetermined depending on the number of levels n and then used at step 715 for the reconstructed denoised signal. The output of step 715 is supplied over bus 30 (FIG. 1).

At step 720 of FIG. 8, the present invention DAC circuit 55 converts the denoised and normalized digital signal supplied over bus 30 into a denoised analog signal supplied over line 60. At this stage, the present invention received a noisy video signal over line 15 and produced a clean (denoised) video signal as output over line 60. At step 725, the present invention supplies the denoised video signal 60 to a well known wide band video pulse processor 65 which perform signal analysis and threat characterization. At step 730, the present invention then outputs the results of wide band video pulse processor 65 to a threat display system (e.g., azimuth display) or a counter-measures unit.

It is appreciated that the above reconstruction processes performed for each level can be performed in parallel fashion analogous to the forward transformation processes described above. In such case, the coefficients of each level can be used by parallel processes to simultaneously arrive at the denoised input signal values.

EXAMPLE SIGNAL DENOISING

Figure 29A:
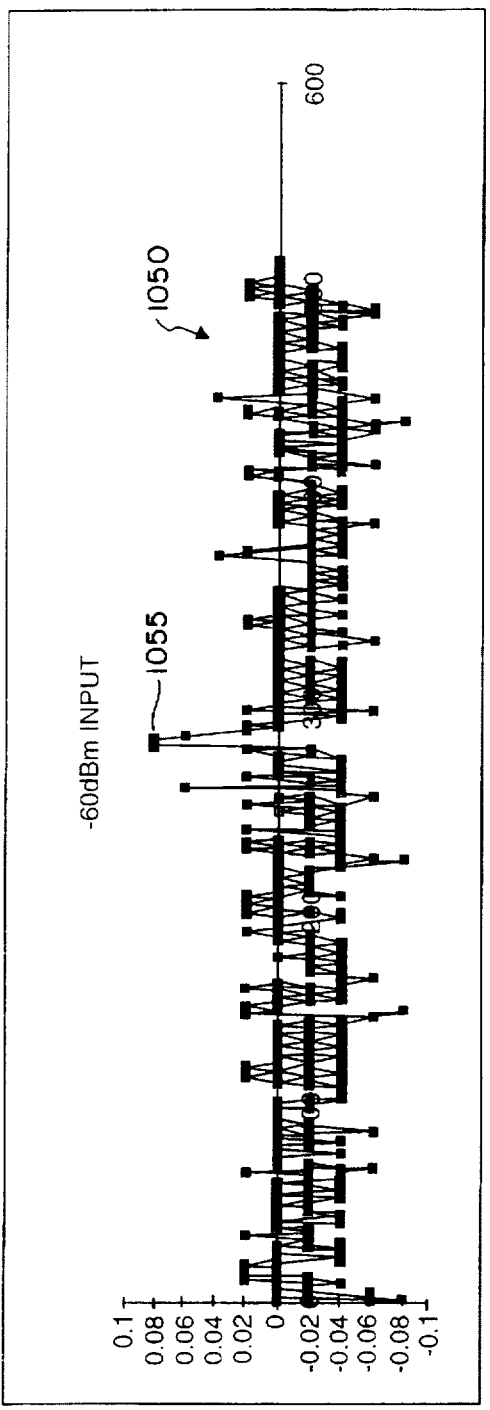
FIG. 29A illustrates a representation of an input digitized signal sampled over multiple points showing both noise and a signal pulse.
Figure 29B:
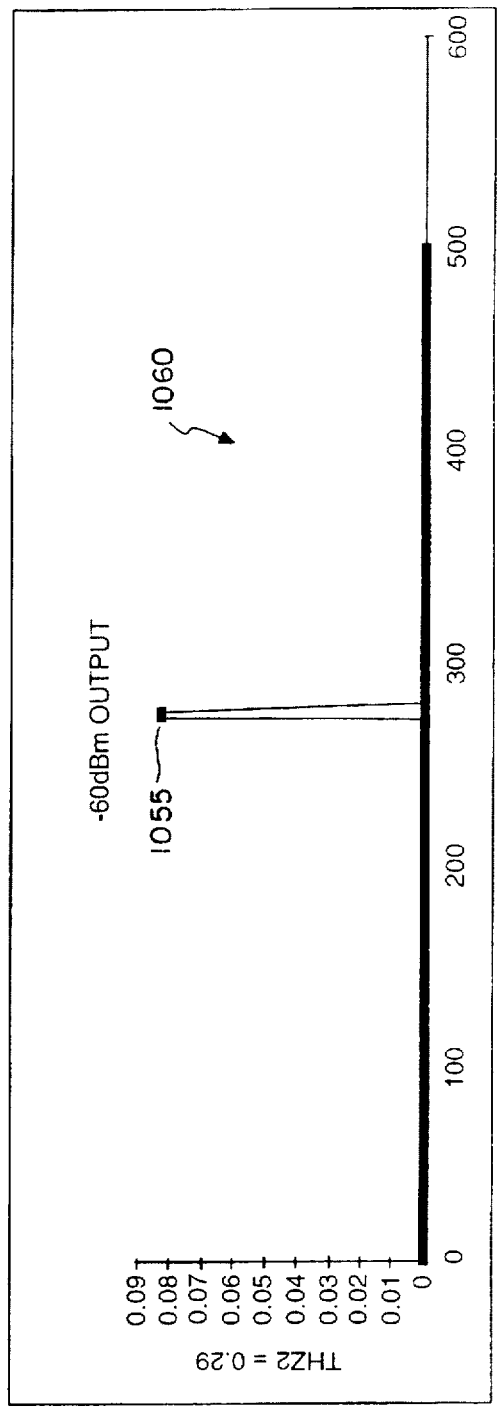
FIG. 29B illustrates a representation of a denoised digitized signal (as output by the present invention) of the input signal of FIG. 29A.

FIGS. 29A and 29B illustrate an example signal denoising produced by the present invention. FIG. 29A illustrates a sample input digital signal 1055 (e.g., received over bus 25 of FIG. 1) having a large number of sample points. Signal 1050 contains mostly noise with a pulse 1055 located near the center of the signal 1050. FIG. 29B illustrates the resulting digital denoised signal 1060 output over bus 60 with pulse 1055 isolated and the noise eliminated. Embodiments of the present invention denoising system provide between 6 to 10 (not a theoretical limit) dB increase in overall RWR system sensitivity and dynamic detection range by reducing noise in the wide band input signal.

The preferred embodiment of the present invention, an RWR signal denoising system utilizing wavelet transformations with determined wavelet basis functions, is thus described. While the present invention has been described in particular embodiments, it should be appreciated that the present invention should not be construed as limited by such embodiments, but rather construed according to the below claims.

What is claimed is:

1. In a radar warning receiver, a method for denoising an input wide band video signal window, said method comprising the steps of:

a) selecting a plurality of wavelet basis functions that represent expected signal waveforms of said input wide band video signal window, each of said plurality of wavelet basis functions composed of values of either "1" or "−1";

b) performing high speed real-time convolution of said input wide band video signal window against said plurality of wavelet basis functions to generate a plurality of correlation coefficients wherein groups of correlation coefficients share a common frequency resolution level, said step b) of performing high speed convolution being performed without multiplication functions to determine said plurality of correlation coefficients;

c) thresholding said plurality of correlation coefficient to select those correlation coefficients that most efficiently package the energy of the input wide band video signal window;

d) discarding correlation coefficients not thresholded by step c); and e) generating a denoised version of said input wide band video signal window by performing a high speed real-time wavelet reconstruction based on correlation coefficients thresholded by step c).

2. A method as described in claim 1 wherein said plurality of wavelet basis functions are Haar wavelet basis functions and wherein said high speed real-time convolution step b) operates based on an input wide band video signal window signal rate of 64 MHz.

3. A method for denoising an input digital signal, said method comprising the computer implemented steps of:

a) sampling said input digital signal in sample windows, each sample window comprising x discrete sample points;

b) convolving said sample window with selected wavelet basis functions across n frequency resolution levels to generate n sets of x correlation coefficients, each frequency resolution level generating x correlation coefficients wherein each frequency resolution level, r, comprises $2^r$ separate frequency bands, each frequency band associated with a wavelet basis function, and wherein said step b) further comprises the step of performing n separate frequency resolution level convolution processes each convolution process of a level, r, convolving $2^r$ wavelet basis functions with discrete sample points of said sample window to generate a set of x correlation coefficients for said level, r;

c) generating a set of n coefficient maps, one coefficient map per frequency resolution level of said n frequency resolution levels;

d) determining a best coefficient map of said n coefficient maps that most efficiently represents said x discrete sample points of said sample window; and e) recording selected correlation coefficients of said best coefficient map and discarding all remaining correlation coefficients.

4. A method as described in claim 3 further comprising the step of performing a re-transformation of said selected correlation coefficients of said best coefficient map to reconstruct an output denoised digital signal.

5. A method as described in claim 4 further comprising the steps of:

normalizing said output denoised digital signal to produce a normalized output denoised digital signal; and converting said normalized output denoised digital signal into an analog denoised signal.

6. A method as described in claim 3 further comprising the step of generating a digital report based on said selected correlation coefficients, said digital report including a leading edge pulse time and a pulse peak amplitude of an existing pulse within said sample window.

7. A method as described in claim 3 wherein each frequency resolution level convolution process of a level, r, convolves $2^r$ wavelet basis functions across $x/2^r$ time segments of said sample window to generate said set of x correlation coefficients for said level, r.

8. A method as described in claim 3 wherein said step c) comprises the steps of:

ranking said set of x correlation coefficients for each frequency resolution level in order of magnitude to produce said set of n coefficient maps; and for each coefficient map of said n coefficient maps, determining correlation coefficients that fall within a determined threshold, wherein said selected coefficients are selected by said above step of determining correlation coefficients that fall within said determined threshold.

9. A method as described in claim 3 wherein said step d) comprises the steps of:

determining a drop-off value of coefficient magnitude for each of said n coefficient maps; and selecting said best coefficient map as that coefficient map of said n coefficient maps having a sharpest drop-off value.

10. A method as described in claim 3 wherein x is equal to or less than 32 and n is equal to or less than 5.

11. In a radar warning receiver (RWR), a method for denoising an input analog signal, said method comprising the steps of:

a) converting said input analog signal into an input digital signal, said input digital signal having sample windows, each sample window comprising x discrete sample points;

b) convolving said sample window with selected wavelet basis functions across n frequency resolution levels to generate n sets of x correlation coefficients, each frequency resolution level generating x correlation coefficients wherein each frequency resolution level, r, comprises $2^r$ separate frequency bands, each frequency band associated with a wavelet basis function and wherein said step b) further comprises the step of performing n separate frequency resolution level convolution processes, each convolution process of a level, r, convolving $2^r$ wavelet basis functions with discrete sample points of said sample window to generate a set of x correlation coefficients for said level, r;

c) generating a set of n coefficient maps, one coefficient map for each frequency resolution level of said n frequency resolution levels;

d) determining a best coefficient map of said n coefficient maps that most efficiently represents said x discrete sample points of said sample window and determining selected correlation coefficients of said best coefficient map;

e) performing a re-transformation of solely said selected correlation coefficients of said best coefficient map to reconstruct an output denoised digital signal; and f) converting said output denoised digital signal into an output denoised analog signal.

12. A method as described in claim 11 further comprising the step of applying said output denoised analog signal to an RWR video pulse processor for threat characterization.

13. A method as described in claim 11 where said step f) comprises the steps of:

normalizing said output denoised digital signal to produce a normalized output denoised digital signal; and using a digital to analog converter circuit to convert said normalized output denoised digital signal into said output denoised analog signal.

14. A method as described in claim 11 wherein each frequency resolution level convolution process of a level, r, convolves said $2^r$ wavelet basis functions across $x/2^r$ time segments of said sample window to generate said set of x correlation coefficients for said level, r.

15. A method as described in claim 11 wherein said step c) comprises the steps of:

ranking said set of x correlation coefficients for each frequency resolution level in order of magnitude to produce said set of n coefficient maps; and for each coefficient map of said n coefficient maps, determining correlation coefficients that fall within a determined threshold, wherein said selected coefficients are selected by said above step of determining correlation coefficients that fall within said determined threshold.

16. A method as described in claim 11 wherein said step d) comprises the steps of:

determining a drop-off value of coefficient magnitude for each of said n coefficient maps; and selecting said best coefficient map as that coefficient map of said n coefficient maps having a sharpest drop-off value.

17. A radar warning receiver (RWR) system comprising:

an wide band receiver for receiving an analog signal;

an analog to digital converter circuit for converting said analog signal into an input digital signal;

a processor system coupled to receive said input digital signal in sample windows, each sample window comprising x discrete sample points, said processor system for performing the steps of:

a) convolving said sample window with selected wavelet basis functions across n frequency resolution levels to generate n sets of x correlation coefficients, each frequency resolution level generating x correlation coefficients wherein each frequency resolution level, r, comprises $2^r$ separate frequency bands, each frequency band associated with a wavelet basis function and wherein said step a) further comprises the step of performing n separate frequency resolution level convolution processes, each convolution process of a level, r, convolving $2^r$ wavelet basis functions with discrete sample points of said sample window to generate a set of x correlation coefficients of said level, r;

b) generating a set of n coefficient maps, one coefficient map for each frequency resolution level of said n frequency resolution levels;

c) determining a best coefficient map of said n coefficient maps that most efficiently represents said x discrete sample points of said sample window and determining selected correlation coefficients of said best coefficient map; and d) performing a re-transformation of solely said selected correlation coefficients of said best coefficient map to reconstruct an output denoised digital signal; and a digital to analog converter coupled to said processor system for converting said output denoised digital signal into an output denoised analog signal.

18. An RWR system as described in claim 17 further comprising an RWR pulse processor coupled to receive said output denoised analog signal, said RWR pulse processor for performing threat characterization.

19. An RWR system as described in claim 17 where said step d) comprises the step of normalizing said output denoised digital signal.

20. An RWR system as described in claim 17 wherein each frequency resolution level convolution process of a level, r, convolves said $2^r$ wavelet basis functions across $x/2^r$ time segments of said sample window to generate said set of x correlation coefficients of said level, r.

21. An RWR system-as described in claim 17 wherein said step b) comprises the steps of:

ranking said set of x correlation coefficients for each frequency resolution level in order of magnitude to produce said set of n coefficient maps; and for each coefficient map of said n coefficient maps, determining correlation coefficients that fall within a determined threshold, wherein said selected coefficients are selected by said above step of determining correlation coefficients that fall within said determined threshold.

22. An RWR system as described in claim 17 wherein said step c) comprises the steps of:

determining a drop-off value of coefficient magnitude for each of said n coefficient maps; and selecting said best coefficient map as that coefficient map of said n coefficient maps having a sharpest drop-off value.

23. A computer system for denoising an input digital signal, said computer system comprising a processor coupled to a bus and a computer readable memory unit coupled to said bus, said computer readable memory unit containing a program for causing said processor to perform the steps of:

sampling said input digital signal into sample windows, each sample window comprising x discrete sample points;

b) convolving said sample window with selected wavelet basis functions across n frequency resolution levels to generate n sets of x correlation coefficients, each frequency resolution level generating x correlation coefficients where each frequency resolution level, r, comprises $2^r$ separate frequency bands, each frequency band associated with a respective wavelet basis function and wherein said step b) further comprises the step of performing n separate frequency resolution level convolution processes, each convolution process of a level, r, convolving $2^r$ wavelet basis functions with discrete sample points of said sample window to generate a set of x correlation coefficients of said level, r;

c) generating a set of n coefficient maps, one coefficient map for each frequency resolution level of said n frequency resolution levels;

d) determining a best coefficient map of said n coefficient maps that most efficiently represents said x discrete sample points of said sample window; and e) recording selected correlation coefficients of said best coefficient map.

24. A system as described in claim 23 wherein said processor further performs the step of performing a re-transformation of said selected correlation coefficients of said best coefficient map to reconstruct an output denoised digital signal.

25. A system as described in claim 24 wherein said processor further performs the step of normalizing said output denoised digital signal to produce a normalized output denoised digital signal; and further comprising a digital to analog converter circuit for converting said normalized output denoised digital signal into an output denoised analog signal.

26. A system as described in claim 23 wherein said processor further performs the step of generating a digital report based on said selected correlation coefficients, said digital report including a leading edge pulse time and a pulse peak amplitude.

27. A system as described in claim 23 wherein said each frequency resolution level convolution process of a level, r, convolves said $2^r$ wavelet basis functions across $x/2^r$ time segments of said sample window to generate said set of x correlation coefficients of said level, r.

28. A system as described in claim 23 wherein said step c) comprises the steps of:

ranking said set of x correlation coefficients for each frequency resolution level in order of magnitude to produce said set of n coefficient maps; and for each coefficient map of said n coefficient maps, determining correlation coefficients that fall within a determined threshold, wherein said selected coefficients are selected by said above step of determining correlation coefficients that fall within said determined threshold.

29. A system as described in claim 23 wherein said step d) comprises the steps of:

determining a drop-off value of coefficient magnitude for each of said n coefficient maps; and selecting said best coefficient map as that coefficient map of said n coefficient maps having a sharpest drop-off value.

* * * * *